United States Patent [19]

Wollum et al.

[11] 4,292,669
[45] Sep. 29, 1981

[54] AUTONOMOUS DATA COMMUNICATIONS SUBSYSTEM

[75] Inventors: James E. Wollum, San Clemente; Robert L. Rawlings, El Toro, both of Calif.

[73] Assignee: Burroughs Corporation, Detroit, Mich.

[21] Appl. No.: 65,521

[22] Filed: Aug. 10, 1979

Related U.S. Application Data

[63] Continuation-in-part of Ser. No. 882,213, Feb. 28, 1978, abandoned, which is a continuation-in-part of Ser. No. 764,473, Jan. 31, 1977, abandoned.

[51] Int. Cl.³ .............................................. G06F 11/20
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,534,338 | 10/1970 | Christensen et al. | 364/200 |
| 3,753,236 | 8/1973 | Flynn et al. | 364/200 |
| 3,846,763 | 11/1974 | Riikonen | 364/200 |
| 3,934,232 | 1/1976 | Curley et al. | 364/200 |
| 3,936,803 | 2/1976 | Katzman et al. | 364/200 |
| 4,052,703 | 10/1977 | Collins, Sr. et al. | 364/900 |

Primary Examiner—Harvey E. Springborn
Assistant Examiner—C. T. Bartz
Attorney, Agent, or Firm—Alfred W. Kozak; Nathan Cass; Kevin R. Peterson

[57] ABSTRACT

A data communication subsystem for operation with a main host computer, the subsystem involving a plurality of Front-End Controllers (each of which handles data transfers for a particular type of peripheral terminal and type of transmission line), a Data Communication Processor which controls the activity of the Front-End Controllers, a local "autonomous" memory (sometimes called data communications memory) dedicated to storing instructions, control data, and information data primarily for data transfer operations, and a Basic Control Interface unit which ties together the autonomous memory, the Data Communications Processor, and the Front-End Controllers. The data communication subsystem includes means for sensing a halt or failure in the main host system and then operating in an "autonomous" mode to continuously provide for data transfer operations independent of the main system condition. The data communication subsystem also provides means for storage of data (tanking) on disk files when the main system is halted. Such disk storage also alleviates memory space requirements for the main memory and the local autonomous memory. The concept of "data communications memory" is applied as a memory space dedicated for data transfer operations. This memory space called "data communications memory" may be made to reside in host system main memory, a local autonomous memory, or even in internal memory space within the Data Communications Processor. However, on halt of the main host computer system, the local autonomous memory will operate as the data communications memory directly available to the data communication subsystem and will work independently of a halt in the main host computer system.

15 Claims, 31 Drawing Figures

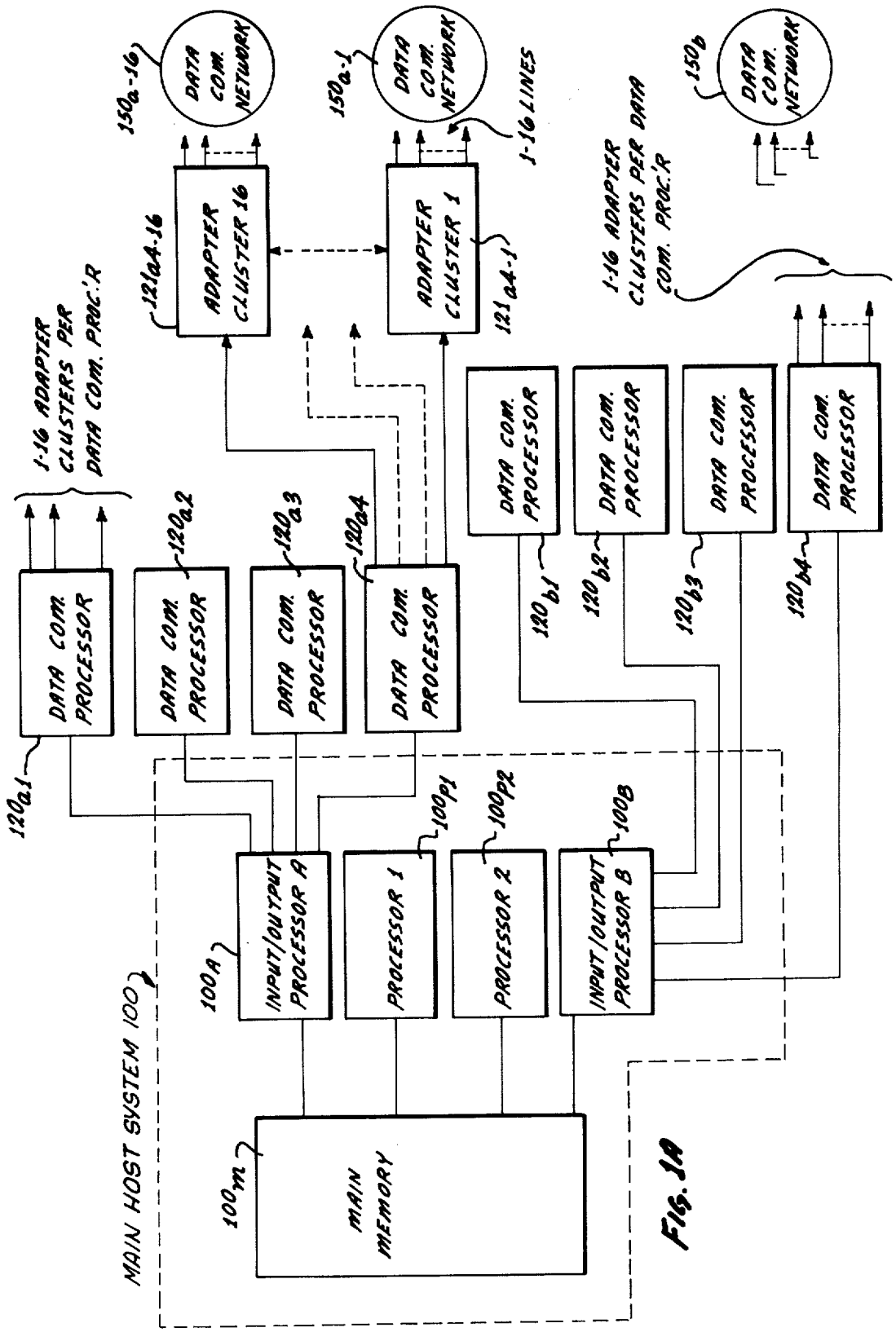

MAIN MEMORY

LOCAL MEMORY FOR DCP

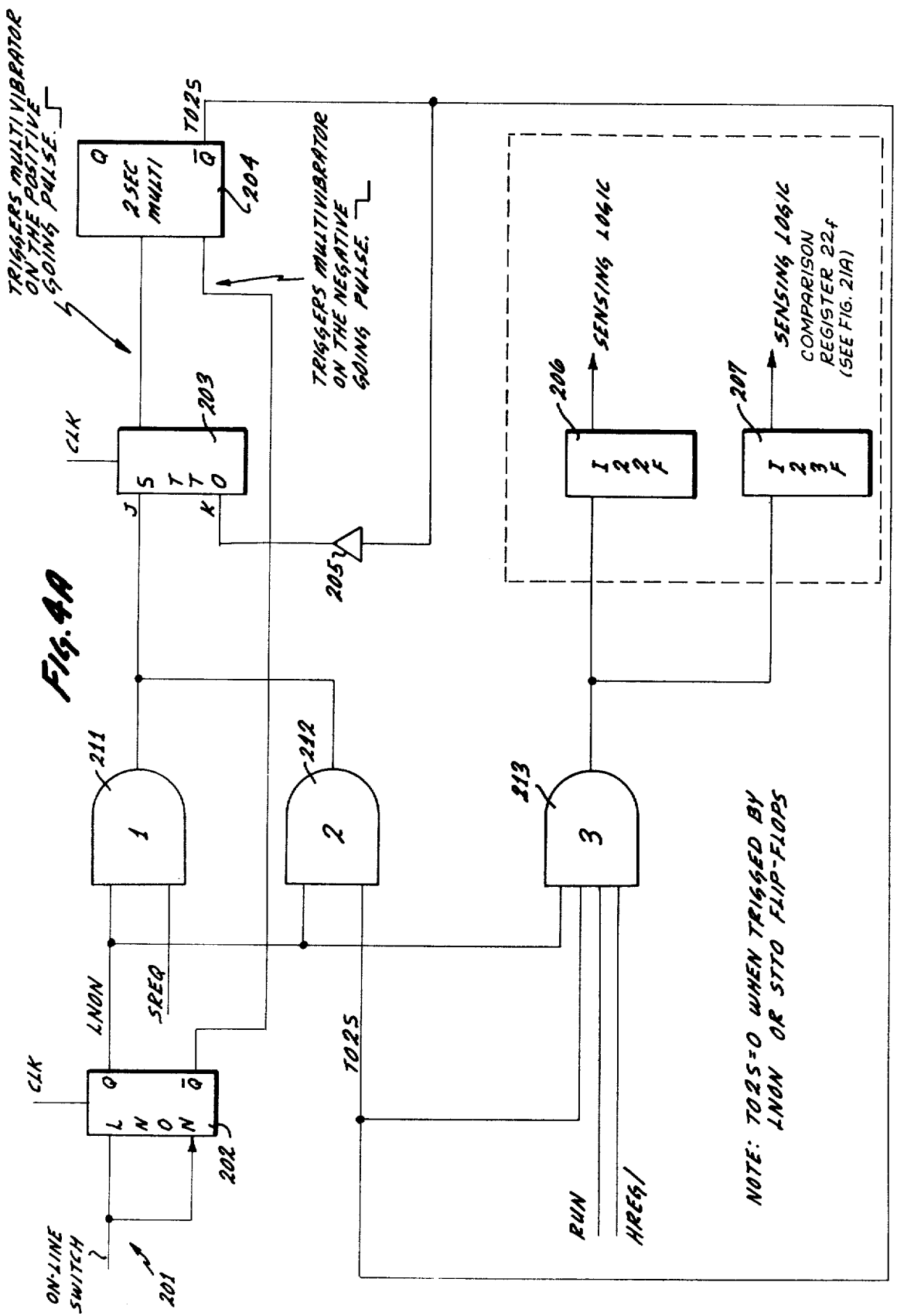

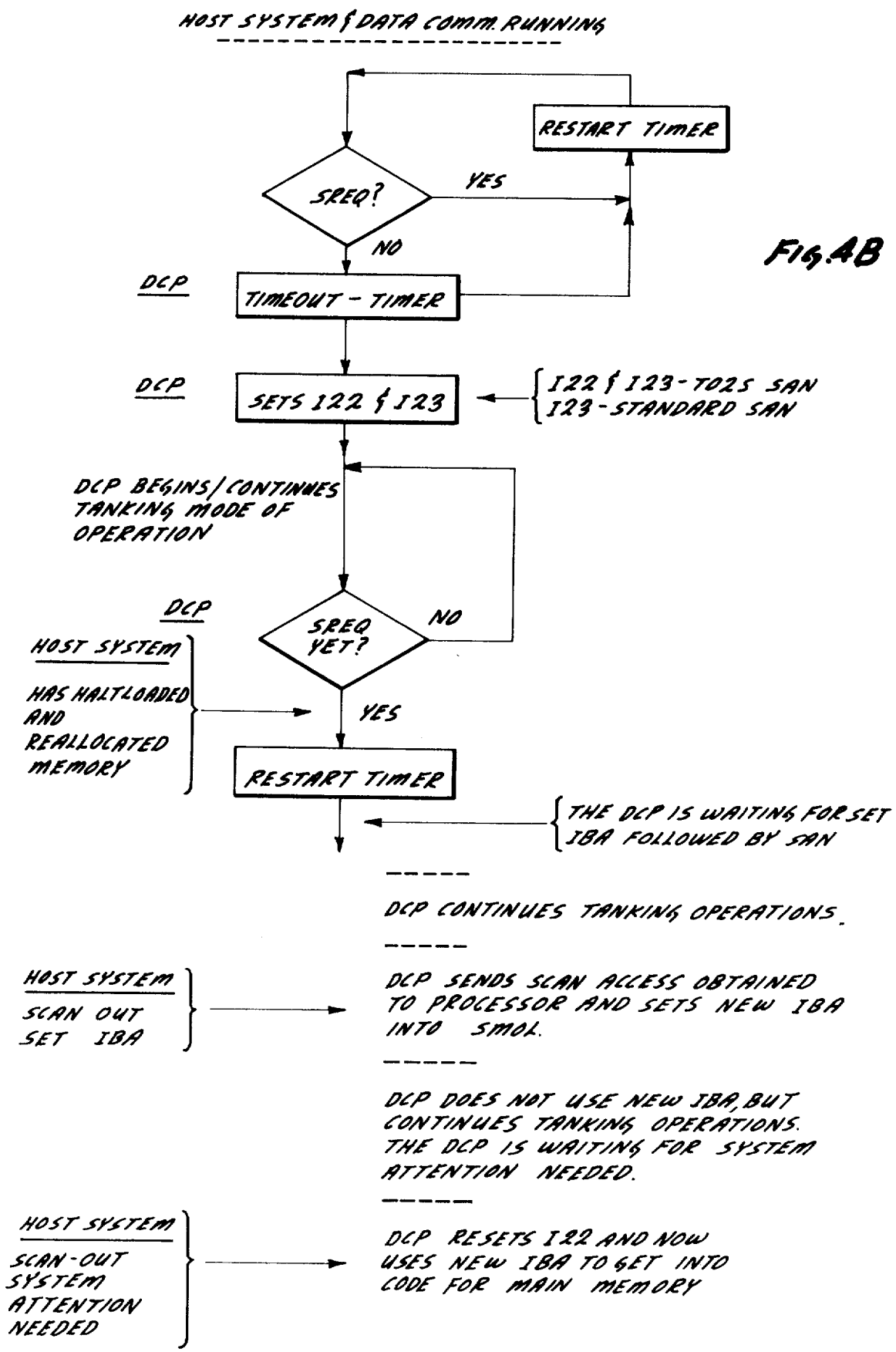

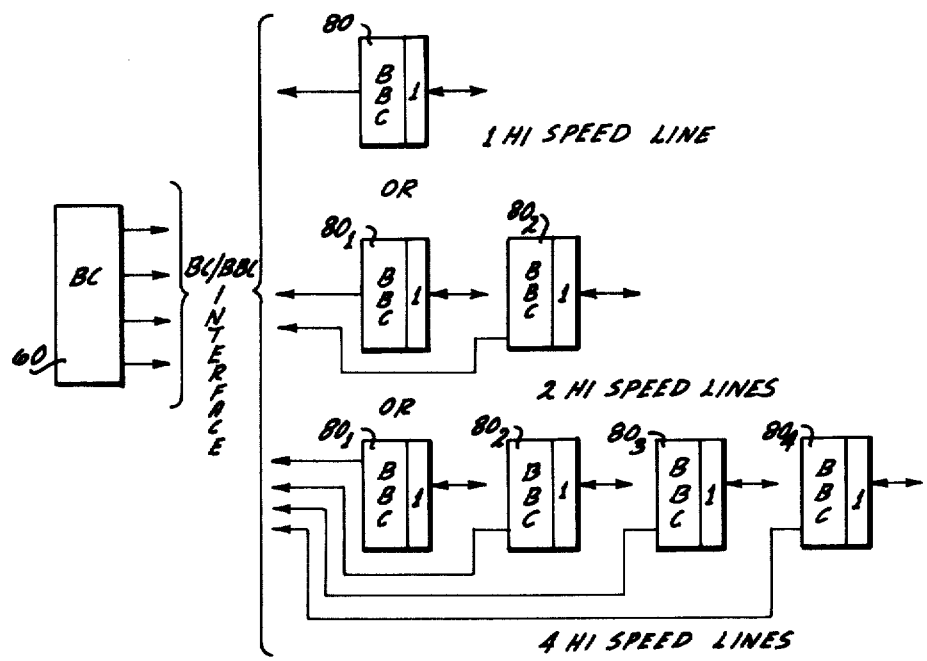
BROADBAND CONTROL CONFIGURATIONS    Fig. 9
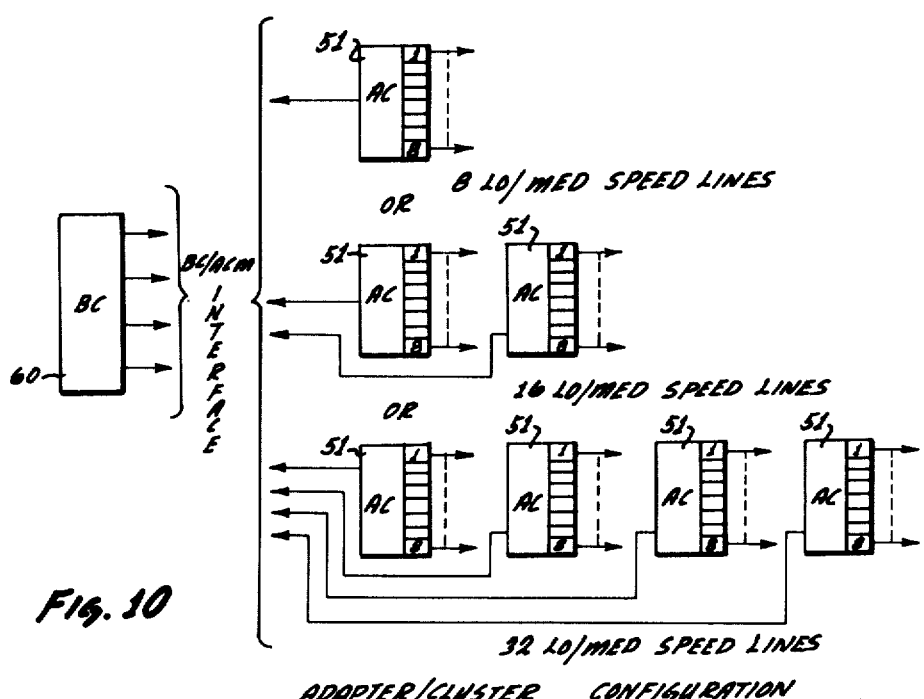
ADAPTER/CLUSTER CONFIGURATION
Fig. 10

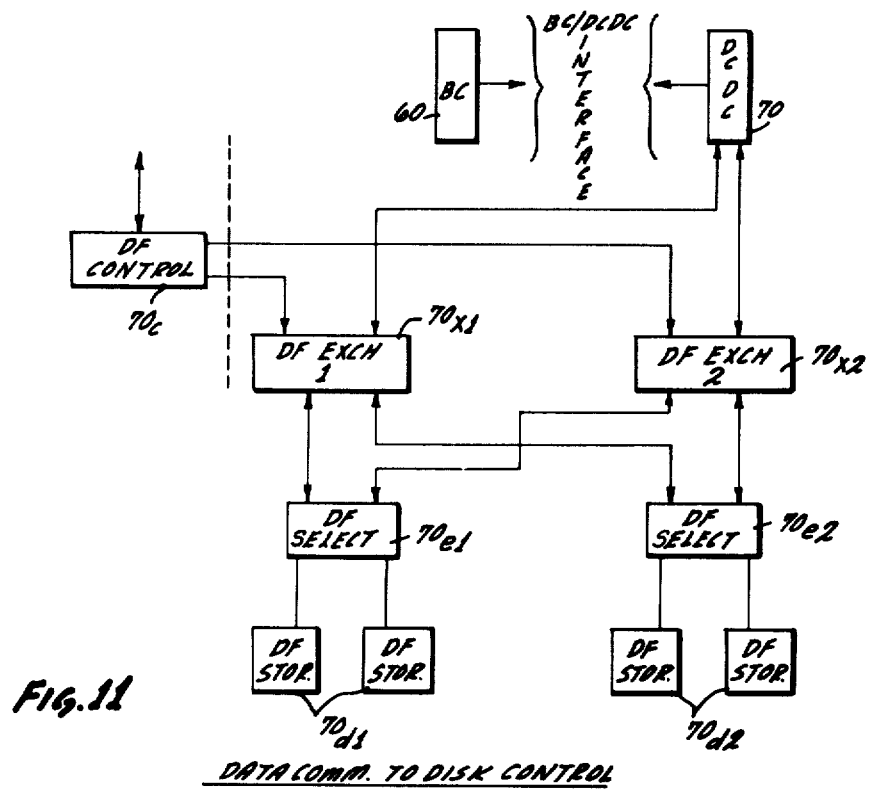
Fig. 11  DATA COMM. TO DISK CONTROL
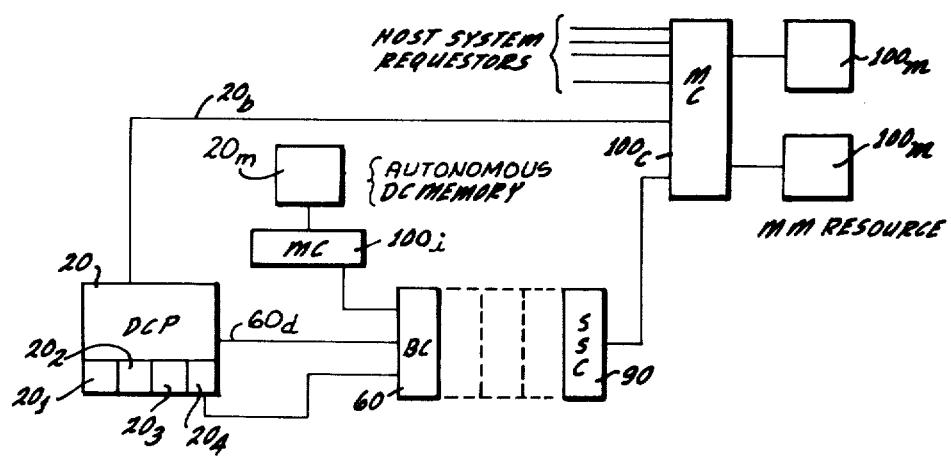
Fig. 12A  STORE TO STORE INTERFACE (SEPARATE BUS)

TYPICAL EDC MODULE CONFIGURATIONS

DATA COMM. COMMAND WORD (DCCW)

DATA COMM. ADDRESS WORD (DCAW)

DATA COMM. RESULT WORD (DCRW)

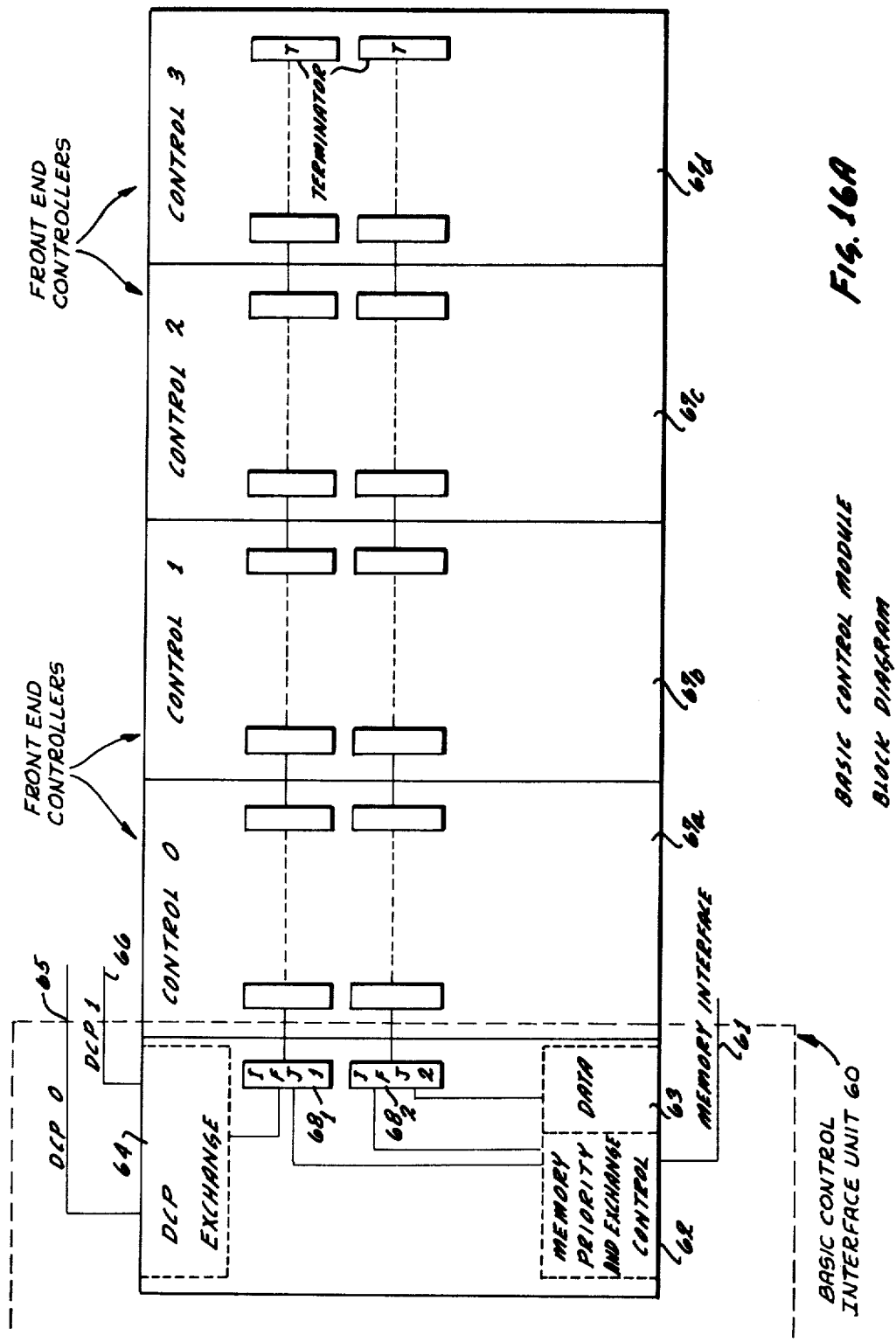

BASIC CONTROL BLOCK DIAGRAM

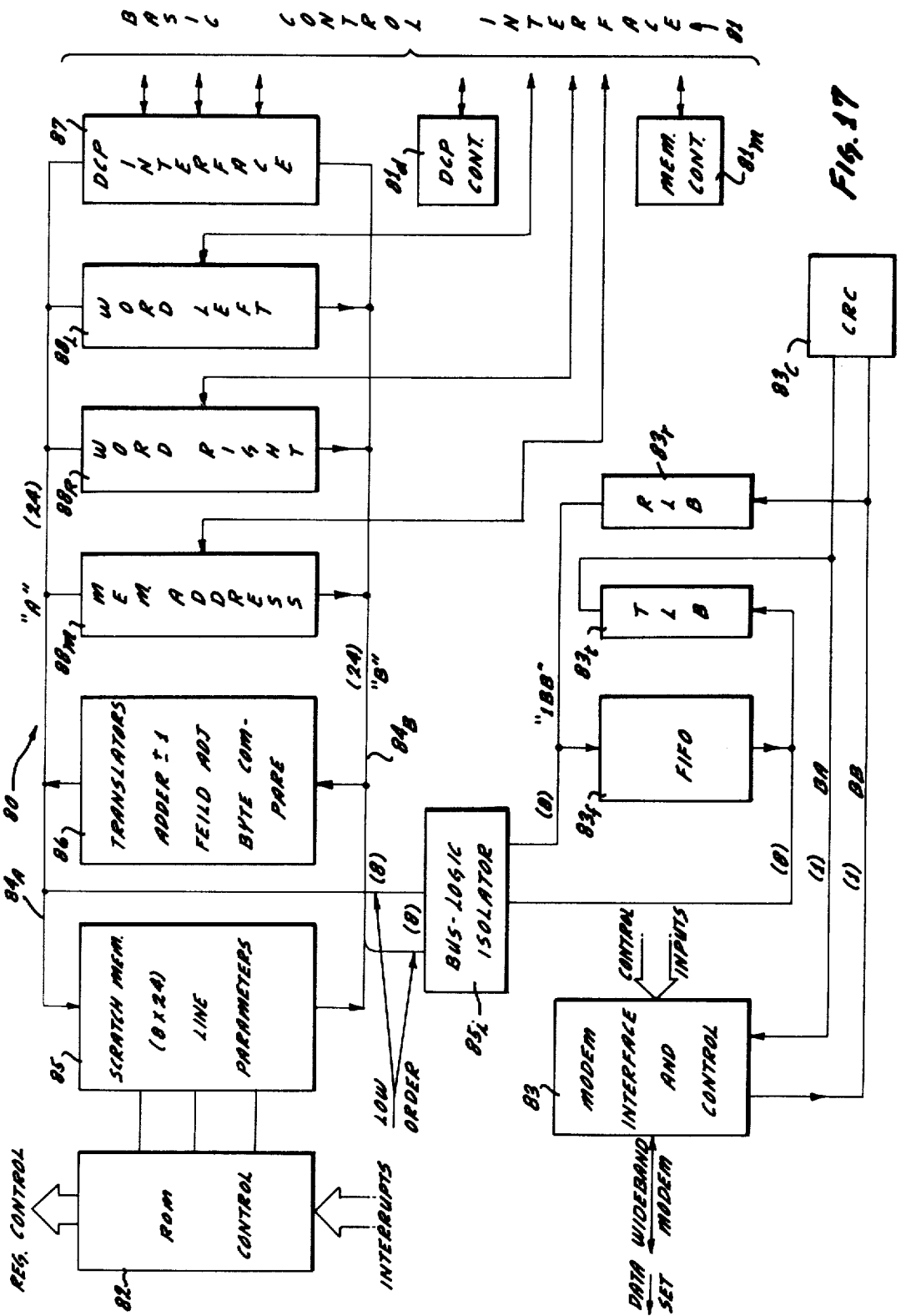

Clock generation within the cluster for asynchronous (start/stop) operation

Store to store controller

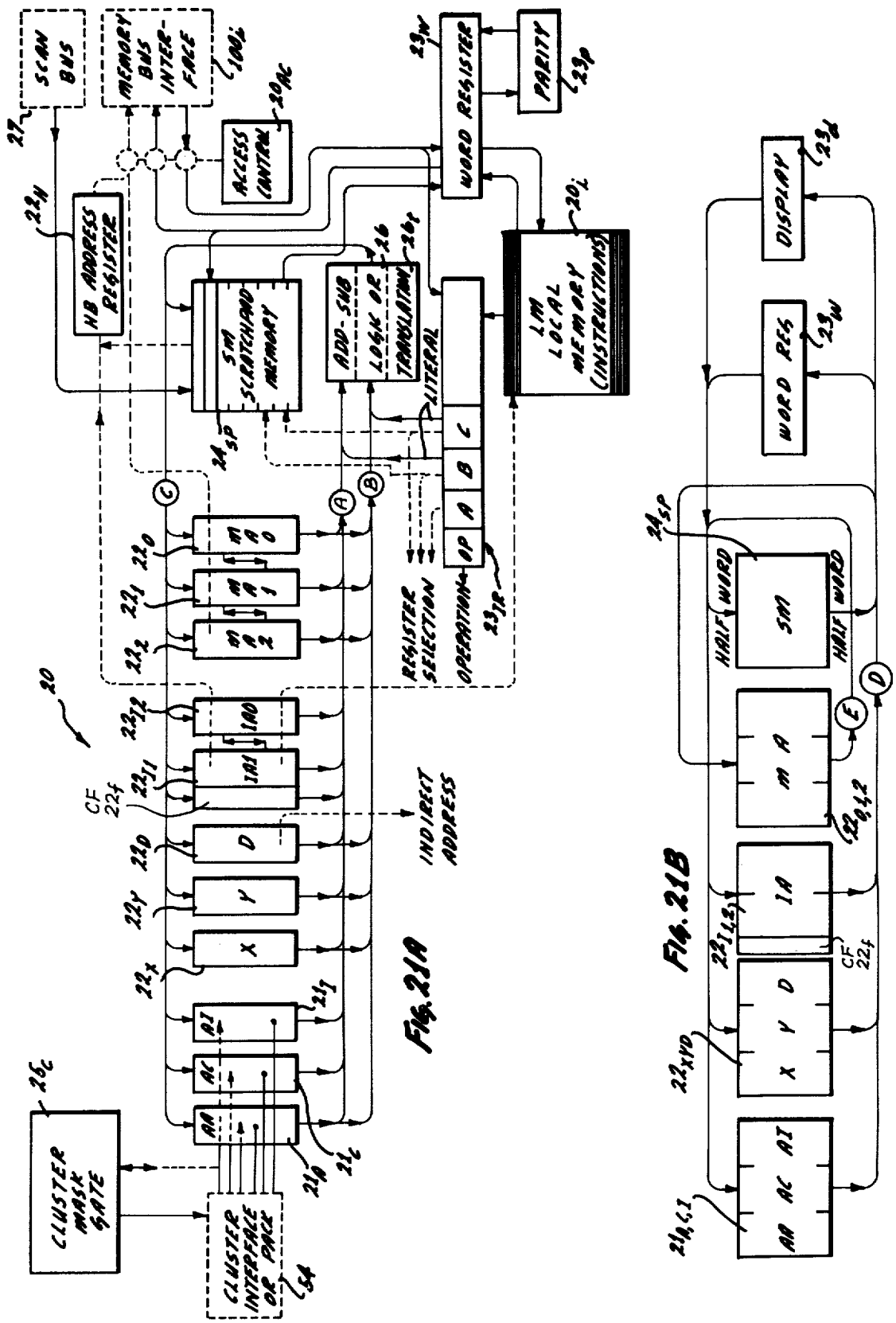

AUTONOMOUS DATA COMMUNICATIONS SUBSYSTEM

This disclosure is a continuation-in-part of Ser. No. 882,213, filed Feb. 28, 1978 (parent application) and which is now abandoned. The parent application is a continuation-in-part of Ser. No. 764,473, filed Jan. 31, 1977 (grandparent application) which application also was abandoned.

TABLE OF CONTENTS

Subject

Abstract
Background
Summary of Invention
Description of Drawings
Description of Preferred Embodiment
Data Comm Command Word
Data Comm Address Word
Data Comm Result Word
Data Communications Processor
Autonomous Mode of Operation on Halt in Main System
System Operation
Front End Controllers
Basic Control Interface Module
Broad Band Controller
Data Comm Disk Controller
Store to Store Controller
Adapter Cluster Module
Program Table A: Selecting Normal or Autonomous Operation
Claims

FIELD OF THE INVENTION

This invention relates to digital communication systems and is particularly involved with the routing and control of data transfers between various types of remote terminals on transmission lines and between remote terminals and a central station.

CROSS REFERENCES TO RELATED APPLICATIONS

This application is related to the following patents or patent applications which deal with similar and related subject matter as follows:

A patent application entitled "Improved Data Communications Subsystem", filed May 15, 1978, by inventors Robert L. Rawlings and Morris G. Watson which issued as U.S. Pat. No. 4,156,907. This patent is included by reference to the present specification.

A patent application entitled "Improved Adapter Cluster Module for Data Communications Subsystem", Ser. No. 932,698, filed Aug. 10, 1978, by inventors Robert L. Rawlings and Ronald D. Mathews. This application issued on Apr. 29, 1980 as U.S. Pat. No. 4,200,930.

BACKGROUND OF THE INVENTION

In recent years there has been a proliferation of communication facilities involving many remote stations and terminals working together with data processors in a network. Generally, such network systems involve a host processor working with a main memory to form a central processing unit, or even a plurality of such central processing units, whereby digitized message data can be transmitted from one station or terminal to another station or terminal within the system, but which, of course, the transmission must be routed, controlled and organized to accomplish the message transfer in an orderly and accurate fashion.

In the field of data communications each data transmission line is connected to a "line adapter" which interfaces the data communications line into the system network. These line adapters may be associated together in a group and called an Adapter Cluster or, that is to say a group or cluster of adapters physically located within one unit. Each line adapter is specifically designed to operate to suit the characteristics of a particular type of remote terminal or station. The line adapter has to take into account factors such as the type of characters transmitted, the coding type of characters, the type of parity that is used, whether transmission is synchronous or asynchronous, the data rate or speed of transmission permissable, and so on, in order to provide that the terminal station connected at the other end of the transmission line will receive the proper type of signals.

Efforts are continuously being made to increase throughput, i.e., the number of message bits that can accurately be transmitted per unit time while minimizing the cost of equipment and facilities for accomplishing this. However, there must also be flexibility, in that provision must be made for wide band high speed transmission lines for high speed transmission of data, in addition to low to medium speed transmission lines which are commonly used since they are cheaper in cost. Further, the accessibility of message data stored in memory must be speedily available in order to obviate delays and increase throughput, and the desirability of concurrent overhead control operations to reduce delays has been recognized.

The field of this invention pertains to data processing equipment which is intended for use with a wide variety of remotely located terminal devices. It has become very desirable to incorporate a data processing system into a network for transmission of data over long distances. The terminal devices involved will generally convert the data from a humanly readable form into binary digital form and transmit this data over wires or microwave relay systems. The terminal devices operate under and generate a wide variety of message code sets, character lengths, bit rates, message formats, communication line disciplines and modes of transmission which present considerable problems to the designer of data communication equipment. The data communication equipment must be able to interface with a wide variety of different types of these terminal devices and should be flexible enough that additional devices can be added or that the terminal devices already used can be changed according to customer preference.

Many of the past and presently existing data communication systems are categorized by those systems which are designed with fixed hardware and are intended to interface only with a specific type of terminal device. This may be economical but is not particularly flexible; other systems have been designed in a modular form to provide options for each of the modules to provide compatibility with certain types of terminal equipment. Because of the differences required among different line disciplines and different types of terminal requirements, it is not usually possible to design a common logic system to perform control functions to cover each of the variety of types of terminals. Among the difficulties involved is that of providing a comprehensive software package to service different configurations and in which the configurations may be desired to be changed from time to time. Thus, in the economics of time and hardware it has often been found necessary to limit the software to one particular type of data communication lines and terminal stations in the system.

With the development of integrated circuits and mini and microcomputers, it is now possible to provide hardware and software of great flexibility in order to handle systems which may have many possible configurations and newly desired configurations in the future. Often it was necessary that a particular program or subroutine be provided for each type of terminal device connected to the system and when new terminals were added to the system, a new subroutine was provided. This activity, however, lead to considerable expense, in addition to eating up long periods of time within the processor.

The present invention overcomes many of the earlier limitations and provides faster throughput of data transfers while permitting reconfigurability and also adaptability to various type of transmission lines and terminal equipment characteristics.

The presently described data communication subsystem has the objective of optimizing the message transference and handling between sending and receiving terminals in a data communication system network and to optimize the data communication transfer as between a computer or computers and the terminals; to provide direct memory access at the message level by providing a larger data communication memory; to provide self-organizing configurations together with a continuous operation system; to provide a temporary storage facility such as disks which can permit the "tanking" of messages in order to provide backup storage for the system; and to provide high-speed, computer-to-computer interface capability.

SUMMARY OF THE INVENTION

A data communication subsystem is used with a host processor and main memory for the routing, monitoring and controlling of data messages between a plurality of remote terminals connected by data transmission lines. The central processing unit, consisting of a host processor and main memory or a plurality of such, works with a plurality of Data Comm Processors which relieve the main burden of the host processor in terms of regulating, routing and controlling the interchange of digital data messages within the system. In turn, each data communications processor is relieved of detailed processing burdens by connection to a basic control module having a group of frontend controllers, each of which handles a specific type of data transfer and line disciplines for handling remote peripheral terminals. Each Data Comm Processor manages a plurality of Adapter Cluster Modules which are essentially groups of line adapters which interface telephone transmission lines to remote terminals or stations. In addition to handling the plurality of line adapters, the Data Comm Processor may also handle a plurality of front-end controllers by means of a front-end controller interface called a Basic Control. The Data Comm Processor through the Basic Control front-end interface may then control the handling of front-end controllers used for: high speed wide band transmission (designated as Broad Band Control); for handling low to medium speed transmissions and called Adapter Cluster Modules; A Data Comm Disk Controller (DCDC) for temporary storage or tanking of messages within the system, and a Store to Store Controller (SSC) for reallocating storage space for data messages in the system. A command block of control and data information is provided for each of the front-end controllers whereby, stored in memory space, there resides: a Data Comm Command Word (DCCW); a Data Comm Address Word (DCAW) and a Data Comm Result Word (DCRW)—this data is called a command block and is initiated by the data communications processor (DCP) which provides an address pointer to each front-end controller which tells the front-end controller where to find the command and instruction data and information data which it will use; in addition the Command Block provides memory space for message data. The Data Comm Processor uses these command blocks to control the source, destination, receipt, timing and transmission of digital data messages being sent between source and destination points within the system, but leaves the execution of the data transfer operation to the specific front-end controller involved.

A singular feature involved is the relationship between the main host computer system and the data communication subsystem, wherein the data communications processor of a subsystem can sense a failure or a halt-load condition of the main host processor. In so doing it will program the data communication subsystem to operate in the "autonomous" or continuous operation mode, independent of the main host processor. During this mode of operation, data which would normally be sent to the main host system would be "tanked" into a disk file memory until such time as the main host system was "on-line" again.

Upon resumption of normal activity on the part of the main host system, this also will be sensed by the data communications processor which will then initiate normal inter-communicating relationships between the data communication subsystem and the main host system.

Thus, the enchanced data communication subsystem, working in cooperation with a main host system, may be seen to consist of the following elements:

(a) A data communication processor (DCP);

(b) A local "autonomous" memory (which may also be called autonomous data communications memory, DCM) which is used in the "autonomous" configuration, that is, when the data communication subsystem operates independently during those times when the main host system is down;

(c) "Non-autonomous memory" which is normally the main host memory used in the non-autonomous configuration, that is when the main host system is on-line and operating normally;

(d) Local internal memory (this is a memory internal to the data communication processor which may be enhanced by add-on memory module and which serves to provide the programs and routines necessary for operation of a data communication processor without the data communications processor having to go through the delays of accessing the main host memory);

(e) The basic control module. This consists of a basic control interface unit and up to four front end controllers. The basic control interface unit also provides connections from the front end controllers to the data communications processor, to the autonomous memory, to the main memory or to other memory resources which may be available.

Under normal conditions, when the main host system is operating on-line, the data communication subsystem is said to operate in the "non-autonomous" mode.

In the "autonomous" mode configuration, when the main host system is halted or down, the data communication subsystem will operate in an "autonomous" self-operating independent mode whereby incoming messages from the peripherals are "tanked" to disk files until the main system is "on-line" again; at the same time, the outgoing messages received by the subsystem from the main host system are stored in autonomous memory (or on disk files) and continue to be transferred to peripherals by the data communication subsystem. An individual local power supply is made available to power the subsystem independently of the main host system. In the "autonomous" mode the data communication subsystem has the capability of tanking and de-tanking data onto the disk files provided.

In the present system, the concept of "data Communication memory" refers to any memory resource having data transfer commands and control data which the data communication subsystem can access in any mode.

DESCRIPTION OF THE DRAWINGS

FIG. 1A is a schematic diagram of a complete system which may be used for a data communication network and which includes a Main Memory, two host processors, a plurality of data communications processors and adapter clusters for interfacing a data communication network involving a magnitude of remote terminals.

FIG. 4A shows a logic diagram of the means by which a data communications processor senses a halt in the main host system;

FIG. 4B is a flow chart showing the interrelationship between the main host system and a data communication subsystem during normal activity and during halt of the main host system.

FIG. 9 shows the interface between the Basic Control and the Broad Band Controller and various alternative configurations which are possible.

FIG. 10 shows the interface between the Basic Control and the Adapter Cluster and alternatively a plurality of Adapter Clusters which can be used to provide the various capabilities of low to medium speed communication lines.

FIG. 11 is a block diagram of the front-end controller known as the Data Comm Disk Controller.

FIG. 12A is a configuration of the data communication subsystem wherein the Store to Store Controller has access to the Main Memory resource and to a local memory resource.

FIG. 16A is a block diagram of the Basic Control module which serves as the interface to the front-end controllers.

FIG. 17 is a block diagram of the basic elements of the Broad Band Controller with specific reference to the embodiment called the Broad Band Synchronous Controller.

FIG. 21A is a block diagram of the Data Comm Processor which is used in the data communication subsystem; FIG. 21B is a simplified block diagram of FIG. 21A.

DESCRIPTION OF PREFERRED EMBODIMENT

Referring to FIG. 1A there is seen the environment of the enhanced data communication subsystem. A series of main processors $100_{p1}$ and $100_{p2}$ work in conjunction with a Main Memory $100_m$ to provide the central processing unit 100 of the data communications system. Input/output processors $100_A$ and $100_B$ interface the Main Memory with groups of data comm processors such as Data Comm Processors $120_{a1}$–$120_{a4}$, and also with the group of Data Comm Processors $120_{b1}$–$120_{b4}$. These Data Comm Processors will be later referred to, in general, as Data Comm Processor 20. Each individual one of these data comm processors can be connected to up to 16 Adapter Clusters and each of the Adapter Clusters (such as $120_{a4\text{-}1}$, $120_{a4\text{-}16}$), have 16 output lines which connect to the data comm network such as $150_{a\text{-}1}$.

Figure 1B:
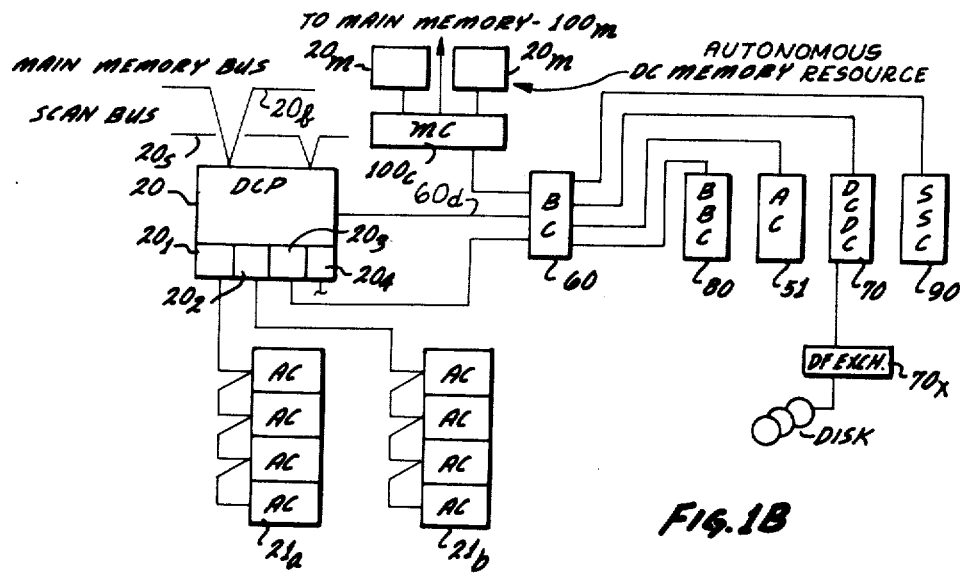
FIG. 1B is a block diagram of a data communication subsystem which may be used within the overall network.

An enhanced data comm subsystem is shown in FIG. 1B. Thus, one of the typical data comm processors which are shown in FIG. 1A can be built and enhanced into a data comm subsystem as shown in FIG. 1B. Here, a Data Comm Processor 20 is shown having cluster-interface hubs $20_1 \ldots 20_4$. Each of the hubs as for example $20_1$, $20_2$, $20_4$, are connected to a group of 4 Adapter Clusters such as $21_a$ and $21_b$ of FIG. 1B. Each of the individual Adapter Clusters is capable of handling up to 16 lines of communication which connect to various parts of a data communications network, as shown in FIG. 1A.

The enhanced data communication subsystem is shown in FIG. 1B whereby one of the cluster interface hubs, such as $20_3$, is connected to an added specialized network of front-end controllers. The interface to the front-end controllers is a Basic Control 60 which interfaces a set of 4 front-end controllers designated as the Broad Band Controller 80, the Store to Store Control 90, the Data Comm Disk Control 70 and a specialized Adapter Cluster unit 51. The Data Comm Processor 20 connects to the central processing unit via a Main Memory Bus $20_b$ and a Scan Bus $20_s$.

A Memory Control $100_c$ connects to the Main Memory $100_m$ in addition to providing a local storage facility for local memory $20_m$ designated as "autonomous" memory. This local memory resource is generally called DCM or Data Comm Memory for certain configurations, even though in the broad sense data communications memory refers to any memory resource available to the data communications subsystem.

The Data Comm Processor 20 is a small special-purpose computer which contains registers and logic in order to perform all the basic functions associated with sending and receiving data or controlling Front-End Controllers which handle the actual data transfer operations. Up to 4 data comm processors can be connected to an Input/Output processor, FIG. 1A, with each Data Comm Processor capable of accommodating from one to two hundred and fifty-six communication lines. A triple-input/output processor system can handle up to 8 DCP's which provide a maximum system with the ability to serve 2,048 data communication lines.

Each communication channel requires an adapter which provides the logic to interface with a Data Set or to connect directly to a communication line.

A basic data communications processor and associated adapters have been described in U.S. Pat. No. 3,618,037 which issued Nov. 2, 1971, and which was also assigned to the assignee of the herein-described system.

The enhanced data communications subsystem provides innovated hardware and procedural combinations which are compatible with presently existing data comm subsystems and central processing units available in the art. The enhancements consist of a much larger and more readily available data comm memory which improves overall system performance by providing direct memory access (DMA) at the message level and which also provides self-arranging configurations with a continuous operation feature. Besides providing the expanded data comm memory feature, the enhanced data comm subsystem provides high-speed, computer-to-computer interface capability by means of Bi-sync and BDLC (Burroughs Data Link Control) procedures, plus data comm to disk tanking of messages and a back-up storage for this system, plus optimization of message handling for the terminal equipment connected to the system. Thus, in FIG. 1B there is provided a data comm memory (autonomous memory) using core and designated $20_m$, in addition to five functional modules which can be housed in a separate data comm cabinet.

As seen in FIG. 1B the Basic Control (BC) 60 provides the basic interface exchange function for the Broad Band Controller (BBC) 80, the Adapter/Cluster 51, the Data Comm Disk Controller (DCDC) 70, and the Store to Store Controller (SSC) 90. Thus, the Basic Control 60 provides for communication with the local autonomous Data Comm Memory $20_m$, the Main Memory $100_m$ and the Data Comm Processor 20.

Control information is exchanged between the Data Comm Processor 20 and the Front-End Controllers by means of a DCP/cluster interface hub $20_3$ (FIG. 1B). Command and data blocks are read or written either from or to the Data Comm Memory $20_m$ via a standard memory interface. The Data Comm Processor 20 will also be seen to have direct connection to the system Main Memory $100_m$ by means of the Main Memory bus $20_b$ and the Scan Bus $20_s$.

Briefly, the front end controllers serve functions as follows: The Basic Control 60 is a unit designed to allow up to 4 front end controllers of any mix to be controlled by at least two data comm processors such as DCP 20. The Basic Control 60 also allows these front end controllers to share one memory interface. The Basic Control 60 also has the function of establishing the request priority and to forward the request to memory. This is done by jumpers which can be changed in the field.

The Broad Band Controller 80 provides a wide band or broad band interface to the data comm subsystems of different types of existing central processing units. The purpose of the Broad Band Controller is to provide a means of high speed transmission without unduly overloading the data comm processor and other system components. Its general use is in network communication between host computers or for bulk message transfers at high transmission rates.

The Adapter Cluster Controller unit 51 provides the data comm subsystem with low and medium speed communications over the common carriers voice-grade networks. Transfer of information between the Adapter Cluster 51 and the data comm memory takes place at the message level. Thus, by means of message optimization for each of the terminals in the network, there can be a more optimal handling of the ready status, the data transmission and reception, the answer/call and the disconnect functions by the minimization of turn around delays and the minimization of data comm processor overhead. The Adapter Cluster Controller 51 allows connection of up to 8 low/medium-speed, full duplex lines. Line adapters are used to provide connectivity from the Adapter Cluster Controller 51 to the interface units for various of the terminals in the data comm subsystem. The poll/select (POLL/SEL), the remote job entry (RJE) and the Burroughs Data Link Control (BDLC) line procedures are supported over lines of 1,200 to 9,600 bits per second (BPS) line speeds for a variety of terminal units in this system.

Figure 14:
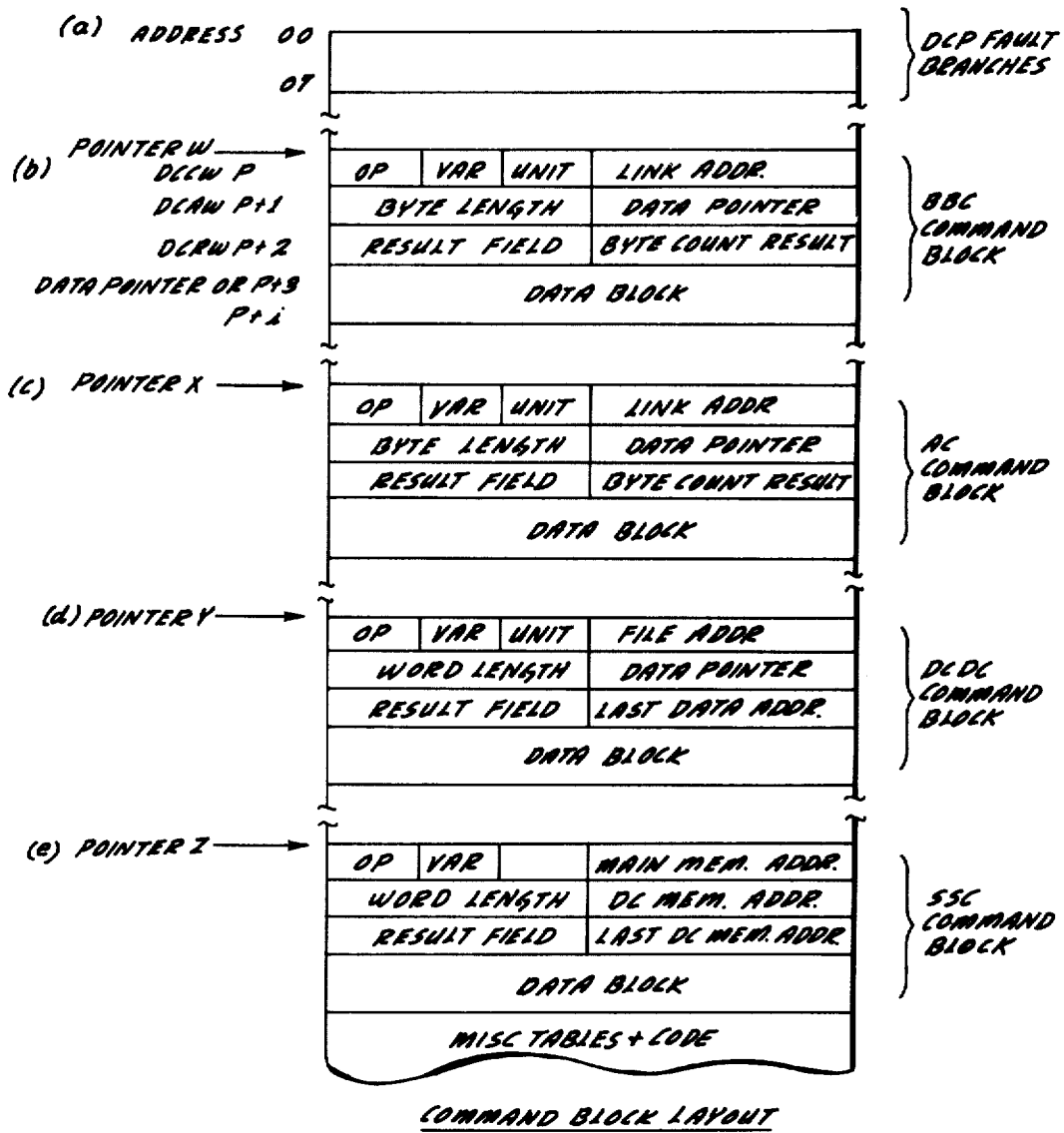
FIG. 14 is a schematic drawing of the Command Block layout which provides, in memory-space, commands and controls for each of the front-end controllers.

The Data Comm Disk Controller 70 provides the function of controlling the storing and retrieval of data comm information on disk. The data comm processor initiates data transfer either to or from the disk by taking an area in memory consisting of a Data Comm Command Word (DCCW), an address word (DCAW) and also a result word (DCRW) in addition to a "data block", (FIG. 14). The Data Comm Processor 20 constructs a 20-bit address which points to the Data Comm Command Word in the memory. Then the Data Comm Processor 20 (via the basic control interface 60) sends a 20-bit memory address of the Data Comm Command Word. This is received by the Data Comm Disk Controller 70 which begins semi-autonomous operation. The Data Comm Disk Controller 70 will read the Data Comm Command Word from memory. The Data Comm Command Word contains an op-code (OP), a variant field, and a file address of the disk to be accessed. The next word in memory is the DCAW which contains the length of the operation, the number of words to be transferred and, optionally, a 20-bit address pointing to the beginning of the data area. After input-output operations are initiated, the Data Comm Disk Controller 70 begins to transfer information from memory to the disk or from disk to memory. After completion of this data transfer, a "result word" is formed by the Data Comm Disk Controller 70 and written into memory.

The Store to Store Controller 90 is used by the DCP 20 to transfer blocks of data (one word at a time) to or from the data comm memory and to or from the system Main Memory $100_M$. This frees the data comm processor to perform other operations. When the SSC 90 completes the operation, it stores a result word in the data comm memory and also notifies the DCP 20 that the operation is completed.

Figure 2:
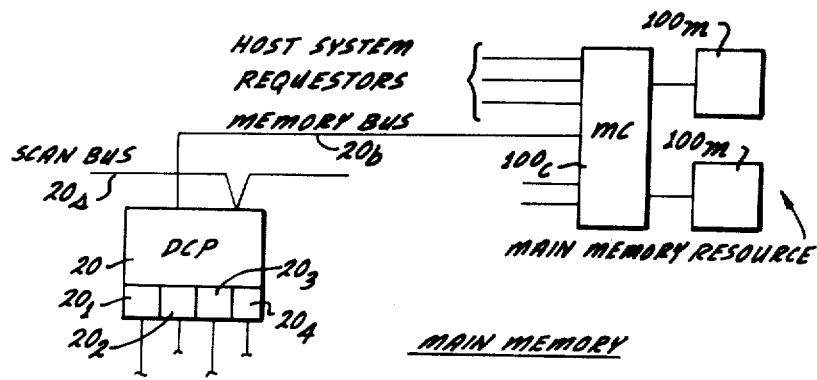
FIG. 2 is a block diagram showing a data communications processor connected to Main Memory.

The basic concept of data communications memory involved here broadly involves the concept that specialized instructions, data and information relating to data transfer operations are stored in a portion of memory space which is readily available to the data communcations subsystem to facilitate data transfer operations. This memory space, dedicated to data transfer operations, may be placed in the main memory $100_m$ (such as seen in FIGS. 1B and 2) or may be in internal memory of the Data Communications Processor such as that shown in FIG. 3 at $20_i$, $20_e$, or the memory space for data transfer operations may be placed in a local memory resource shown in FIG. 4 and which may be designated as "autonomous" memory $20_m$ in that this local memory resource may be used as a data communcations memory for continuous data transfer operations even through the main host system is halted. A local independent power supply P67 shown in FIG. 4 is an independent source of power for the data communications subsystem and provides local power to the Data Communications Processor 20, the basic control 60 and any of its appended Front-End Controllers, and also to the autonomous memory $20_m$ which is often called or noted as a "data communciations memory" since the configuration of FIG. 4 provides the memory $20_m$ dedicated for continuous data transfer operations when the main system is halted or down.

In FIG. 2 the Data Comm Processor 20 is hooked directly into the Main Memory $100_m$ through the Memory Controller $100_c$. The Scan Bus $20_c$ connects to the Data Comm Processor 20.

Figure 3:
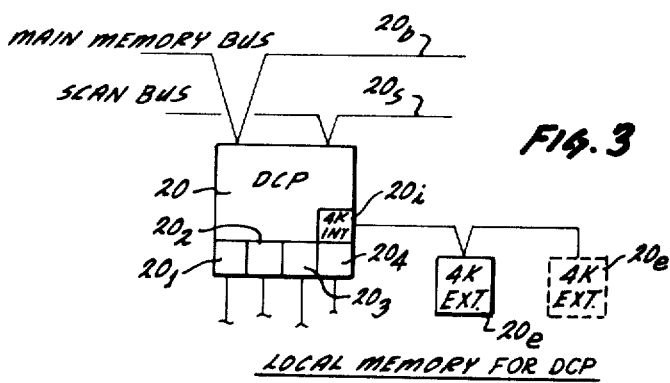
FIG. 3 is a block diagram showing expanded local memory for a data communications processor.

In FIG. 3, the Data Comm Processor 20 is seen to have a 4K internal memory $20_d$, which internal memory is enhanced by added local memory having external memory units of 4K bytes and designated as $20_e$.

Figure 4:
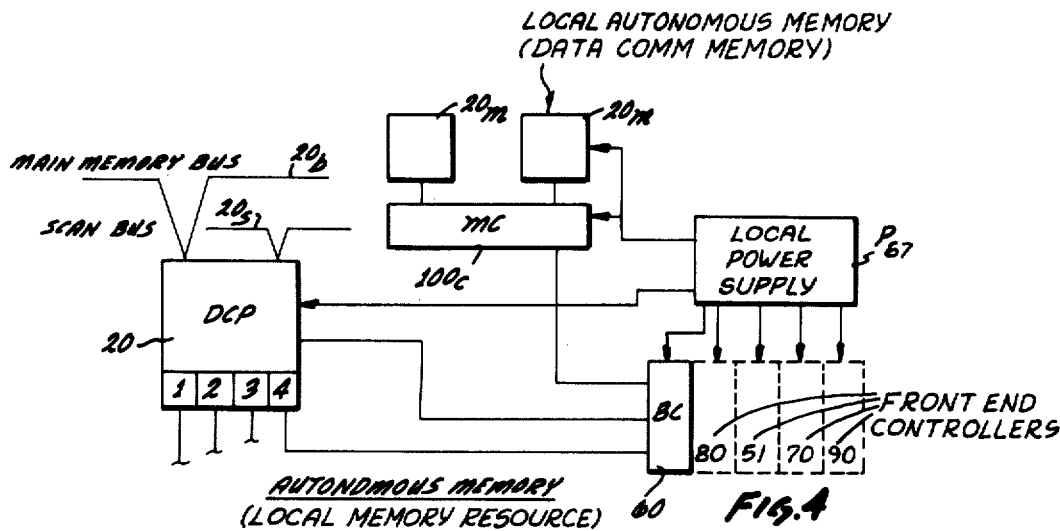
FIG. 4 shows a block diagram of the data communications processor using an autonomous memory and a group of front-end controllers.

In FIG. 4 there is shown the use of "autonomous" memory whereby the local memory resource, consisting of the memory controller $100_c$ and the local storage of core $20_m$, is connected to the Basic Control 60, and which basic control connects to the Data Comm Processor 20. Thus, local memory is provided to the Data Comm Processor 20 by means of the Basic Control 60.

Figure 5:
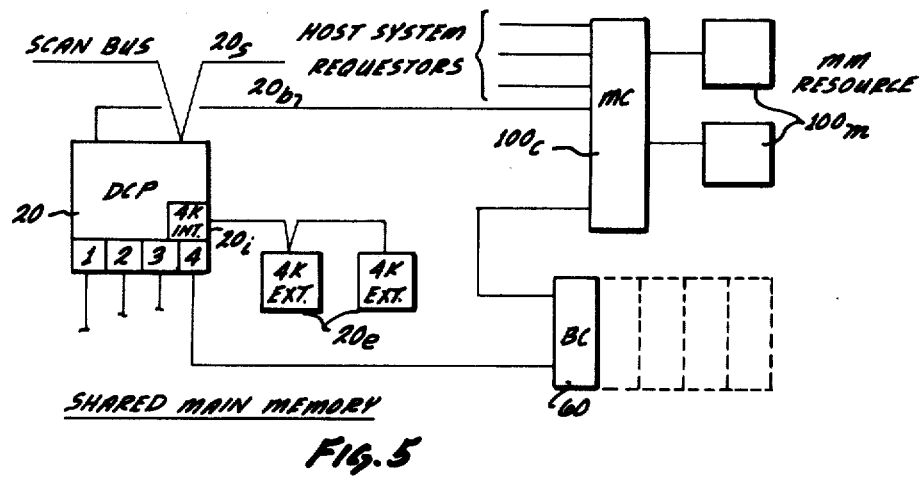
FIG. 5 shows a data-comm processor configuration wherein the data-comm processor and front-end controllers share the Main Memory resource.

FIG. 5 illustrates a configuration permitting the sharing of main memory. Here the Basic Control 60 has its own private line to the main memory resource $100_m$ via the Memory Controller $100_c$. Likewise, the Data Comm Processor 20 has its own line to the main memory resource $100_m$. Thus, the main memory is shared by the Data Comm Processor 20 and the Basic Control 60 which services also the front end controllers.

Figure 6:
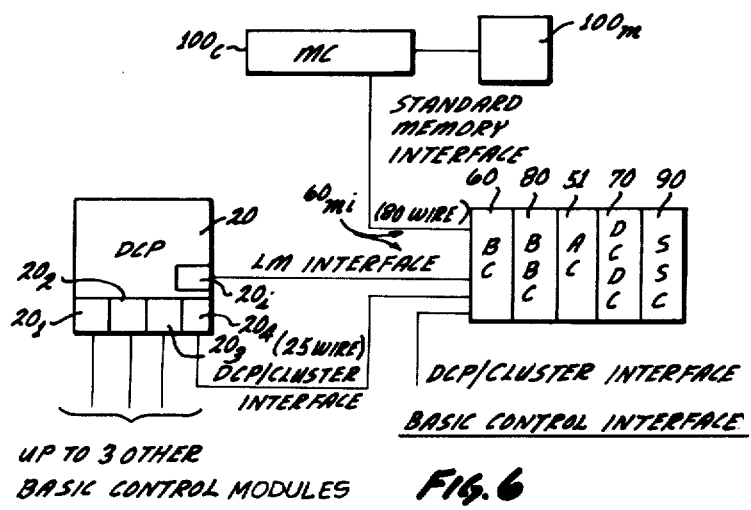
FIG. 6 shows a configuration wherein the data-comm processor uses one of its hubs to interface a Basic Control to a series of front-end controls, which controls have a channel to the Main Memory of the system.

The Basic Control 60 is a key element in this system for handling the front end controllers. The Basic Control 60 is the interface exchange element between the Data Comm Processor 20, the data comm memory and the four front end control modules. The DCP/cluster interface hub such as $20_4$ allows the receipt of a signal designated as CAN (cluster attention needed-interrupt). The DCP/cluster interface hub also provides the means for control initiation by one or two DCP's and allows the receipt of the CAN response upon command completion by the control. The DC memory interface, shown in FIG. 6, provides a standard "48 data bit, 3 tag bit, 1 parity bit, 20 address bit" memory interface capability for the Basic Control 60. Thus, this allows memory access to all areas of storage. The standard interface is multiplexed/demultiplexed for up to four controls by the Basic Control 60. As seen in FIG. 6, the Basic Control 60 can handle one SSC 90, one DCDC 70, one BBC 80 and one Adapter Cluster Controller 51 (a total of four controllers). Each hub $20_1$, $20_2$, and $20_3$ of the Data Comm Processor 20 could support a separate Basic Control 60 or each hub could handle up to four Adapter Cluster Controllers 51 individually.

Figure 7:
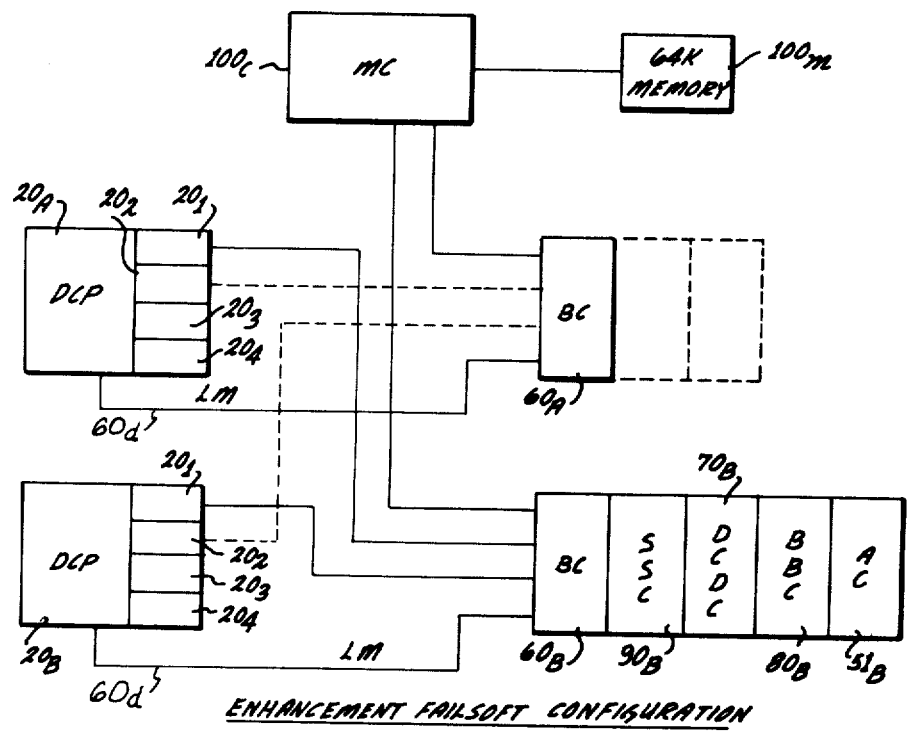
FIG. 7 is a block diagram of a configuration wherein two data-comm processors are used with two sets of front-end controllers to provide a failsoft configuration which would permit operation even though one of the data-comm processors should become inoperative.

In addition to allowing data comm processor interrogation of the control register functions/states through the DCP/cluster interface, the Basic Control 60 also provides a failsoft interface capability by allowing connection to two DCP's and a common memory as seen in FIG. 7. The code and the data areas of the DC memory (in this case $100_m$) are shared by both Data Comm Processors $20_A$ and $20_B$. In FIG. 7 the DC memory address of the command block (FIG. 14, described hereinafter) is transferred from the Data Comm Processor, such as $20_A$, to the specified control via the DCP/cluster interface hub such as $20_1$. Command words, within this command block previously built by the data comm processor, are fetched by the front end Controller from DC memory via the standard memory interface.

In contention for DC memory access by various front end Controllers, priority is handled by the Basic Control 60. With a plurality of front-end controllers, FIG. 16A, normally unit 0 has the highest priority and unit 3 would have the lowest priority. However, each of the four possible basic control locations might be assigned priority via jumper option.

Generally the setting of various controls requires establishing priorities such that the highest priority in the Basic Control 60 is given to the Broad Band Controller 80 and the Adapter Cluster 51—while the lowest priority would go to the Data Comm Disk Controller 70 and to the Store to Store Controller 90.

Figure 8:
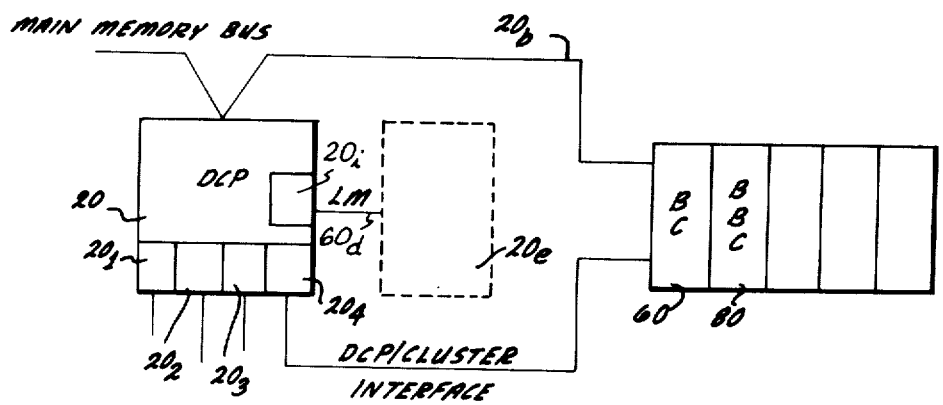
FIG. 8 shows a data-comm processor configuration where there is provided an expanded local memory in combination with a series of front-end controllers connected to one hub of the data-comm processor.

When the Basic Control 60 is connected as shown in FIG. 8, then the basic control allows the Broad Band Controller 80 access to main memory via the main memory bus $20_b$. As seen in FIG. 8, the local memory, as $20_e$, is associated with the Data Comm Processor 20. All running code access to the main memory is handled by the Data Comm Processor 20. The local memory $20_e$ may be extended to a full 16K words with the connection of the extended LM cabinet $20_e$ via the data comm processor-local memory interface.

The interfaces and configurations as between the Basic Control 60 and the Broad Band Controller 80 are shown in FIG. 9. The Broad Band Controller 80 provides the data comm subsystem with the capability to communicate with other systems or the common carriers wide band interface by using either binary synchronous Bi-Sync or by using Burroughs Data Link Control (BDLC) line procedures. Various standard sets having line speeds ranging from 19.2K up to 1.344 M bits per second can be handled by the data comm subsystem.

In order to allow complete message transmission and reception without interrupting the Data Comm Processor 20, a linking mechanism in the command word retrieves the next command block from the DC memory and the subsequent operation begins. Completion status of an operation for each linked command is sent to the Data Comm Processor 20, dependent on variant conditions in the command block and exception conditions in the result status. Each bi-synchronous control or each BDLC control provides the data comm subsystem with one high-speed full duplex line as per FIG. 9.

Referring to FIG. 10 there is seen the interface between the Basic Control 60 and various configurations which use the Adapter Cluster Controller 51. As seen in FIG. 10 an Adapter Cluster Controller 51 can provide eight low to medium speed lines or can be configured to use two adapter clusters for 16 lines or configured with four adapter clusters to provide 32 low-medium speed lines.

FIG. 11 shows the interface between the Basic Control 60 and the Data Comm Disk Controller 70. The Data Comm Disk Controller 70 provides the data comm subsystem with a "disk tanking" facility for augmenting the data comm memory and allowing the receipt and accumulation of requests and messages in the event of a system failure. Additionally, the Data Comm Disk Controller 70 will alleviate the requirement to utilize only the main memory resource for any backed-up output messages. A failsoft configuration is provided whereby the interface to the disk file system has two ports to provide failsoft configuration in the event that a failure occurs in one of the disk file systems. Thus, the Data Comm Disk Controller 70 interfaces with two disk file exchanges $70_{X1}$ and $70_{X2}$. These disk file exchanges are controlled by the disk file control $70_c$ which interfaces with the main processor system. The disk file exchanges interface with two storage selectors $70_{e1}$, $70_{e2}$, which connect to disk file storage facility $70_{d1}$ and $70_{d2}$. The failsoft capability allows the data comm to disk tanking to take place over an alternate path to the disk subsystem in the event of an exchange failure.

The Store to Store Controller 90 provides the data comm subsystem with a direct memory transfer capability between the data comm memory, the host system and the main memory. It can operate asynchronously from the main system, and the Store to Store Controller 90 is used in autonomous data comm subsystems in order to augment data block transfers to a host system. Since data integrity has been established in the data comm memory, then initiation of subsequent block transfers to main memory $100_m$ allows the Data Comm Processor 20 to perform other operations. For example, the Data Comm Processor 20 may perform a block transfer retry, dependent on any Store to Store Controller 90 "exception-conditions" in the data comm memory.

Figure 12B:
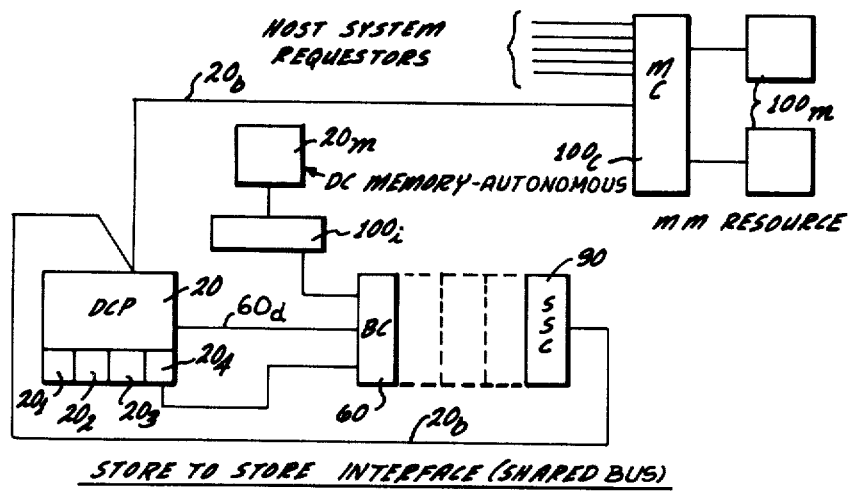
FIG. 12B is a configuration of the data communication subsystem wherein the Store to Store Controller shares the Main Memory resource with the data-comm processor.

Memory control hub limitations may preclude separate main memory bus connections for both the data comm processor and the store to store controller in autonomous configurations. As seen in FIG. 12B, the Store to Store Controller 90 may share the Data Comm Processor bus $20_b$ in order to permit transfers from the data comm memory $20_m$ to the main memory $100_m$. FIG. 12A shows the configuration where the Store to Store Controller 90 has a separate channel to the main memory $100_m$ rather than sharing the data comm processor bus as was seen in FIG. 12B.

Figure 13:
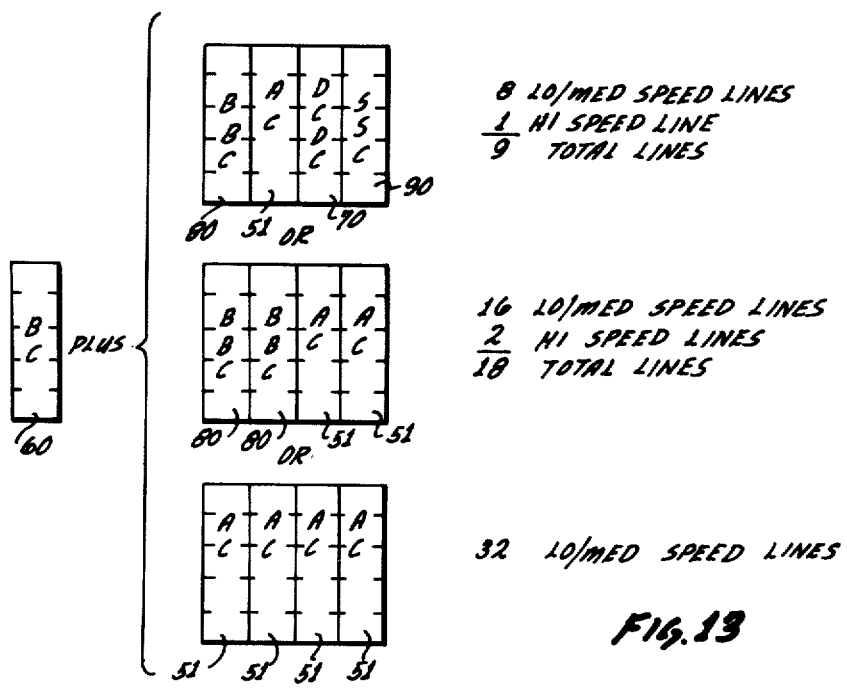
FIG. 13 is a schematic diagram of alternative methods of organization of the Basic Control which is used as an interface to various alternative arrangements of front-end controllers.

FIG. 13 shows a typical example of a modular configuration which can be used with the enhanced data comm subsystem. As seen in FIG. 13 a Basic Control 60 provides the interface to a first module containing a broad band controller, an adapter cluster, a data comm disk control and a store to store controller to provide, for example, nine lines.

Alternatively, the Basic Control 60 may provide an interface for a second module of two Broad Band Controllers 80 and two Adapter Clusters 51 to provide a total of 18 lines. Or alternatively, the Basic Control 60 may provide an interface to a module composed of four Adapter Clusters 51 in order to provide 32 low/medium speed lines.

FIG. 14 indicates a portion of the data comm memory which is used as a command block.

This memory space is laid out such that the Data Comm Processor 20 can supply a 20-bit address pointer, such as pointer W, pointer X, pointer Y, and pointer Z, to access particularized command block areas respectively for the Broad Band Controller command block, for the Adapter Cluster command block, for the Data Comm Disk Controller command block, and for the Store to Store Controller command block.

Figure 15A:
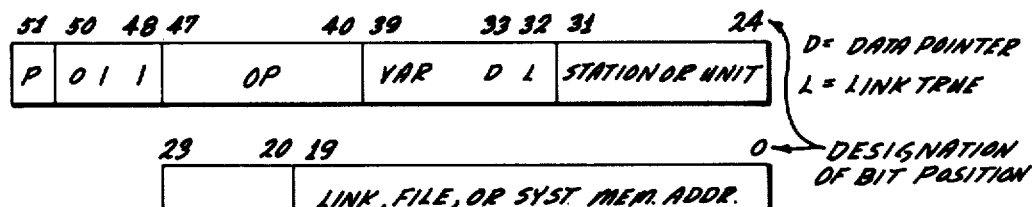
FIGS. 15A, 15B and 15C are schematic drawings of command words, address words and result words used in the data communication subsystem.
Figure 15B:
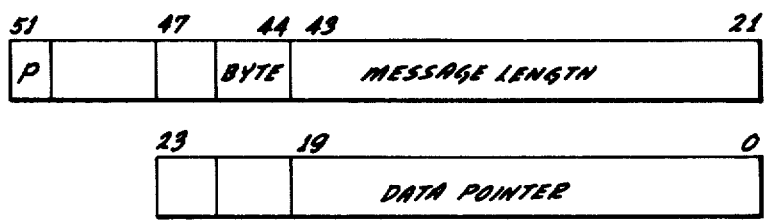
Figure 15C:
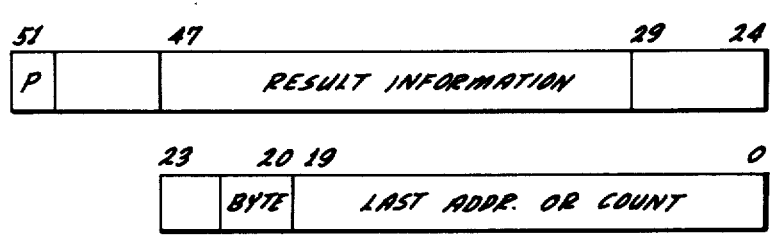

FIG. 15A shows the structure of the Data Comm Command Word (DCCW); FIG. 15B shows the Data Comm Address Word (DCAW); while FIG. 15C shows the Data Comm Result Word (DCRW).

The Data Comm Processor 20 places command blocks in the data comm memory. These command blocks are accessed by either the Broad Band Controller 80, the Adapter Cluster 51, the Data Comm Disk Controller 70 or the Store to Store Controller 90. Through the interfaces which are provided by the Basic Control 60, these controls are initialized by the Data Comm Processor 20 which supplies a 20-bit address pointer through the DCP/cluster interface. The Front-End Controllers retain this pointer during execution of the command block.

Command blocks can also be linked to each other by a link address feature. This permits the Front-End Controllers to begin execution of a subsequent command block while a result CAN (Cluster Attention Needed) is being serviced by the data comm processor for the command block just completed. Thus, in addition to allowing faster turn around for command block initiation, the linking feature permits DCP/control simultaneous processing and reduces the control idle time. Since a 20-bit command block address pointer is used, no absolute areas of data comm memory need be specified, with the exception of the fault branch address reservations for the Data Comm Processor 20.

The command block consists of three control words and a variable number of data words. The data comm words, shown in FIGS. 15A, B and C involve:

(1) Data Comm Command Word (DCCW)
(1) Data Comm Address Word (DCAW) (1) Data Comm Result Word (DCRW) (n) Data Words (which have a reserved portion in each command block as shown in FIG. 14.

Once the front end Controller (FEC) has received the 20-bit pointer (P) through the DCP/cluster interface, the control (FEC) uses P to address the data comm memory. In FIG. 14 a typical sequence would summarize the usual control operation:

1. The DCCW is read from P.
2. The DCAW is read from P plus 1.
3. The Data Transmission/reception begins at P plus 3 and continues until P plus i, to fill or exhaust the Data Block, FIG. 14.
4. The DCRW is written into P plus 2 upon completion, and a CAN is then sent to the DCP.
5. The Controller can use the Link Address as a new P to begin execution of the next command block or to terminate the operation.

Data Comm Command Word

The Data Comm Command Word provides each of the front end controls with the initial operation code and variants as can be seen in FIGS. 15A, B and C. The basic operations performed are READ (or RECEIVE), WRITE (or TRANSMIT) and TEST plus variant options for each. In addition to specifying a valid control type (BBC, AC, DCDC, or SSC) in the operations code, the Data Comm Command Word requires a TAG field equal to "3" to successfully initiate control operation.

The address field of the Data Comm Command Word provides the control with the following information:

1. Command Link Address (BBC or AC)
2. Disk File Address (DCDC)
3. System Memory Address (SSC).

Data Comm Address Word

The Data Comm Address Word is used to provide the control with data block length and location in the data comm memory as may be seen in FIG. 15B. The message length is described in terms of words for the Data Comm Disk Controller and the Store to Store Controller. The Broad Band Controller and the Adapter Cluster message length is specified by bytes. The data pointer portion of the Data Comm Address Word of FIG. 15B defines the beginning address of the data block and provides the option of specifying a non-contiguous data block. That is, the data block may be contiguous with the Data Comm Command Word, Data Comm Address Word and Data Comm Result Word (at P plus 3) or be located outside this memory vicinity (at the data pointer).

Data Comm Result Word

The Data Comm Result Word is used by the Controller to store operation result information in the data comm memory. In addition to providing the Data Comm Processor with detailed result status, the Data Comm Result Word specifies the last address of the current operation or the byte count of the data transmitted/received.

Data Comm Processor

A diagram of one preferred embodiment of the Data Comm Processor 20 is shown in FIG. 21A. The Data Comm Processor is an auxiliary processor which performs the task of answering and terminating calls within the system, of observing formal line control procedures, of polling repetitiously and handling all the routine message formatting for the information received and for the information transmitted on the many data communication lines within the network.

The Data Comm Processor 20 has access to the system's Main Memory $100_m$ (FIG. 1A) along with the other main frame units such as the processors $100_{p1}$, $100_{p2}$ and units such as a peripheral control multiplexor (not shown). The memory allocation for a Data Comm Processor is controlled by the interaction of two programs which are used and called the Master Control Program and the DCP Programs. This interaction allows blocks of information to be exchanged. In operation, a data exchange occurs when the host Processor, as $100_{p1}$ or $100_{p2}$, initiates a DCP transaction, typically by setting an "attention needed" condition in the Data Comm Processor, and when the DCP finishes a transaction, which is typically indicated by an "interrupt" condition being set in a multiplexor.

The Data Comm Processor 20 obtains its program from the system's Main Memory $100_m$ or from an optional local memory ($20_i$, $20_3$) such as indicated in FIG. 3. The use of a local memory reduces instruction fetch time and thus increases the through-put of the DCP.

The Data Comm Processor 20 of FIG. 21A is an elementary store-to-program computer which contains a small array of inter-communicating registers, a simple arithmetic-logical unit, an 8-word scratch pad memory and an optional local memory. The instruction repertoire consists mainly of two and three address instructions which operate on 8-bit bytes in a single clock time. The byte organization fits into a basic half-word (three byte) structure which permits efficient half-word transfers.

Registers

The bits of a 52-bit word are numbered 0 through 51 from right to left with bit 0 being the least significant bit. Bit 47 is the most significant bit of the information part of the word while bits 48, 49, and 50 are "tag" bits. Bit 51 is word parity bit, generally using odd parity.

The fields are designated such that a particular field in a register "R" is identified by using the nomenclature R[m:n], where little m denotes the starting bit position of a field extending n bits to the right.

Thus, D[6:4] would identify a four bit field of register D which consists of bits 6, 5, 4 and 3.

The 48-bit information part of the 52-bit word is divided into six 8-bit bytes. The bytes are designated 0 through 5 from left to right (however they are addressed by octal digits 1 through 6) and the tag field would be designated as byte 6.

The full word is divided into two 24-bit half-words. The L (left) half-word is comprised of bytes 0, 1, and 2. The R (right) half-word is comprised of bytes 3, 4 and 5. The following Table I shows the bit numbering (a), the designation of fields (b), the byte designation (c) and the half-word designation (d).

TABLE 1

(a) Bit Designation

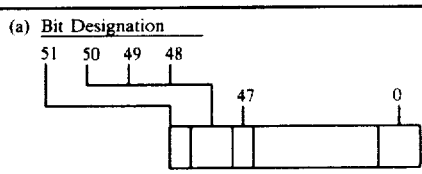

(b) Designation of Fields

Example: D register

TABLE I-continued

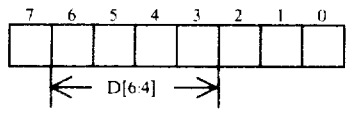

D[6:4] identifies the four-bit field consisting of bits 6,5,4, and 3.

(c) Byte Designation

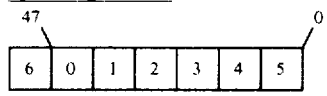

(d) Half-Word Designation

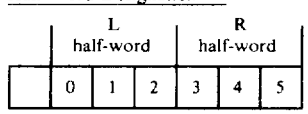

Referring to FIG. 21A there are three Adapter Interface Registers which are designated $21_A$, $21_C$ and $21_I$, each of which have a size of 8-bits. The Adapter address register, AA, contains an adapter designation. An Adapter is activately designated only during the execution of an Adapter Read, Adapter Write or Adapter Interrogate instruction. When the Adapter Cluster 51 (FIG. 1A) is used, then AA[7:4] contains the cluster number and AA[3:4] contains the adapter number within the cluster.

The AC register $21_C$, called the Adapter Control register, contains bits which typically describe the information on the Adapter Interface. For example, a particular code in the AC register may signify that the AI register contains a data byte whereas other codes may identify AI register contents as control information of various types.

The AI register, or Adapter Information register $21_I$, is the primary information register for the Adapter Interface; it can contain either data or control information.

There are three general purpose registers designated $22_X$, $22_Y$ and $22_D$ which are normally called the D,Y and X registers. Each register has a size of 8-bits. The D register is used as an address register when an indirect destination address is called for, otherwise its use is unrestricted. The Y register contains the indirect source address when one is called for, but the Y register is not used as an address register. When an indirect source address is used, the contents of Y register are copied in the instruction register, $IR_{23IR}$. The X register is referenced in a Branch Relative instruction, otherwise its use is unrestricted. Two Instruction Address Registers designated $22_{I1}$ and $22_{I2}$ are provided having a size of 8-bits each. These registers, labeled IA1, IA0, are concatenated to hold the instruction address. These registers either address DCP local memory directly or they provide the relative part of an address for the host system's main memory. The most significant bit in register IA1 determines which memory the address applies to. The least significant bit in register IA0 selects one of the two half-word instructions in a full instruction word. The two instruction registers are counted up automatically as each instruction is loaded. They are loaded by Branch Instructions and they can also be addressed like any other register. If an IA register is addressed as a destination, then a new instruction fetch occurs after the current instruction is completed.

As seen in FIG. 4A and 21A, there is a comparison register (CF) $22_f$ which is connected to the C bus. The comparison register is an 8-bit register and contains 8 special control flip-flops. Among these flip-flops are compare bits designated CF1 and CF0. The CF (control flip-flops) flip-flops are set by the result of arithmetic and logical instructions to denote conditions which control the conditional branch operations. These conditions involve comparisons of "greater than" or "less than" or "equal" and are further described in Tables 2-1 and 2-2 of Burroughs Reference Manual 1054384, copyright 1970, Burroughs Corporation, Detroit, Michigan, and entitled Data Communications Processor.

Bit position 7 of the comparison register is particularly designated to indicate the condition of flip-flop 123 which is the main System Attention Needed (SAN) flip-flop. This is set by the scan-out of the signal "Set Attention Needed". It is cleared when it causes a branch in the instructions which it explicitly tested.

The most significant for "normal or autonomous" operations control are the flip-flops designated 122 (bit position 6) and 123 (bit position 7). As indicated heretofore, the 123 flip-flop is the designator for the main System Attention Needed signal. The 122 flip-flop (also see FIG. 4A) is the indicator (together with 123) that the main system is halted or down, after being reset twice on two 2-second intervals and again being found in the "set" condition when the program is executing a BRAN (branch) or ARWN (adapter read when needed) instruction, discussed hereinafter.

The host system address register, HB $22_H$, has a size of 20-bits and contains the actual instruction address for instruction words in the main system's main memory. The actual instruction address is the sum of the relative address in the IA registers and the instruction base address (IBA).

In FIG. 21A there are two full-word registers, these being the Instruction Register, $23_{IR}$, and also the Word Register, $23_W$. Each of these registers has a size of 52-bits. The instruction register holds a full instruction word containing two 24-bit instructions. It is loaded from either the DCP local memory such as $20_m$ of FIG. 1B or from the system's Main Memory $100_m$. The Word Register $23_W$ is a memory buffer register for data words. It is used for transferring full words to or from the Scratchpad Memory $24_{sp}$, the DCP Local Memory $20_m$ and the host system's Main Memory $100_m$ through the Main Memory Interface of FIG. 21A designated as $100_i$. The parity bit in the Word Register [51:1] is automatically generated and checked by a parity checker $23_p$.

The Instruction Register $23_{IR}$ is built to contain a full instruction word of 52-bits which is loaded in the instruction register on a fetch cycle. The instruction word contains two 24-bit instructions. An instruction word must have odd parity and the tag field must have the bit configuration IR [50:3] equal 110. If these conditions are not fulfilled, the instruction word is detected as invalid and the instructions are not executed. In the Instruction Register $23_{IR}$, there are shown several different fields designated as OP, A, B, C. The OP field contains the basic operation code. The A field may be an extension of the OP field or it may contain a register address. The B field typically contains the address of a source or it may contain a literal. The C field typically contains the address of the destination, or it may also contain a literal.

There are three memory address registers each having a size of 8-bits each. These memory address registers are labeled $MA_0$, $MA_1$, and $MA_2$, with respective designations $22_0$, $22_1$ and $22_2$. These three registers are used for addressing the host system's Main Memory $100_m$ and the DCP Local Memory $20_m$. The three registers are always used in the half-word transfer operation and may also be used in the full-word transfer operation. The MA registers receive a half-word selected from a variety of sources, and simultaneously the Memory Address registers are the source of a half-word that is sent to one of several destinations. These MA registers can be concatenated in various ways by means of "shift right MA" instructions in which their contents are shifted right. The MA registers can be also used individually as general purpose registers.

Figure 20A:
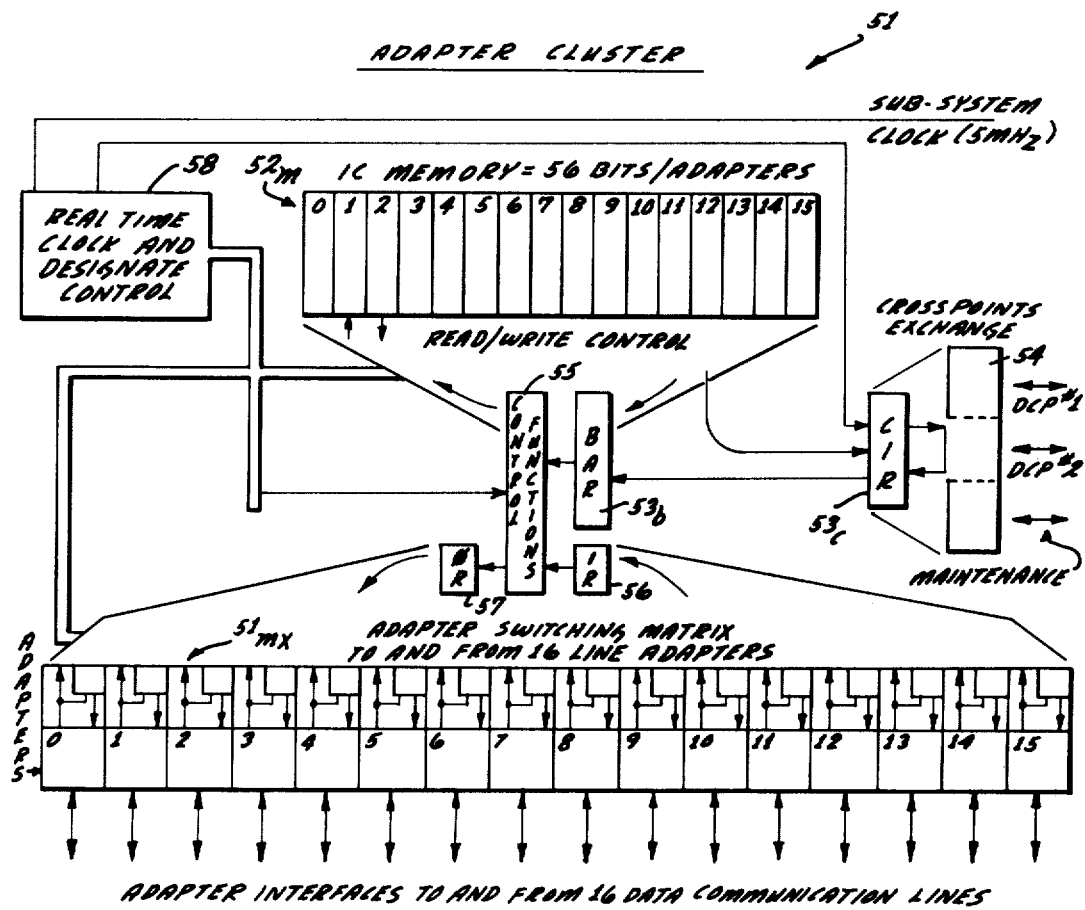
FIG. 20A is a block diagram of the front-end controller known as the Adapter Cluster.

The Cluster Mask Gate $25_c$ contains 16 independent flip-flops, or one for each of the 16 possible Adapter Cluster units of FIG. 20A. The "1" output of each Cluster Mask flip-flop gates the "Cluster Attention Needed (CAN)" signal from the corresponding Adapter Cluster. If a Cluster Mask flip-flop is off, the Data Comm Processor 20 does not detect a "Cluster Attention Needed" signal from that Adapter Cluster. In systems in which an Adapter Cluster is connected to two Data Comm Processors, the corresponding Cluster Mask flip-flops in each Data Comm Processor can be loaded so that only one Data Comm Processor responds to a "Cluster Attention Needed" signal. One of the 16 possible Adapter Clusters or pack units is shown by the designation 54.

The Scratchpad Memory $24_{sp}$ is an integrated circuit memory which utilizes memory cells and it contains eight 52-bit words. The information can be read out or stored in full-words, 24-half-bit words, or individual 8-bit bytes. The read-out is non-destructive; Read and Write are independent and can occur simultaneously in different locations. The Scratchpad Memory $24_{sp}$ is intended to be used for fast-access temporary data storage. The Scratchpad Memory locations are like flip-flop registers except that the same location cannot be used both as a source and a destination when the result is a complementary function of the source operand. If the same byte is improperly addressed both as a source and as a destination, an invalid operator fault interrupt will occur.

In FIGS. 1B and 4 the Local Memory, LM, or autonomous memory $20_m$ is an optional word organized memory. This local memory when used for data communication operations is generally called a DCM. A basic unit of the local memory has a capacity of 4,096 52-bit words. In FIG. 5 "local" memory is shown as $20_i$ and $20_e$ as part of the Data Communications Processor 20. A single full-word is either read or stored on each separately ordered access cycle. The read-out is non-destructive. The words are stored with odd parity and the parity is automatically checked after read-out. A parity error will create a "fault interrupt". The Local Memory $20_m$ can hold both data and instruction words with a primary use generally for instruction storage. An Access Control unit $20_{ac}$ is used in the Data Comm Processor for accessing local memory. Any access request is interlocked until is is released by an access obtain signal from the addressed local memory module. If the access obtained signal is not received within 8 clock periods, an invalid address fault interrupt will occur. Because the access time to local memory is less than the access time to system Main Memory $100_m$, the use of a local memory increases the processing capacity of the Data Comm Processor. The local memory is also expandable for larger memory storage.

A unique and singular aspect of the enhanced data communication subsystem in its relationship to the main host system is the provision whereby the data communication subsystem can continuously operate in an "autonomous" mode independently of the main host system should the main host system fail or be placed in a halted condition.

The relationship of the data communication subsystem may be illustrated with reference to a main host processor system such as the Burroughs B 6700 system which is described and delineated in a reference manual entitled "Burroughs B 6700 Information Processing Systems", Reference Manual 1058633 published by the Burroughs Corporation of Detroit, Michigan 48232, and Copyright 1969, 1970, 1972. This system provides for Input/Output Processors and Data Communications Processors to be interconnected to the main host system. The Input/Output Processor of the main host system provides a Scan Bus which is the communication link between the main host system and various subsystems, such as the data communication subsystem. The Scan Bus consists of 20 address lines, 48 data information lines, 1 parity line and 11 control lines. Input/output processing or data communication operations are initiated via the Scan Bus.

Another interface between the main host system and subsystems such as the data communication subsystem is a Memory Bus. This bus contains 20 address lines, 51 data (information) lines, 1 parity line and 8 control lines. It transmits information bi-directionally between the main memory and the host processor's "hard registers" A, B, C, X, Y, and P which are described and discussed in the above referenced manual.

The Scan Bus provides an asynchronous communication path between B 6700 processors and Data Communication Processors. Scan operators are used to communicate between the main processor and the I/O subsystem, the data communication subsystem or other subsystems, via the Scan Bus. The "Scan-In" functions to read information from the subsystems to the "top-of-stack" register and the processor. The "Scan-Out" functions perform the operation of writing information from the "top-of-stack" registers in the processor to a particular subsystem such as the data communication subsystem.

The "Scan-In" (SCNIN) uses the A register to specify the type of input required and the Input/Output Processor that is to respond or the particular Data Communications Processor that is to respond. The input data is placed in the B register. The A register is empty and the B register is full at the completion of the operation.

Scan-Out places bits 0 through 19 of the "top-of-stack" word on the Scan Bus Address Line and also places the second stack word on the Scan Bus Information Lines; and "invalid address" interrupt results if the address word is invalid. The A and B registers are empty upon successful completion of a Scan-Out.

The Data Communications Processor of the data communication subsystem is a special purpose processor. It controls a group of Front-End Controllers which handle the transmitting and receiving of messages over the various types of data communication lines connected to peripheral terminals. In the enhanced data communication subsystem the major part of data-transfer functions are unburdened from the Data Communications Processor by the use of a group of Front-End Controllers which handle the detailed programs and routines necessary to handle data transfer operations between sending and receiving peripheral units.

The Data Communications Processor is a stored program computer which can obtain its program instructions either from the B 6700 main memory or from an optional local internal memory or more preferably a local "autonomous" memory as $20_m$ (FIG. 4, 21A) sometimes called a Data Communications Memory. Through the use of the local Data Communications Memory the completion for space in main memory is reduced and the throughput of the Data Communications Processor and Front-End Controllers is significantly increased due to the reduction in instruction fetch time.

In addition to the elements in structures herein before described for the Data Communications Processor, a specialized "Host System—Data Communications Processor" relationship is provided whereby failures or halts in the main host system will not stop the data communication subsystem from operating and the data communication subsystem may continue to operate independently of the main host system in an "autonomous" mode. This operation may be referred to as "bridging a halt load".

These provisions for autonomous operations are illustrated in FIGS. 4A and 4B. FIG. 4A shows the functional logic circuitry which is used to sense when the main host system is inoperative or failed so that the data communications subsystem may then operate in its autonomous mode until such time as the main host system returns on line and is available for interchange of data transfers with the main memory of the host system.

As an illustration, the Burroughs B 6700 as a main host computer puts a Scan-Out signal known as a scan request (SREQ) which provides a "True" pulse every two seconds. Any of a plurality of Data Communications Processors, each having its own data communication subsystem, will continuously sense this pulse as a signal of normal operation in the main host system. These signals are used in conjunction with the circuit of FIG. 4A.

In FIG. 4A an on-line switch 201 provides a signal that the particular Data Communications Processor is on-line with the main host system. This signal is fed into a flip-flop 202 having a Q output which feeds to AND gate 211, while the $\bar{Q}$ output is connected to a 2 second multivibrator 204.

Three AND gates 211, 212 and 213 are provided wherein the first AND gate 211 has inputs LNON (Data Communications Processor is on-line) and a second input SREQ (Scan Request from host system on Scan Bus). The second AND gate 212 has one input from LNON and also another input from the signal TO2S (Time-out 2 second signal). The third AND gate 213 also has inputs from LNON and TO2S in addition to having inputs RUN (signal that the Data Communications Processor is running) and also HREG/signal (which means that the holding register in the Data Communications Processor is not set). The HREG/signal comes from a switch having three positions: (a) Hold position—used for off-line operations; (b) Stop on Fault position—which will stop the Data Communications Processor during main system halts and (c) Normal Run position—to permit autonomous operation of the Data Communications Processor during main system halts.

The output of AND gates 211, 212 connect to the J input to JK flip-flop 203 (set time-out). The K input to flip-flop 203 comes through an inverter 205 from the Q output TO2S of multivibrator 204.

A two-second multivibrator 204 (interval timer) is triggered on by a Q signal from the STTO flip-flop 203. This triggers the multivibrator on the positive going pulse (True). The other input to multivibrator 204 triggers the multivibrator on the negative going pulse (False). The $\bar{Q}$ output of multivibrator 204 provides a signal output both to the second AND gate 212 and third AND gate 213.

The output signal, when it occurs from AND gate 213, will set flip-flops 206 (122) and 207 (123). When both these flip-flops are set, this indicates that the main host system is "down" and the outputs of these flip-flops 206, 207 will be sensed by software instructions in the Data Communications Processor to cause a branch instruction to occur which will place the Data Communications Processor in an autonomous mode for continuous self operation independently of the main host system and which will also use the disk tanking facility of the disk files to temporarily store and hold all message data and control data which is intended for the main memory of the host system or for the main processor.

The Data Communications Processor (DCP) executes special machine language operator codes to perform its functions. The functions are encoded into groups of machine language instruction operators which are stored in the local memory $20_m$ of the data communications processor 20. The encoded machine language functions are performed by the DCP on an "as required" basis and are driven into execution by the detection of a pre-defined set of conditions.

The data communications subsystem software recognizes that the host main system is halted when flip-flops 122 and 123 are set and when the data comm processor is executing a BRAN or an ARWN instruction. If only flip-flop 123 is set, the software will recognize this as a normal SAN, System Attention Needed interrupt. Flip-flops 122 and 123 are reset by the DCP program after the software has recognized that the host system is halted.

The memory word of 52 bits (0-51) of Table I, Section (a), provides bit 51 of the memory word as a parity bit while bits 48, 49 and 50 are "tag" bits and bits 0-47 constitute either data, instructions, or control information depending upon the code inserted in the tag bits.

Periodically the software checks for system and/or cluster interrupts through execution of the BRAN and the ARWN instructions (discussed later hereinafter). Such a check is made every 100-500 microseconds.

The 52 bit, full word instruction is loaded into the instruction register $23_{IR}$ on a fetch cycle. The instruction word contains two 24-bit instructions (half-words).

INSTRUCTION HALF-WORD

The 24 bit instruction half-word is divided into four fields as shown in the instruction register $23_{IR}$ at FIG. 21A. The first field is the OP. The second field is the A field. The third field is the B field, and the fourth field is the C field.

The OP field contains the basic instruction code. The A field may be an extension of the OP field or it may contain a register source address. The B field typically contains the address of the source or it may also contain a literal. The C field typically contains the address of a destination. It may also contain a literal. For branch instructions, the B:C field contains an instruction address.

The B field can contain any of the following:
(a) Literal
(b) B:C Main System Memory branch address
(c) B:C local memory address
(d) Register address
(e) Scratchpad memory address
(f) Word register byte address
(g) Indirect address designation NOTE: The B:C branch address occurs when the B field is concatenated with the C field and together they contain a branch instruction address. The B field is transferred into the IA-1 register $22_{f1}$ and the C field is transferred to the IA-O register $22_{f2}$. When the branch is taken, a new instruction fetch cycle is initiated.

The C field is made such that it can contain the same items as does the B field.

Further data on the more detailed description and operation of the instructions and registers used for the data communications processor may be found in Burroughs Reference Manual for Data Communications Processor No. 1054384, copyright 1970 by the Burroughs Corporation, Detroit, Michigan 48232.

It should be noted that FIGS. 21A and 21B include a comparison register $22_f$ having a series of flip-flops for indicating occurrence of certain conditions.

As seen in FIG. 21A, there is a comparison register (CF) $22_f$ which is connected to the C bus. The comparison register is an 8-bit register and contains eight special control flip-flops. Among these flip-flops are compare bits designated CF1 and CF0. The CF1 and the CF0 flip-flops are set by the result of arithmetic and logical instructions to denote conditions which control the conditional branch operations. These conditions involve comparisons of "greater than" or "less than" or "equal" and are further described in tables 2-1 and 2-2 of Burroughs Reference Manual 1054384, copyright 1970 and entitled Data Communications Processor.

Bit position 7 of the comparsion register is particularly designated to indicate the condition of flip-flop I23 which is the main System Attention Needed (SAN) flip-flop. This is set by the scan-out of the signal "Set Attention Needed" from the main system. It is cleared by the DCP when it causes a branch in the ARWN and BRAN instructions which explicitly test for SAN.

The most significant for "normal or autonomous" operations control are the flip-flops designated I22 (bit position 6) and I23 (bit position 7). As indicated heretofor, the I23 flip-flop is the designator for the main System Attention Needed signal. The I22 flip-flop (also see FIG. 4A) is the indicator (together with I23) that the main system is halted or down, after being reset twice on two 2-second intervals and again being found in the "set" condition when the program is executing a BRAN (branch) or ARWN (adapter read when needed) instruction.

The BRAN instruction checks the system attention needed flip-flop (SAN-FF) and causes a branch if this flip-flop is set. If only flip-flop I23 is set, this is recognized as a normal system attention needed SAN. However, if both flip-flops I22 and I23 are set, this is recognized as a "system down" or "not system alive" condition which will cause the branching program operation to select an autonomous operating routine out of local memory $20_m$. The Program Table A specifies, in ALGOL, the actual program steps.

In regard to the BRAN instruction, if the System Attention Needed (SAN) flip-flop is "on", the instruction address in the B and C fields are transferred to the IA registers ($22_{f1}$ and $22_{f2}$) and the branch is taken. The SAN flip-flop is reset and the comparator flip-flops CF0 and CF1 are cleared. Thus, the branch instruction permits the data communications processor 20 to communicate with the main system as required.

If the SAN flip-flop is "off", then the program will continue in normal sequence and the compare flip-flop CF0 and CF1 are not affected. For the Branch instruction, the contents of the A field will cause the compare flip-flop to be checked. If any specified "compare" condition is satisfied, the branch is effected by transferring the contents of the B and C fields to the IA registers ($22_{f1}$, $22_{f2}$). If the compare condition is not satisfied, then the program control continues in sequence. But if the branch does occur, then the compare flip-flops CF0 and CF1 are cleared.

In regard to the sequentially used ARWN signal (adapter read when attention needed): when a CAN condition (cluster attention needed) occurs, the cluster interface 54 and mask gate $25_c$ finds the cluster which is calling for attention. Then the AA, AC and the AI registers are set from the selected cluster interface signal and the program continues in sequence.

If only a system attention needed (SAN) condition occurs, that is to say, no CAN, then the contents of the B and the C fields are transferred to the IA registers and a branch is taken. The SAN flip-flop is reset and the compare flip-flops CF0 and CF1 are cleared. If there is neither a CAN nor a SAN condition, then the instruction is held indefinitely.

During the course of the ARWN instruction (and likewise during the course of the BRAN instruction) there is a repetitive scan of flip-flops I22 and I23 to see whether or not the "system down" flag is set or to see whether the "not system alive" flag is set. In a case of this occurrence happening twice in sequence, a branch instruction will take place for selecting the autonomous operating routine out of local memory $20_m$ for use by the data communications processor 20.

Under normal conditions, a signal SAN (System Attention Needed) is a signal that the main system sends to the Data Communications Processor to signify normal conditions of the main host processor and permits normal interchanges of data and information between the main host system and the data communication subsystem. Under these normal conditions the Data Communications Processor will only set the flip-flop 207 (I23). It is only when both flip-flops 206, 207 (I22, I23) are "set", that this signifies that the main host system is "down".

The scratchpad memory of the Data Communications Processor has a portion designated as IBA or Instruction Base Address. This IBA is used as indicated in FIG. 4B.

Certain commands and signals operate between the main host system and each Data Communications Processor, as follows:

SAN is a specific command from the host system to the Data Communications Processor to ask if the host system can talk to the Data Communications Processor.

SREQ is "scan request" sent by the host system to the Data Communications Processor as a pulse which recurs every two seconds. It tells a Data Communications Processor that the host system is active.

SAOF is a signal of the Data Communications Processor telling the host system that the Data Communications Processor is ready to accept information or commands.

TO2S SAN is a signal internal to the Data Communications Processor generated by the interval timer 204 during times the host system is halted.

SET IBA is a command which sets a main memory address into a register of the Data Communications Processor prior to the re-establishment of communication by the Data Communications Processor to the main memory and occurs only when the Data Communications Processor is in autonomous mode.

If the main host system does not generate a scan request SREQ every 2 seconds, the interval timer 204 times out and generates a unique SAN called "TO2S" (Time Out 2 Second).

TO2S sets the I23 flip-flop 207 and also sets the I22 flip-flop 206. The I22 being set differentiates the TO2S SAN from the regular SAN where only I23 flip-flop 207 is set during normal operations of the main host system. TO2S SAN does not set the SAOF (Scan Address Obtained Flip-Flop) as is done by the regular SAN.

Interval Timer Logic

The Interval Timer Logic in FIG. 4A shows gates 211 and 212 providing the logic conditions for triggering the 2 second timer. Gate 213 is time-out logic for the "TO2S" SAN (2 second time out-system attention needed).

The two second interval timer 204 is triggered (when the TO2S output is false) with the Data Communications Processor on-line switch in the "on-line" position. Gate 211 monitors the SREQ signal. As long as the SREQ's are received within a 2 second time inerval from the scan bus, the STTO flip-flop 203 sets and re-triggers the 2 second timer (TO2S goes low). However, if the SREQ is not received within a 2 second interval, the 2 second timer is not re-triggered, causing the timer to time out (TO2S goes into the True state). With the TO2S in the True state, then the gate 212 is enabled which re-triggers the 2 second timer for a new timing period. In conjunction with the new timing period, gate 213 sets I22 and I23 which reflects the TO2S SAN signal.

It is to be understood that the present invention may be practiced using a software implementation together with the hardware implementation illustrated in FIG. 4A and FIG. 4B. FIG. 4B is a flow chart summarizing the various operations and decisions which may typically be provided in a program designed to carry out the present invention. A program for implementing the flow chart of FIG. 4B may readily be provided by those skilled in the art suitable for use with a commercially available general purpose computer. For Example, a program can be designed based on the flow chart of FIG. 4B which is suitable for running on a commercially available Burroughs B 6700 or B 6800 computer system which will provide for the necessary program routines for normal operation when the main host system is running and for autonomous operation when the main host system is "down" (off line).

An example of such a program is indicated in Program Table A in the language known as Burroughs ALGOL.

Reference is now made to Program Table A attached hereto at the end of this specification.

In Program Table A, a program is shown entitled Symbol DCPPROGEN which signifies the program generation for the data communications processor (DCP). At line 24036000, there is defined the IBA (Instruction Base Address). At line 24038000, there will be seen defined the "System Alive" flag. AT line 24039000, there is defined the "System Running" flag which is dependent on the "System Alive" flag. It should be noted that the programming language involved is that known as "ALGOL".

Further at line 30002000 there is shown another program called the Continuity Loop Program for the data communications processor program control. The previously mentioned branch or BRAN instruction and the ARWN instruction are shown respectively at lines 30092000 and 30099000.

At line 30181300 the CF register of compare flip-flops is used to check out whether or not both flip-flops I22 and I23 are "set" (which means the main system is halted); and the following line 30181400 indicates a reset to "System Alive" if the compare flip-flop shows that the two indicator flip-flops I22, I23 are set (non-zero).

Again at line 30189000 there is the test designated "CF, TWO (22)" which is a test to see whether or not both of the flip-flops I22 and I23 indicate that the main system is down; but if this is not so, i.e., "zero" indication instead of non-zero, then the program continues the use of the normal operating system routine and not the autonomous operating routine.

Again at line 30238000 of the Continuity Loop Program there is seen the label "System Alive" flag which, if set, means that the main system is alive, and then normal inter-cooperative action occurs between the data communications subsystem and the main host system. At line 30240000 there is tested the "TWO (22)" which indicates that flip-flop I22 has been reset. Line 30240400 tests a flag "ONE TIMEOUT" which is "zero" if this is the first time I22 was set (or "one" if I22 has been set before, that is, the second time). Line 30240600 branches around line 30241000 as this is the first timeout (to line 30241500) and merely sets the "ONE TIMEOUT" flag, so that the next time I22 is set, then "System Alive" will be reset, i.e., equal to "0".

And thus at line 30241000 there is a reset of the "System Alive" flag to indicate that autonomous operation has now started since the autonomous routine is now being used for operation of the data communications processor.

At line 33626000 the labeled Instruction "Terminate Input" is seen, which means that the DCP is preparing to return an input message to the main system. Since this operation can be performed only if the system is running, it will be seen at line 33631300 there is a test for "System Running". If such is the case, then the DCP will continue on and return the input message to the system. Otherwise, control will be returned to the NDL (Network Definition Language) caller in the DCP.

For better understanding, corresponding portions of the flow chart of FIG. 4B will be discussed with reference to sequence numbers of the program to identify the particular portions of the program which perform the operations and/or decisions indicated.

A. Going from Normal to Autonomous Routine
I. Scratchpad Memory Layout at line 24033000
   Defines: System Alive Flag—24038000; System Running Flag—24039000; IBA (Instruction Base Address)—24046500; ONE TIMEOUT Flag—24050200

II. BRAN (Branch) at 30092000:
   Tests I23 (SAN FF) and resets it.
III. ARWN at 3009900:
   Check I23 (SAN FF). If there is a System Attention Needed (SAN) Signal, then program branches to 30185000 (SYSTEM).
IV. Test of FF I22 at 30181300.
   If FF I22 is set, a branch is taken to 30238000 to the label (Reset "System Alive") which means a main system timeout has been detected (TO 2 SAN). (IF System Alive flag=1 the system is running; If System Alive flag=0, the main system is "down".
V. At 30240000: The FF I22 is reset (turned off).
VI. Then at 30240400: Test is made of the ONE TIMEOUT Flag to see if this is the 2nd consecutive occurrence that I22 has been "set". If so, then at 30241000, the "System Alive" flag in Scratchpad Memory is reset to indicate the main system is "down" and that autonomous program routine is now being followed.

B. Return to Normal Operation after Main System is "On-Line"

This is labeled as the "Restart". Here the main system issues a "Set IBA" instruction followed by a SAN (System Attention Needed) signal. The "Set IBA" instruction provides a main system memory address to the IBA requester in SMO-L in scratch memory. The DCP uses this address to locate new request and result queues. The system asks the Data Comm Processor to give it an update on line and station status information so it can get current information on what the DCP is currently handling. After this is done, the system tells the DCP that the system is now ready to resume normal operations. Then the DCP sets the "System Alive" flag and resumes using the normal operating routines.

This is seen at lines 30076200, 30246000 et seq. shown as Procedure SYSTEM RESTART Logic.

If the main host system has gone down and the flip-flops 206, 207 have been set within the Data Communications Processor, it is necessary that the Data Communications Processor receives the Scan Request in order to re-start the timer multivibrator 204 and that it also receives from the host system a new "Set IBA" command so that the Data Communications Processor can send its Scan Access Obtained Signal (SAOF) and can receive a new Instruction Base Address (IBA) into its SMO-L, scratchpad memory-left ($24_{sp}$, FIG. 21A) at the zero location. However, the Data Communications Processor does not yet use the new Instruction Base Address for accessing main memory at this time but continues tanking operations until it gets the SCAN command (System Attention Needed). Then the Data Communications Processor re-sets the flip-flop 206 (I22F) and then can operate normally with the main system.

FIG. 4B shows the sequence of operation whereby a Data Communications Processor senses a failure or halt of the main host system and also how it regains communication with the main host system after recovery of the main host system.

Referring to FIG 4B, there is seen a flow chart of Data Communications Processor autonomous operations during the occurrence of a halt-load or failure of the main host system. As seen in FIG. 4B, there are two flip-flops I22 and I23 (designated 206 and 207 in FIG. 4A). Normally when the main host system is operating it sends a pulse every two seconds to the Data Communications Processor to see if there are any requests being made to the main system (SREQ). In the normal conditions of operation the flip-flop I23 (element 207) is "set" to show that standard SAN commands are coming from the main system (System Attention Needed).

Referring to FIG. 4B it will be seen that as long as the system request pulses (SREQ) continue, the "yes" branch will restart the timer and the timer will not time-out. Thus, the standard situation of normal intercommunication between the main host system and the Data Communications Processor will continue. All Data Communications Processors in the network are connected to the host system Scan bus to sense host system activity regardless of which particular Data Communications Processor is actually being addressed.

If there are no longer any more system request signals, the "no" branch of FIG. 4B shows that the interval timer in the Data Communications Processor will "time-out" and thus set both flip-flops I22 and I23.

When a Data Communications Processor senses the "set" of both flip-flops I22 and I23 (206, 207 of FIG. 4A) due to no "scan-out" signals from the main system and consequent time-out of the interval timer, then sensing logic from the software operations of the Data Communications Processor will recognize the "setting" of these two flip-flops (I22 and I23) to cause a ranch instruction to place the data communication subsystem into the "autonomous" mode. The program for this has been appended hereinunder as Program Table A.

At this point the Data Communications Processor begins "tanking" mode of operation whereby the data communications disk control will act as a surrogate for the main memory and will temporarily store all control and message data during the down time of the main host system. After the main system is back "on line", this information which is tanked on disk can then be communicated to the main system as necessary or to other peripheral terminals in the system.

As long as there are no system request SREQ signals, the Data Communications Processor continues operating "autonomously" by initializing various of its Front-End Controllers so they will continue with data transfer operations between sending and receiving units and for storage of informational data on the disk file systems.

Once the SREQ signal returns to the Data Communications Processor, it restarts the timer 204, but this is yet not sufficient for re-initiating the main host system—data communication subsystem intercommunication, and the Data Communications Processor continues its autonomous operation including the "tanking" operation.

In order for the normal operating relationships to be re-established between the main host system and the data communication subsystem, the following actions must occur: the main host system, once it is operating again, will scan out a system request (SREQ) signal and also a "set IBA" command. The set IBA command (Instruction Base Address) provides an address of main memory for the Data Communications Processor to access, when normal relationships are re-established. This Instruction Base Address is placed into the zero position the left-hand side of the scratch memory (SMO-L) of the Data Communications Processor.

Still however the Data Communications Processor does ot use this new Instruction Base Address but continues its tanking operations until the Data Communications Processor can receive a system attention needed (SAN) signal from the main system. When the main host system scans out SAN command, then the Data Communications Processor will reset flip-flop 122 (element 206) and will then use the newly received Instruction Base Address (IBA) in order to access main memory of the main host system.

Thus, the system relationships are re-established in the "normal" fashion whereby the Data Communications Processor and its group of Front-End Controllers will have direct memory access to either data communications memory $20_m$ or to the main memory $100_m$.

Even however in the normal mode of operation, the Data Communications Processor 20 and the Front-End Controllers (such as 51, 70, 90) will still relieve the main host processor of data transfer functions and will relieve the main memory of memory storage functions since these functions will be handled by the Data Communications Processor and the data communications memory, DCM. Further, the Data Communications Processor 20 is relieved of the bulk of its data processing burdens by means of the specialized Front-End Controllers 20 which handle the specific data transfer needs of a variety of peripheral terminal devices and line disciplines.

The Data Communications Processor has a Main Memory Interface $100_i$ which is basically a memory bus to the host system. The Data Communications Processor 20 can be connected to a host system's peripheral control multiplexor word-interface hub. Here the Data Communications Processor's requests to Main Memory are passed on to the host memory system through the multiplexor by sharing the multiplexor memory bus. If the Data Communications Processor and the multiplexor are not using the same 5 Megahertz master clock, the miltiplexor word interface will then provide the synchronizing function.

Two Data Communications Processors, each acting as a requesting unit, can share one memory bus. If this is done, the Data Communications Processors must have intercommunication to prevent any conflicts in the use of the shared bus. This communication requires a separate interconnection of two signal lines.

Referring again to FIG. 21A, an arithmetic-logic unit 26 in the Data Communications Processor can perform operations on 8-bit bytes, providing such functions as add, subtract, logical AND, logical OR, logical exclusive CR. The logic unit 26 has two input buses A and B in addition to an output bus C.

A hardware translation unit $26_t$ is made part of the arithmetic logic unit in order to translate, on a byte-to-byte translation, as follows:
EBCDIC to USASI: (8-bits to 7-bits)
EBCDIC to BCL: (8-bits to 6-bits)
USASI to EBCDIC: (7-bits to 8-bits)
BCL to EBCDIC: (6-bits to 8-bits)

Fetch Cycle

The fetch cycle loads a full instruction word into the instruction register $23_{IR}$. The instruction word can be read from the Data Comm Processor Local Memory $20_i$ or from the host system's Main Memory $100_m$ via the Main Memory Interface $100_i$.

The host ($100_{p1}$, $100_{p2}$) or Master Processor (FIG. 1A) has ultimate control over the Data Comm Processor 20 by means of a scan bus 27. The Data Comm Processor accepts three different "scan-out" orders. These are: Initialize, Set Attention Needed, and Halt. The Data Comm Processor 20 does not accept a "scan-in" order. A designation or address is a sign to each Data Comm Processor by means of pluggable jumpers. A Data Comm Processor recognizes only the scan orders that contain the specified Data Comm Processor address. Normally the Data Comm Processor will return a ready signal on the scan bus 27 when the Data Comm Processor 20 is addressed by any scan order. The ready signal allows the main system processor to maintain the scan order in anticipation of a scan access obtained signal. The scan access obtain signal is sent by the Data Comm Processor when it performs the scan-out operation as directed or when it detects an invalid scan order. The absence of a ready signal on the scan bus is detected by a time-out in the main system processor, which will then end the scan order. The Data Comm Processor is then identified as being not-present in the system or at least not available.

Initialize

When recognized by a Data Comm Processor, an Initialize scan-out turns on the run flip-flop and creates a fault interrupt. This fault interrupt takes precedence over any other fault interrupt. The 20-bit instruction base address (in the scan-out information word) is stored in the L half-word of the scratchpad memory word "0". The interrupt branch address is an "all-0" address for Main Memory; the special stop cnditions that might otherwise prevent the fault actions are inhibited. The first instruction word is fetched from the Main Memory location that is addressed by the instruction base address.

System Operation

The Data Comm Processor 20 places command blocks in the Data Comm Memory ($20_m$) which the Front End Controllers can access through the basic control memory interface. The Data Comm Processor 20 initializes the Front End Controllers by supplying a 20-bit address through the cluster interface of the Basic Control 60. This 20-bit address constitutes a Pointer (P) (FIG. 14) and the Front End Controller retains this Pointer during execution of the commad block.

The command blocks can be linked to each other by the Link Address (FIG. 14) such that a Front End Controller can begin execution of the next block while a result CAN (Interrupt) is being serviced for the previous command block. This, linking permits faster turn around for the Front End Controllers so they are not dependent on DCP servicing time. The DCP will have time to process the previous command block while the Front End Controller is executing the next. Since a 20-bit pointer address is used, there are no absolute areas of Data Comm menory which are required.

Use of Control Words

The command block constitutes three control words plus a data block. These words are designated:
One word—Data Comm Command Word (DCCW)
One word—Data Comm Address Word (DCAW)
One word—Data Comm Result Word (DCRW)
n words—Data Words Once a Front End Controller has received the 20-bit pointer (P) through the cluster interface from the Data Comm Processor 20, the Front End Controller places the address in the address register of the memory interface $100_i$ and reads the first Command Word. This word contains information about operation and variants of it to be performed. These operators are transferred to the command register of the Front End Controller while the address register is incremented by "1".

Using P plus 1 as an address, another memory read is performed; this "P plus 1" address will thus access a control word which will contain address information such as the length of the data block (FIG. 14) plus a data pointer which indicates the data block.

The address register (or data pointer) is incremented by "plus 2", thus directing the Data Comm Processor past the result word area and over to the first data word. Now transmission can begin according to the required characteristics of the Front End Controller.

When this operation is completed, a CAN (Interrupt) will be given to the Data Comm Processor 20 through the cluster interface (54, FIG. 21A) and the results of this operation will be stored in the Result Word of the Command Block. If an error was detected, a special control CAN interrupt will be given to inform the Data Comm Processor 20 of any special action needed.

Operation of Front End Controllers

The following brief sequence will serve to indicate a typical operational sequence in the subsystem using the Front End Controllers:

1. The Data Comm Processor 20 finds the appropriate command block in data comm memory, such as the BBC command block of FIG. 14.

2. The Data Comm Processor 20 executes a cluster write command to the designated unit, such as the BBC 80. These "Writes" will contain the address pointer or command information.

3. The "AC" field of the cluster write information (CWI) points to certain registers in that Front End Controller. The Data Comm Processor 20 can control the Front End Controller, as BBC 80, through the cluster interface, as $20_4$ to initialize procedures or to initialize data transfers.

4. The Front End Controller, BBC 80, now uses the Pointer to request a memory read through the Basic Control 60 memory interface for command words.

5. The Front End Controller, BBC 80, now completes its operation and notifies the Data Comm Processor 20 by a CAN signal that it is finished.

6. The Data Comm Processor 20 interrogates the Front End Controller during operation to test the state of a modem or a peripheral interface. It can also read or write buffer areas and registers for testing purposes. The Data Comm Processor can also halt a Front End Controller or clear it during an operation.

The Basic Control Module

As seen in FIG. 1B, the Basic Control 60 provides the interface between the Data Comm Processor 20, the Local Memory $20_m$, and the four Front End Controllers 51, 70, 80 and 90.

Figure 16B:
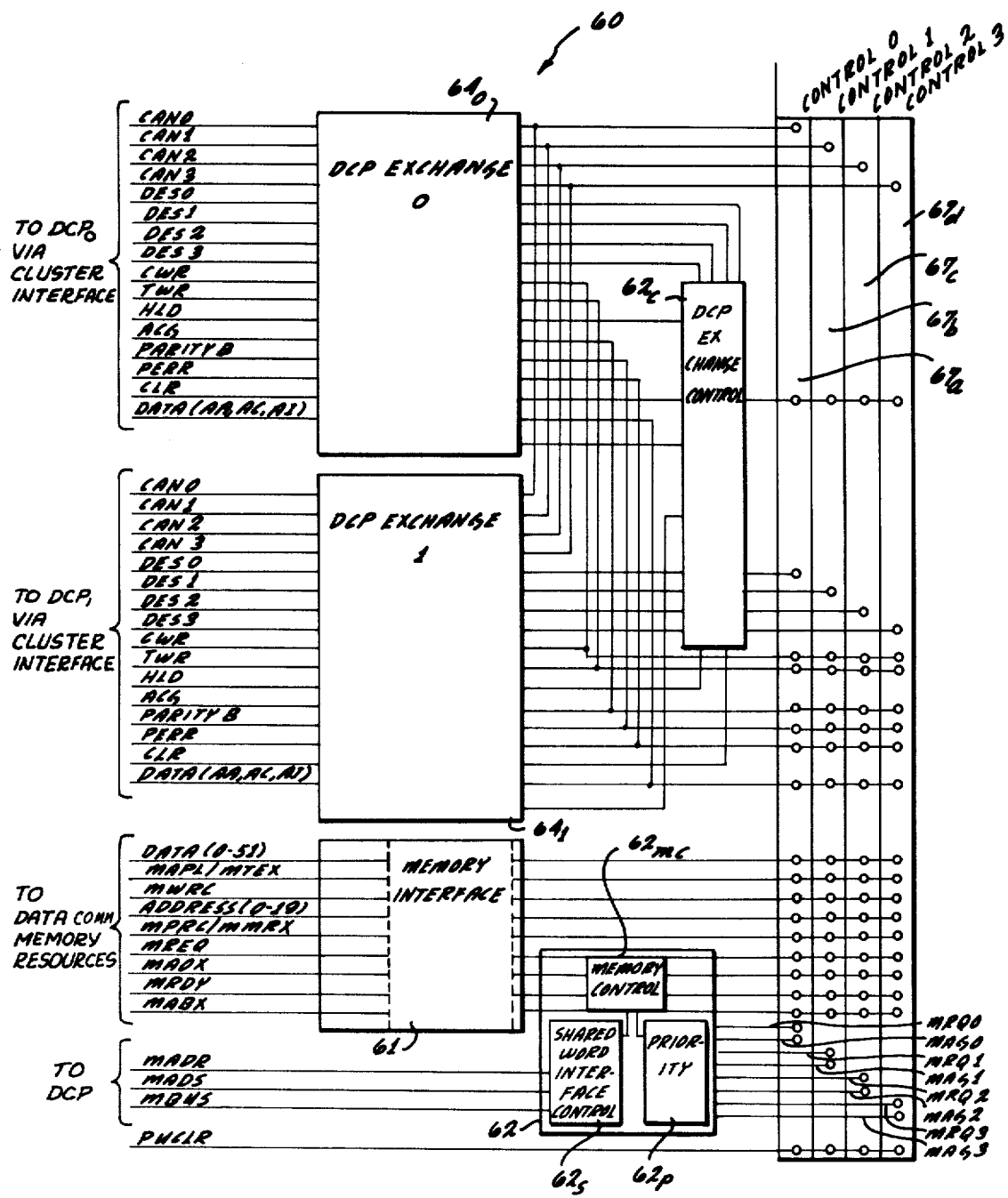
FIG. 16B is a more detailed block and line diagram of the Basic Control unit.

FIG. 16A is a block diagram which illustrates the major elements of the Basic Control 60. FIG. 16B is a more detailed schematic drawing showing the elements and interconnections which comprise the basic control unit.

The chief function of the "Basic Control" is to interface at least two Data Comm Processors to the four "front end controllers" (Data Comm Disk Controller; Broad Band Controller; Adapter Cluster Controller; Store-to-Store Controller). In addition the Basic Control permits the front end controllers to share one memory interface such as the Local Memory $20_m$ shown in FIG. 1B. The Basic Control does not modify any data which passes through it but is basically "transparent" to such data passing through. A signal designated as the CAN (Cluster/Control Attention Needed) is used in the system and this signal is passed by the Basic Control to the Data Comm Processor 20.

Further the Basic Control 60 also provides the necessary synchronization and the priority resolution of the interface between the Data Comm Processor and the Cluster. One of the functions of the Basic Control is to establish the request priority and to forward this request to the memory. The "priority" on the memory request is handled by means of a jumper. These jumpers can be set in a certain position to determine priority. For example, in FIG. 16A the control section "0" will have the highest priority and the control section "3" will have the lowest priority. This, however, can be changed or rearranged according to the physical location of jumpers attached to the Basic Control module.

As seen in FIG. 16A, the bus 61 to the memory interface enters the Basic Control 60 where it connects to a memory priority and exchange control unit 62 having a data storage area 63. Buses 65 and 66 connect different Data Comm Processors into the Data Comm Processor exchange section 64. The Basic Control 60 has four control sections designated $67_a$, $67_b$, $67_c$, $67_d$.

The memory interface 61 can be connected directly to the memory control $100_c$ of the Local Memory $20_m$ of FIG. 4. This memory interface 61 has the capability of being connected directly to memory control $100_c$ or to a multiplexor word interface. Logic is made available to allow the Basic Control to share a common word interface with a Data Comm Processor (or any unit designated in the same manner) which thus allows sharing of a memory word interface hub.

The Basic Control 60 can detect the "memory-not ready" error and then pass the error signal to the data comm control. However, all other errors are transparent to the Basic Control; thus, it is the individual responsibility of each controller to process the error signals according to the result word format of the data comm control.

In FIG. 16A the elements $68_1$ and $68_2$ are Interframe Jumper number 1 (IFJ-1) and Interframe Jumper number 2(IFJ-2). The number 1 Interframe Jumper has all the signals for a Data Comm Processor interface and also the address and the control signals for memory. The number 2 Interframe Jumper has all the memory data lines, the control request lines and the memory access granted ($MAG_n$) signals.

Referring to FIG. 16B, there is seen a more detailed schematic diagram illustrating the various elements and connecting lines of the Basic Control module 60.

Referring to FIG. 16B the four control sections of the Basic Control module are shown as $67_d$, $67_c$, $67_b$ and $67_a$. Communications to several Data Comm Processors are provided through the unit $64_0$ and $64_1$ which are designated as DCP exchange 0 and DCP exchange. The activity of the DCP exchanges $64_0$ and $64_1$ are handled by a control unit designated as the DCP exchange control $62_c$.

Communications to the data comm memory are handled by a memory interface unit 61. The memory interface 61 provides its output to a unit 62 having a Memory Control $62_{mc}$, a Shared Word Interface Control $62_s$ and Priority Logic $62_p$. The designations and functions of the communication and control lines illustrated in FIG. 16B are discussed hereinbelow under a series of tables.

The attached Table II indicates the interframe jumper signal lines which are designated in FIG. 16B.

TABLE II

| INTERFRAME JUMPER SIGNAL DESCRIPTION |   |
|---|---|
| Signals from the Basic Control to a Front End Control |   |
| SIGNAL | DESCRIPTION |
| $DES_n$ | DESignate Data Comm Control n. |

TABLE II-continued
INTERFRAME JUMPER SIGNAL DESCRIPTION
Signals from the Basic Control to a Front End Control

| SIGNAL | DESCRIPTION |
|---|---|
| n = 0–3 | The designate signal is an individual line to each Data Comm Control. When high the designate signal indicates that a DCP is executing a command to the designated Data Comm Control. |
| CWR | Control WRite<br>This line is a common signal to all Data Comm Controls indicating a control write. When high, this line in conjunction with the designate signal, indicates that either a write command or the write portion of an interrogate commannd is in progress. |
| IWR | Interrogate Write Read<br>This line is a common signal to all Data Comm Controls. When high this line in conjunction with the DES signal indicates that an interrogate command is being executed by the DCP. During the write portion of the interrogate command DES, CWR, and IWR will all be true. |
| CLR | CLeaR<br>This line is a common signal to all Data Comm Controls The signal is the Programmatic clear from the DCP, which is activated by ACS signal during a DCP AWI command.<br>This signal should not be acted upon by the Data Comm control unless the designate signal is high also. This line is intended to clear all necessary control and interface flip flops unconditionally. |
| $CAN_n$<br>n = 0–3 | Control Access Needed unit n<br>The CAN signal is a single line unique to each Data Comm Control. When high this signal indicates to the DCP that the control has information for the DCP. The signal will be held true until a read is performed by the DCP. |
| ACG | ACcess Granted<br>The ACG line is a common signal to the DCP. The ACG signal is to be held true for two (2) clock periods during a write and three (3) clock periods during a read. The clock periods are the same as described above for the write and read portions of the Interrogate Command.<br>There must be at least a one clock separation between the write ACG and read ACG of the interrogate command. |
| PARITY B | The PARITY Bit line is a bidirectional line. This line is the add parity bit on the following eighteen (18) interface signals. (Note: See Table I for explanation of the bracketed notation).<br>AA[3:4]<br>AC[4:5]<br>AI[8:9] |
| PERR | The Parity ERRor line is a common signal to the DCP. It is used to notify the DCP that a parity error was detected on a Write (CWP). |
| PUCLR | The Power Up CLeaR line is true during the power on cycle and is an unconditional clear to all controls. |

The information lines of the Basic Control are bi-directional (half duplex) lines which are common to all controls. When the (CWR) Write line of FIG. 16B is "high", then the information lines are driven by the Data Comm Processors. On the other hand, when the (CWR) Write line is "low", the information lines are driven by the Data Comm Control on lines designated ($DES_n$). A "high" level on any of these lines would indicate a "1" bit. The term "Data Comm Control" is equivalent to "Front End Control".

The following Table III lists the signal names of the information lines and a brief description of their functions.

TABLE III

| Signal Name | Description/Function |
|---|---|
| AA0<br>AA1<br>AA2<br>AA3 | The $AA_n$ lines are equivalent to the low order 4 bits of the DCp 'A A' register. These lines are used to identify an adapter or subunit within a Data Comm Control. |
| AC0<br>AC1<br>AC2<br>AC3<br>AC4 | The $AC_n$ lines are equivalent to the low order 5 bits of AC register of the DCP. These lines are used in a coded manner to give meaning to the AI lines described below. |
| AI0<br>AI1<br>AI2<br>AI3 | The AI (0–7) lines are equivalent to the AI register in the DCP. The AI8 line can be used as a parity bit on the AI (0–7) lines and is equivalent to I21F in the DCP |
| AI4<br>AI5 | The AI lines are used to transfer data to and from the DCP. |
| AI6<br>AI7<br>AI8 | The parity bit is not to be checked on each transfer. It is intended to be the parity for the data transferred to the line, which can be even or odd depending on the type of control. |

As seen in FIG. 16B there are a number of memory lines which go to the Basic Control. All signals in the memory portion of the interface (except for MRDY, MRU, MAG) are logically equivalent at the Data Comm Control to those as generated at the memory control or word interface. All lines except MRQ and $MAG_n$ are common signals to or from all Data Comm Controls. The $MRQ_n$ and the $MAG_n$ lines are unique to the individual Data Comm Control. The following Table IV will identify and briefly describe the memory lines to the Basic Control.

TABLE IV
MEMORY LINES TO BASIC CONTROL

| Signal Name | Description |
|---|---|
| MRQ0<br>MRQ1<br>MRQ2<br>MRQ3 | Memory ReQuest n<br>$MRQ_n$ is the individual request signal for memory access from each Data Comm Control.<br><br>This signal is used for the priority resolution in the Basic Control. $MRQ_n$ is equivalent to the MREQ signal on the memory interface. The MRQ signal must be removed from the interface by the control at least by the first clock after the recognition of MABX which follows $MAG_n$. |
| MAPL | Memory Address Parity Level<br>This level is generated by the Data Comm control and is the odd parity bit on the address lines MA00-19, $MRQ_n$; MWRC, and MPRC.<br>This line is time shared with MTEX. NAPL should be active from the receipt of $MAG_n$ to MABX which is the write portion of the request. |
| MPRC | Memory PRotect Control<br>This signal is generated by the Data Comm Control if it intends to use the memory protect function.<br>The MPRC line can only be active during the write portion of the cycle, which is the period from $MAG_n$ to MABX time. This line is time shared with the MMRX signal from memory. |
| MWRC | Memory WRite Control<br>This signal is generated by the Data Comm Control and is used to indicate to memory that the associated request is for a write cycle. MWRC is required to be active during the write portion of the request. |

As seen in FIG. 16B there are a number of lines which proceed away from the Basic Control. The following Table V shows the designation of the signals and a brief description of their functions.

TABLE V
LINES FROM THE BASIC CONTROL

| Signal Name | Description |
|---|---|
| MAG0 | Memory Access Granted Control n |
| MAG1 | |
| MAG2 | This signal is returned to the control when its request |
| MAG3 | has been given priority and the cycle is to start. |
| MABX | Memory Access Begun |
| | This is a one clock signal from memory control or a two clock signal from the multiplexor word interface. The signal indicates that the memory has started its cycle. It is required that at the first clock with MABX the following lines are no longer driven by the Data Comm Control. |
| | MRQn |
| | MWRC |
| | MPRC |
| | MAPL |
| | MIOO-51 |
| | MAOO-19 |
| MRDY | Memory ReaDy |
| | This signal is a common line to all Data Comm Controls. The signal will be held high at all times except for a one clock period when the Basic Control has not received a ready signal from memory for at least 8 clocks after a request has been started. |
| MAOX | Memory Access Obtained |
| | This signal is one clock period from memory Control or two clock period from the multiplexor word interface. The signal indicates that at the next clock the read data and control signals are available for strobing. |
| MTEX | Memory Detected Transmission Error |
| | When this signal is high it indicates that the memory has detected a transmission error. For a Read request this is an address parity error or an internal memory control error, or an information parity error. For a Read or Write request to a Mass Memory this will be a Multiple Read-Error if MMRX is also high. The MTEX signal time shares the line with MAPL. |
| MMRX | Memory Module Read Error |
| | When this signal is high with MAOX it indicates that the Mass Memory has detected a single or multiple Read Error. When MMRX and MTEX has detected a multiple bit error and the data is not corrected, the MMRX signal time shares the line with MPRC. |
| $MI_{mm}$ | Memory Information $Bit_{mm}$ |
| | These lines are bidirectional and are the data lines. Line 00-47 are the information lines, bits 48-50 are the word tag bits and bit 51 is the odd parity bit on bits 00-50. When the request is a write the Data Comm Control should drive these lines at their proper state for the same period as the $MA_{nn}$ lines. When the request is a Read the control should sample these lines one clock after detecting the MAOX signal |

Referring to FIG. 16A, the memory interface 61 permits operation with the memory controls and the multiplexor word interface. The Basic Control 60 can operate in the "synchronous" mode to either the memory control or to the multiplexor word interface. The Basic Control also has the capability to operate in the "asynchronous" mode to the multiplexor word interface. The Basic Control 60 is also provided with the capability of sharing a common word interface with a given data comm processor.

More details of the memory bus and the MWI (Multiplexor Word Interface) and their relationships to the Basic Control and the data comm processors will be discussed later hereinafter.

Referring to FIG. 16A the Data Communications Processor Exchange 64 is seen connected through buses 65 and 66 over to at least two separate data comm processors. This interface from the data comm processor to the Basic Control is always operated in the "asynchronous" mode. Thus, any data comm processor hub going to a Basic Control must be configured for asynchronous operation.

The setting or the changing of priority of the Basic Control units over to main memory is done by a jumper. This requires two jumpers per control unit (FIG. 16A). These jumpers are placed on the MRQ and MAG lines of each control (FIG. 16B). These lines must always be changed as pairs.

In summary, the Basic Control 60 is the central element for connection of the Front End Controllers (51, 70, 80, 90) and the data comm memory. The Basic Control unit functions to access data comm memory for the front end controllers. The Basic Control converts the standard memory interface to a backplane interface for the front end controllers. Data words consist of 48 data bits, three tag bits, one parity bit and 20 bits of address plus parity address. The data comm memory is organized such that any area of storage can be accessed by the data comm subsystem.

The Basic Control multiplexes four of these interfaces to one standard memory interface of aproximately 80 coaxial wires.

In addition, the Basic Control will allow data comm processor communication to one of four front end controllers which are connected to the Basic Control. A command block address will be written into the front end controller by the Data Comm Processor 20 causing it to retrieve a command word from local memory. This command word (previously built by the data comm processor) will contain command information for one of the adapters assigned to the front end controllers. The front end controllers will then execute the command and report results back to the Data Comm Processor 20 by an interrupt signal (CAN).

The Basic Control requests access to data comm memory through the memory control of a global, a local or the main memory. Once memory access is granted, the word (Command Word) will be read from or written into the memory. The Basic Control transfers memory words to and from the front end controllers to the data comm memory interface.

The Basic Control also allows data comm processor control information to pass from the Data Comm Processor 20 to the front end controllers. In this way the data comm processor can start-stop, or interrogate each front end controller and line adapter. Since each front end controller will store up to one word of data before requesting a transfer, then up to 16 words can be waiting for memory access in each front end controller (in the case of the Adapter Cluster 51). It will be up to the Basic Control to resolve priorities between the memory, the data comm processor, and the front end controllers such that any conflicts or overflow situations are handled.

The Broad Band Controller

As seen in FIG. 1B, the Broad Band Controller 80 consistutes one of the front end controllers which interface with the Basic Control 60. The Broad Band Controller provides a wideband or "broad band" interface to the host computer data comm subsystem. The Broad Band Controller is used to provide a means of high speed transmission, without unduly overloading the data comm processor and other system components. Generally the Broad Band Controller will be used in network communications between host computers for large bulk message transfers at high transmission rates.

The Broad Band Controller can be made in several models to provide the wideband interface. In the preferred embodiment the Broad Band Controller will have two major transmission protocols, specially "Binary Synchronous" and "Data Link". In the preferred embodiment specified herein below, the Broad Band Controller will be described in terms of the Binary Synchronous Protocol. This version of the Broad Band Controller will be referred to as "BBSC" to designate its use of Binary Synchronous Protocol.

Each front end controller, such as the Broad Band Control is connected to the Basic Control 60. The Basic Control connects to the front end controllers by means of interframe jumpers (two) which jumpers supply the memory and cluster interface signals to the front end controller involved. When using Broad Band Controllers which operate at 1.344 megabits per second, the highest priority is assigned to the Broad Band Controller in relation to the Basic Control unit 60.

While the Basic Control 60 will have two interframe jumper positions, there are four interframe jumper positions required on each of the front end controller units, such as the Broad Band Controller 80.

As seen in FIG. 17, the particular embodiment of the Broad Band Controller, known as the Broad Band Binary Synchronous Controller (BBSC), is shown. The Broad Band Synchronous Controller 80 is made of a Basic Control interface 81 (which interface connects the Data Comm Processor 20 and the memory) and a central control (ROM control 82 and a common carrier interface 83). The bus structures $84_A$ and $84_B$ are a undirectional 24-bit current-type-logic bus between the logically connected elements of the unit.

The Central ROM Memory Control 82 controls data transfers to and from the logical elements of the control. The Central Control ROM 82 and its related logic operates to store and to retrieve bytes and words from a 24-bit by 8-word scratch memory 85. Thus, the ROM Control 82 moves the bytes and words to or from the common carrier and the Basic Control interfaces. The scratch memory 85 stores control and data information for full duplex control. Data pointers, link addresses and status information are stored in the scratch memory 85 during operation.

The ROM Control 82 can initiate memory cycles, can communicate with the data comm processor interface through the Basic Control 60 and thus control and communicate to the common carrier interface 83.

In FIG. 17 a cyclic redundance checking circuit $83_c$ is provided to develop a 16 bit redundant character. This redundant character is added to the end of a transmission block for the purpose of error detection and control.

FIG. 9 shows various configurations which can be used for the Broad Band Controller 80 in relation to the Basic Control 60. One, two or four high speed line capabilities may be provided by multiple Broad Band Controllers such as $80_1$, $80_2$, $80_3$, $80_4$.

Referring to FIG. 17, a memory address register $88_m$ is used for the storage of Main Memory addresses and for autonomous memory addresses. Transmissions to and from the Basic Control 60 and the Broad Band Binary Synchronous Controller 80 are handled by a Data Comm Processor control unit $81_d$ and a Memory Control unit $81_m$.

A transmitter line buffer TLB $83_t$ and a Receiver Line Buffer $83_r$ provide parallel-serial or serial-parallel conversion in conjunction with a first-in-first-out register $83_f$. A bus logic isolator $85_i$ provides logical gates for the switching of data bytes between the modem interface 83 and the registers $88_m$, $88_R$ and $88_L$.

Referring to FIG. 17, a translator 86 is used to provide ASCII to EBCDIC code translation. Certain special characters are detected during operation to change the message states in the control.

Address incrementation and byte count decrementation are provided by a incrementer/decrementer card under control of the ROM Control 82.

The memory interface via 81 allows the memory protect write feature as a variant feature of the command control words. This prevents the control from over-writing important information in the data comm memory when storing data in the system's main memory. The results of memory operations are recorded in the ROM Control 82 and reported in the "result word" at the end of a command block operation. Unusual memory errors are reported directly to the Data Comm Processor 20 via the Basic Control/DCP Interface 87.

Data Comm Processor Interface: The Broad Band Synchronous Controller 80 (BBSC) is capable of giving a CAN (Cluster Attention Needed) signal for an intended data comm processor Read operation. On detecting the CAN signal, the data comm processor will read information from the ROM Control 82.

The BBSC 80 responds to data comm processor Write signals and stores the information into the data comm processor interface register 87 and optionally checks odd parity on the 18 bi-directional signal lines. If an error occurs, the ROM Control 82 will indicate the error condition.

The BBSC 80 will respond to "interrogate" commands from the Data Comm Processor 20. Certain control registers can be interrogated and written into by the Data Comm Processor 20 for testing in control operations. Parity is tested during the "Write" portion of the interrogate. The ROM Control 82 will not respond to the Read portion of the interrogate operation if a parity error occurs.

Common Carrier Interfaces: The BBSC 80 has interfaces, 83, to most common carrier wideband interfaces, which usually range in the band from 19.2 K to 1.344 megabits per second speed range. Interface "adapters" are provided which match these differences to the BBSC 80. The interfaces may include such items as a Western Electric 303 Data Set, Western Electric 306 Data Set, Datel 8A Data Set, etc.

BBSC Controller 80 will not allow automatic dialing, or answering or disconnect. However, "Data Set Not Ready" and "Carrier Quality Detection" will be reported to the BBSC 80 and to the Data Comm Processor 20.

Operation: The BBSC Controller 80 is initiated from the Data Comm Processor 20 by the writing of a command block pointer into the control's pointer register. The BBSC Controller then reads two words of the 3-word command block from the data comm memory. The control words had been previously stored in data comm memory by the Data Comm Processor 20. Upon readout of the words, the BBSC 80 Controller will begin operation as specified by the OP fields and variant fields of the command word (DCCW). This mode is called the "message mode".

The BBSC provides a means of linking from command blocks in addition to the above so that combinations of command blocks can be utilized to implement the Binary Synchronous Procedures at a very high data rate (1.344 megabits per second).

The data pointer variant bit can be used when a text portion of a message is separated from the contiguous memory area of the command block. When this option is used, the words of memory following the command block can then be used to store Binary Synchronous Header information—up to 256 bytes of Header can be transmitted and received from this data area following the command block.

As discussed, the preferred embodiment of the Broad Band Controller described herein may be designated as the BBSC or Braod Band Synchronous Controller, since this embodiment is directed to the use of Binary Synchronous Protocol. The line speed of BBSC 80 (of FIG. 17) is determined by the clock rate of the common carrier interface. By using the interface adapters described in this embodiment, the serial bit line speeds may be available from 19.2 K to 1.344 megabits per second. The BBSC is made capable of full duplex simultaneous operation. Under software control, the BBSC can operate in the following modes:

1. USASCII Basic
2. USASCII Transparent

Character Format: The BBSC provides ASCII to EBCDIC code translation by means of the translator 86 of FIG. 17. Depending on mode selected by a mode register, the BBSC communicates with the Broad Band interfaces in a serial bit mode using seven or eight bits per character. The data set supplies the bit timing information. The BBSC establishes the character synchronization with the line when the synchronization codes are received at the beginning of the message.

In the "Write" operation, the BBSC 80 operates in a message mode when the "Write" operation is initiated from the Data Comm Processor 20. The BBSC 80 will read and then set up the scratch memory 85 for its parameters and initiate the line and transmit data. The results of initiation are reported by the BBSC (including data comm processor interrupt and result words) into memory.

In the "Read" operation, the BBSC operates in a message mode when the "Read" operation is initiated from the Data Comm Processor 20. The BBSC will read the necessary control words from the memory store parameters in the scratch memory 85 and then initiate the line for receiving data and then wait for it to be stored. After receipt of an ending condition or data or error condition, the BBSC 80 will report to the Data Comm Processor 20 via the data comm processor interrupt and via the result word.

Whenever synchronization is to be established by the BBSC with a remote site, the transmitting station sends a unique synchronization character, designated SYN. The synchronization character is transmitted three times contiguously. The receiving station searches the received data stream for these synchronization characters, and synchronization is established upon the receiving station having received two contiguous synchronization characters.

Once character synchronization has been achieved, the receiver verifies establishment of synchronization by examining two of the characters to insure that all are synchronization characters. If the characters are determined to be "synchronization characters" then character synchronization has been achieved. The synchronization character bit pattern for ASCII is:

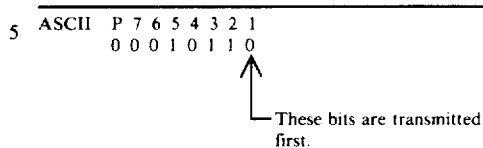

As shown in FIG. 14, the data common memory provides storage for a command block of which one portion provides the storage space for the Broad Band Controller command block. This block is prepared by the Data Comm Processor 20 before initialization.

The Data Comm Processor 20 places command blocks in the data comm memory from which the BBSC 80 can access these from data comm memory through the memory interface of the Basic Control 60. The Data Comm Processor 20 initializes the BBSC 80 by supplying a 20-bit address through the cluster interface of the Basic Control. The BBSC 80 stores the pointer (during execution of a command block) in its scratch memory 85 of FIG. 17A.

Command blocks can be linked to each other by the link address, FIG. 14, such that the BBSC 80 can begin execution of the next block during the time that a result CAN (Cluster Attention Needed) is being serviced for the previous command block by the Data Comm Processor 20. Linking allows faster turnaround for the BBSC 80 so that it is not dependent on the Data Comm Processor 20 service them. Since a 20-bit pointer address is used, no absolute areas of data comm memory are required except for the fault branch addresses of the Data Comm Processor 20.

The command block (FIG. 14) for the Broad Band Binary Synchronous Controller consists of three control words plus a data area (and/or a Header data area), as follows:

1. Data Comm Command Word: DCCW
2. Data Comm Address Word: DCAW
3. Data Comm Result Word: DCRW
4. 0–255 Header Bytes: Header Area
5. n Data Words: DATA AREA The DCCW and the DCAW are prepared by the Data Comm Processor 20 prior to initialization of the Broad Band Controller 80. The DCRW will contain the results of the operation of the BBSC. The data area or data block will usually contain text information but can contain other than text. The Header Area is usually allocated to header or control information.

The BBSC 80 is initialized by a three data comm processor Writes of a command block pointer through the Data Comm Processor 20 to the Basic Control 60 interface. The BBSC having received the pointer will begin operation by reading the DCCW and the DCAW from the data comm memory. The BBSC 80 manipulates and stores the two control words and initializes the operation according to the OP code and the variants in the DCCW.

As seen in FIG. 17, the BBSC 80 uses two logic blocks designated as Word Right $88_R$ and Word Left $88_L$.

The Data Comm Command "Word Left" (DCCW-L) contains the operational variants and the header byte count when it is used. Also certain "protect" bits are associated with the DCCW-L which identifies the DCCW to be valid for this specific control. The following Table VI indicates the layout of the DCCW-L plus a description of the bits from 51 to 24:

Table VII shows the Data Comm Address Word (DCAW-L) showing bits 47 through 24 and the DCAW-R with bits 23 through 0.

TABLE VII

DCAW-L

| 47 | 40 39 | 24 |
|---|---|---|
| ENDING CHARACTER | BYTE LENGTH WRITE (LIMIT ON READ)* | |

Bits (39:16) of the Data Comm Address Word (DCAW) are used for the Byte length of the Data area on Write. The Control decrements this count until zero.

On a Read operation, the Data Area Limit in Bytes is contained here. The Control decrements when receiving each byte and, if zero an overflow condition exists.

Bits (47:8) of DCAW contain the ending character on Write operators when variant bit DCCW (36:1) equals zero (0).

DCAW-R

| 23 | 20 19 | 0 |
|---|---|---|
| RESERVED | DATA POINTER ADDRESS | |

Bits (19:20) of the DCAW is used to address the beginning of the Data Area when DCCW bit 33 = 1. If DCCW bit 33 = 0, Data will be transmitted or stored starting at address DCRW + 1.
*MAX NUMBER BYTES $2^{16} = 65,536$

TABLE VI

| | | | DCCW-L | | | |
|---|---|---|---|---|---|---|
| 51 | 50  48 47 44 43 40 39 | 36 35 | 32 31 | | | 24 |
| P | TAG  0100  OP | VAR | OPTIONS | HEADER COUNT | | |

Description of DCCW bits 51 to 24

| BITS | |
|---|---|
| 51 | Memory parity bit tested on all memory Reads. Generated on Writes and stored. (Odd) |
| (50:3) | Tag bits tested by control to always be equal binary 3. If DCCW tag not 3 error CAN generated to DCP. |
| (47:4) | Code used by program to specifically identify this DCCW as Broadband Command (47:4) = 0100 |
| (43:4) | Broadband Control Operator Code. Write = 0100 Read = 0010 |
| (39:4) | OPERATION VARIANT FIELD Variant Field of Read and Write Operators. These bits augment the operators and specify message framing options and turnaround time-outs. |

The second word of the BBC command block of FIG. 14 is the Data Comm Address Word (DCAW). It is used for a byte limit and the data pointer fields.

The DCRW of the BBSC 80 is written by the BBSC at the end of each operator. The bits which are set describe the results of the operation. A data comm processor cluster attention needed (CAN) interrupt is optionally given on linked messages to indicate if significant information has been written.

The Data Comm Result Word (DCRW-L) contains three major fields:
1. Header bytes received during reception of non-data.
2. Common carrier interface Result bits.
3. Memory operation Result bits.

The "right" result word (DCRW-R) contains two major fields:
1. The Resultant byte count of data received.
2. The ending character on a Read Operator when the DCCW (36:1) equals "0".

The Broad Band Controller will always attempt to "right" the result word even if no significant error information is to be written. This clears the result word to the most recent condition of the BBSC.

Table VIII shows the format of the left and the right Data Comm Result Words, as follows:

TABLE VIII

BBC DATA COMM RESULT WORD

DCRW-L

TABLE VIII-continued
BBC DATA COMM RESULT WORD

| Bit | Description |
|---|---|
| 24 | DATA COMM MEMORY PARITY (REC) |
| 25 | TRANSMISSION ERROR (MTEX*$\overline{\text{MMRX}}$) |
| 26 | UNCORRECTIBLE (REC) |
| 27 | MEMORY NOT READY |
| 28 | DC MEMORY CORRECTED ERROR (MMRX*$\overline{\text{MTEX}}$) (REC) |
| 29 | DC MEMORY PROTECT ERROR (REC) |
| 30 | SPARE |
| 31 | BUFFER OVERFLOW (MEMORY) (T or R) |
| 32 | DATA SET NOT READY |
| 33 | LOSS OF CLEAR TO SEND (During Transmit) |
| 34 | LOSS OF CARRIER |
| 35 | SYNC FILL |
| 36 | PAD CHECK ERROR |
| 37 | PARITY ERROR VRC/CRC/LRC |
| 38 | DATA LOSS (FIFO OVERFLOW) |
| 39 | TIME-OUT (T or R) |
| 40 | |
| 41 | HEADER BYTES REC'D — Number of Characters in Received Header |
| 42 | |
| 43 | |
| 44 | |
| 45 | |
| 46 | |
| 47 | |

DCRW-R

| 23 | 16 | 15 | 0 |
|---|---|---|---|
| ENDING CHARACTER* | | RESULTANT BYTE COUNT | |

NOTE: Maximum bytes = $2^{16}$ = 65,536 bytes
*Ending Character on READ when DCCW [36:1] = 0

The BBSC 80 communicates from the Data Comm Processor 20 through the Basic Control 60. The Basic Control 60 interfaces through the data comm processor cluster interface and the Basic Control uses a 24-bit word (0-23) which conforms to the format shown hereinbelow in Table IX.

TABLE IX
DCP TO BBSC INTERFACE 23 22 21 20 19 18 17 16 15 14 13 12 11 10 9 8 7 6 5 4 3 2 1 0

| BC | BBSC | N.U. | TR | NU | CLR | OP | DATA |

|←— AA —→|←— AC —→|←—AI—→|

The A register is broken into 3 fields:

AA = A [23:8]
AC = A [15:8]
AI = A [7:8] Plus DCP 121 = AI8

Note: The interface between the Data Comm Processor 20 to the Basic Control 60 for the BBSC 80 has the "A" register of the data comm processor being used to communicate commands to BBSC 80. The "AA" field contains addressing information, the "AC" field contains an operation code and "AI" field contains data pertaining to the OP code given. The Data Comm Processor 20 is able to issue commands to the BBSC 80 in order to initialize a command block, to interrogate a specific register, or to receive CAN interrupts over the cluster inferface through the Basic Control 60.
Address Field AA

TABLE IX-continued
DCP TO BBSC INTERFACE

The bits of the A register AA [7:8] specify the BC, BBSC address.

A [23:2] = BC address
A [21:2] = BBSC address
A [16:1] = Transmit = 1
Receive = 0
A [19:3] = are not used in the BBSC except for parity generation and checking.

When the Data Comm Processor 20 communicates "Write" commands to the BBSC 80 it does so via the cluster/DCP interface and through the Basic Control 60. The control words which are written into the BBSC 80 use the format shown below here in Table X:

TABLE X
BBSC DCP WRITE COMMAND

| AC | | | | | AI | | | | | | | | | DESCRIPTION |
|---|---|---|---|---|---|---|---|---|---|---|---|---|---|---|
| 4 | 3 | 2 | 1 | 0 | 8 | 7 | 6 | 5 | 4 | 3 | 2 | 1 | 0 | |
| 1 | 0 | 0 | 0 | 1 | *P | 7 | 6 | 5 | 4 | 3 | 2 | 1 | 0 | Command Pointer (7:8) and Start |
| 1 | 0 | 0 | 1 | 0 | P | 15 | 14 | 13 | 12 | 11 | 10 | 9 | 8 | Command Pointer (15:8) |
| 1 | 0 | 0 | 1 | 1 | P | 0 | 0 | 0 | 0 | 19 | 18 | 17 | 16 | Command Pointer (20:4) |

*NOTE:
"P" bit not specified to be used presently, DON'T CARE.

Commands are used by the DCP command pointer. The BBSC is initialized in "word mode" by the transfer of a 20-bit command block address from the Data Comm Processor 20. Three data comm processor "Write" commands are required to initialize the BBSC 80. These commands are shown in the AC and AI fields in the following Table XI:

TABLE XI
DCP COMMAND POINTER COMMANDS

| AC | AI | |
|---|---|---|
| 1 0 0 0 1 | | Command Pointer Bits The Control will |

TABLE XI-continued

| | | | | | DCP COMMAND POINTER COMMANDS | |
|---|---|---|---|---|---|---|
| | | AC | | | AI | |
| | | | | | (7:8) | initialize following this Write |
| 1 | 0 | 0 | 1 | 0 | Command Pointer Bits (15:8) | |
| 1 | 0 | 0 | 1 | 1 | Command Pointer Bits (19:4) | |

When the CAN signal occurs which signifies that "Cluster Attention is Needed", the BBSC 80 can cause an "Interrupt" of the Data Comm Processor 20 by using its individual CAN signal line. The BBSC 80 will wait for the data comm processor Read signal and then load the AC-AI register (Table IX) with the appropriate information. After the "Read", the CAN signal is cleared and the BBSC register is also cleared. The Data Comm Processor 20 can be made to check parity on the 18 signal lines when parity option is installed. The following Table XII shows the data comm processor "Interrupts" which are implemented by the BBSC 80:

TABLE XII

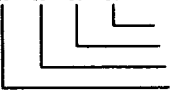

The Data Comm Processor 20 is functionable to interrogate certain control registers of the BBSC 80 in order to obtain the present state and status of the BBSC. A lead called the "interrogate control lead" (IWR) indicates that an interrogate command is taking place. The following Table XIII shows the interrogate formats:

TABLE XIII

| | | | | | INTERROGATE FORMATS | |
|---|---|---|---|---|---|---|
| | | AC | | | AI (READ DATA) | |
| 4 | 3 | 2 | 1 | 0 | 8 7 6 5 4 3 2 1 0 | |
| 0 | 0 | 1 | 0 | 1 | Mem Status | |
| 0 | 0 | 1 | 1 | 0 | Modern/Line Status | IR REG (Input Register) |

The Modem/Line Status can be tested during operation. The following Table XIV shows the AI bits which represent the interface state (Input Register IR).

TABLE XIV

| MODEM/LINE STATUS AC = 6 | |
|---|---|
| AI | DATA SET SIGNAL |
| 0 | BB Received Data |
| 1 | CB Clear to Send |
| 2 | CC Data Set Ready |
| 3 | CE Ring Indicator |
| 4 | CF Carrier Detect |
| 5 | CA Request to Send |
| 6 | CD Data Terminal Ready |
| 7 | Reserved |

In summary, the data comm subsystem may be provided with a single or a multiple number of Broad Band Controllers which interface to the Basic Control 60 in order to provide the host computer and the data comm subsystem with a wide band or "broad band" interface to high capacity wide band modems and data-sets for the handling of high speed communications between remote terminals and the data comm subsystem.

The Broad Band Controller 80 is capable of interrupting the Data Comm Processor 20 to request a read operation whereby the data comm processor will read informational data from the ROM Control 82 of the Broad Band Controller 80.

The Broad Band Controller 80 responds to Write signals from the Data Comm Processor 20 and can store the information into a data comm processor interface register 87. The Broad Band Controller 80 can respond to "interrogate" commands from the Data Comm Processor 20 for testing, parity and control operations.

The Broad Band Controller 80 operates within the data comm subsystem by using control words from a command block in the data comm memory of the data comm subsystem.

Since the command blocks can be linked to each other by link addresses, the Broad Band Control 80 can begin execution of the next block during the same time that an "interrupt" (Result CAN) is being serviced for the previous command block by the Data Comm Processor 20, this linking allowing faster turnaround for the Broad Band Controller 80 which makes it independent of the Data Comm Processor 20 for service.

Thus, the Broad Band Controller provides a completely controlled and unique service to the data comm processor subsystem in providing command, control, and servicing of wide band, high speed transmission to remote terminals via data sets using common carrier lines.

Data Comm Disk Controller (DCDC)

The Data Comm Disk controller 70 of FIG. 1B is used to provide control for the storing and retrieval of data communication information placed on a disk. The Data Comm Disk Controller is initiated by the Data Comm Processor 20 via the Basic Control 60, particularly by the basic control interface which sends a 20-bit memory address of the data comm command word. Upon arrival of the 20-bit address at the Data Comm Disk Controller 70, the Data Comm Disk Controller begins a semi-autonomous operating condition. Once initiated, the Data Comm Disk Controller will read the data comm command word from memory. As seen in FIG. 14, the data comm command word is composed of an operations code "OP", a variant field, and a file address of the disk to be accessed. The next word in memory is the data comm address word which contains the length of the "operation cycle"—that is to say, the number of words to be transferred—and optionally, a 20-bit address pointing to the beginning of the data area. After the input/outut operation is initiated, the Data Comm Disk Controller 70 begins to transfer information either from the memory to the disk or from the disk to memory.

After completion of the data transfer, a "Result Word" is formed by the Data Comm Disk Controller 70 and is written into memory. The cluster attention needed signal (CAN) is thereafter passed on to the Data Comm Processor 20 and the operation is terminated.

FIG. 11 shows a schematic of the disk subsystem. The Basic Control 60 provides an interface from the Data Comm Processor and the data comm memory to the disk subsystem control DCDC 70. The Data Comm Disk Controller 70 handles two Disk File Exchanges (DFX) shown as 70$_{x1}$ and 70$_{x2}$. A Disk File Control 70$_c$ works with the Data Comm Disk Controller to select and use Disk Files 70$_{d1}$ and 70$_{d2}$. Failsoft connections are provided to use another disk should one disk system fail.

The Data Comm Disk Controller 70 has three interfaces. These include: The Data Comm Processor Cluster Interface via the Basic Control 60, the memory interface and the interface to the disk subsystem.

The Data Comm Processor Interface is via the Basic Control 60 over to the cluster interface of the Data Comm Processor 20. Data is transferred to the Data Comm Processor in a "CAN" format that is similar to the cluster in operation. Address information for initialization is transferred to the Data Comm Disk Controller 70. Since 20-bits of address are required, then three "writes" to the Data Comm Disk Control 70 must be furnished by the Data Comm Processor 20 for initialization.

The Memory Interface: The interface from Data Comm Disk Controller 70 to the memory is via the Basic Control 60. The Data Comm Disk Controller 70 communicates with the memory, similar to normal memory operation by means of the memory bus.

Disk Interface: The Data Comm Disk Controller 70 is provided with the necessary logic to interface with the disk subsystem, as seen in FIG. 11. This interface is organized to handle an information transfer rate of 400,000 8-bit bytes per second.

The Data Comm Disk Controller 70 is initialized from the data comm processor cluster interface via the Basic Control 60. The Data Comm Processor 20 will normally perform three adapter writes which will cause 20 bits of address to be passed to the Data Comm Disk Controller 70. The cluster interface information passed to the Data Comm Disk Controller is formatted as shown in Table XV below.

TABLE XV

CLUSTER INTERFACE INFORMATION PASSED TO DCDC

| ADDRESS OF DCDC | COMMAND CODE | MEMORY ADDRESS |
|---|---|---|
| AA | AC | AI |

The AC (Command Code) and AI (Memory Address) fields are as follows:

| AC | AI | MEANING |
|---|---|---|
| 4 3 2 1 0 | 7 6 5 4 3 2 1 0 | |
| 1 0 0 0 1 | 7 6 5 4 3 2 1 0 | Memory Address bits 7 through 0 are passed to DCDC. DCDC is to start initialization process. |
| 1 0 0 1 0 | 15 14 13 12 11 10 9 8 | Memory Address bits 15 |

TABLE XV-continued

CLUSTER INTERFACE INFORMATION PASSED TO DCDC

| ADDRESS OF DCDC | COMMAND CODE | MEMORY ADDRESS |
|---|---|---|
| AA | AC | AI |

The AC (Command Code) and AI (Memory Address) fields are as follows:

| AC | AI | MEANING |
|---|---|---|
| | | through 8 are passed to DCDC with no action on the part of the DCDC. |
| 1 0 0 1 1 | X X X X 19 18 17 16 | Memory Address bits 19 through 16 are passed to DCDC with no action on the part of the DCDC. |

The Data Comm command Word (DCCW) contains the following elements of disk control information: operator, variant, unit number, and file address.

The Data Comm Address Word (DCAW) contains the following disk control information: word length and an optional data pointer.

The Data Comm Result Word (DCRW) is located at address DCAW plus one.

Data Block: The start of the data block area will be optionally addressed by the data pointer or start immediately after the DCRW and it is of the length defined in the DCAW.

The Data Comm Command Word (excluding the tag field) consists of 48 bits as shown in the following Table XVI.

TABLE XVI

DATA COMM COMMAND WORD (DCCW)

| 51 | 50 48 | 47 | 0 |
|---|---|---|---|
| P | TAG | I/O CONTROL INFORMATION | |

| 47 40 | 39 32 | 31 24 | 23 0 |
|---|---|---|---|
| OP | VAR | UNIT NO. | FILE ADDRESS |

Operation Code Field (47:8)

| OP CODE (43:4) | FUNCTION |
|---|---|
| 0001 | WRITE |
| 0010 | READ |
| 0011 | CHECK |
| 0000 | TEST |

Variant Field (39:8)

This field is a variant of the OP functions. The Variants are specified as follows:

| BIT | FUNCTION |
|---|---|
| 39 | Reserved |
| 38 | Tag Transfer |
| 37 | Maint. Seg. |
| 36 | Reserved |
| 35 | Causes Loading and unloading of internal segment buffer when used with Write and Read OPs respectively. Causes no action on disk. |
| 34 | Protected Write |
| 33 | Causes Address in Data Pointer Section of the DCAW to be used. |
| 32 | Reserved. |

Write Operator

Data is transferred from memory to the Data Comm Disk Controller 70 as six eight-bit bytes at a time (one memory word). The Data Comm Disk Controller will terminate the Write operation when all data has been transferred to disk and a segment boundary has been noted. If the data is exhausted before the end of a segment, the remaining portion of the segment will be filled with zeroes.

Read Operator

Data is transferred from disk to the Data Comm Disk Controller 70 in eight-bit bytes. The DCDC 70 will accumulate six bytes (one memory word) and then write them into memory. The Controller will stop data transfer to memory when all data has been transferred and will terminate operation at the end of the segment being read.

The Data Comm Address Word, excluding the tag field, consists of 48 bits as shown in Table XVII.

TABLE XVII

DCAW FORMAT

| 47 | 44 43 | 24 23 20 19 | 0 |
|---|---|---|---|
| RESERVED | WORD LENGTH | RES. | DATA POINTER |

BITS (47:4) Reserved
BITS (43:20) Word Length - The binary number of words to be transferred.
BITS (23:4) Reserved
BITS (19:20) Data Pointer - Optionally points to the first word of the Data Block (used in conjunction with bit 33 of DCCW).

| 47 | 0 |
|---|---|
| Data Comm Address Word: | I/O CONTROL INFORMATION |

Data Comm Result Word Format

A result word is generated by the Controller 70 and is written into memory after each operation. The Data Comm Result Word contains a 24-bit "conditions" field and a 20-bit memory address.

The Data Comm Result Word format is shown in Table XVIII together with various conditions signals.

TABLE XVIII

DATA COMM RESULT WORD (DCRW)

| 47 | 24 23 | 20 19 | 0 |
|---|---|---|---|
| CONDITIONS | RES | LAST MEMORY ADDRESS + 1 | |

Conditions Field (47:24)
Conditions reported in the DCRW are as follows:

| BIT POSITION | FUNCTION |
|---|---|
| 24 | Memory Parity Error |
| 25 | Memory Transmission Error |
| 26 | Uncorrected Read Error |
| 27 | Memory Not Ready |
| 28 | Corrected Read Error |
| 29 | Memory Protect Error |
| 30 | Disk Not Ready |
| 31 | Segment Buffer Parity Error |
| 32 | LPC Error |
| 33 | EU Busy |
| 34 | Write Lockout |
| 35 | Timeout |

The Store To Store Controller

As seen in FIG. 1B, the Store to Store Controller 90 constitutes one of the front end controllers which is interfaced to the Data Comm Processor 20 and the Local Memory 20$_m$ by means of the Basic Control 60. The Store to Store Controller 90 also has a memory bus which connects to the host system and may thus use the main memory of the host system for transfer and/or relocation of data.

Since the preferred embodiment of the subject data comm subsystem is made to provide great flexibility in accessibility (by the data comm subsystem) to all the forms of memory available within the overall system, then the memory concept herein can be called a "Data Comm Memory" which is defined to be any memory facility within the system which is utilized by the data comm subsystem primarily for data storage. It is in this regard that the Store to Store Controller is used to enhance the flexibility for use of any and all memory facilities within the entire system.

The Store to Store Controller 90 is used by the Data Comm Processor to transfer blocks of data, one word at a time, as follows:

(a) Transfers to and from the data comm memory (b) Transfers to and from the system's main memory.

Once the Store to Store Controller is started or initiated by the Data Comm Processor, the Store to Store Controller performs the required data transfer and thus leaves the Data Comm Processor free to perform other operations. When the Store to Store Controller completes its operation, the Store to Store Controller will then store a Result Word in the data comm memory and it will notify the Data Comm Processor that the operation has been completed. After this the Store to Store Controller will be available to execute another operation.

The Store to Store Controller 90 (FIG. 1B) communicates with the Data Comm Processor 20 and the data comm memory through the Basic Control unit 60.

Figure 19:
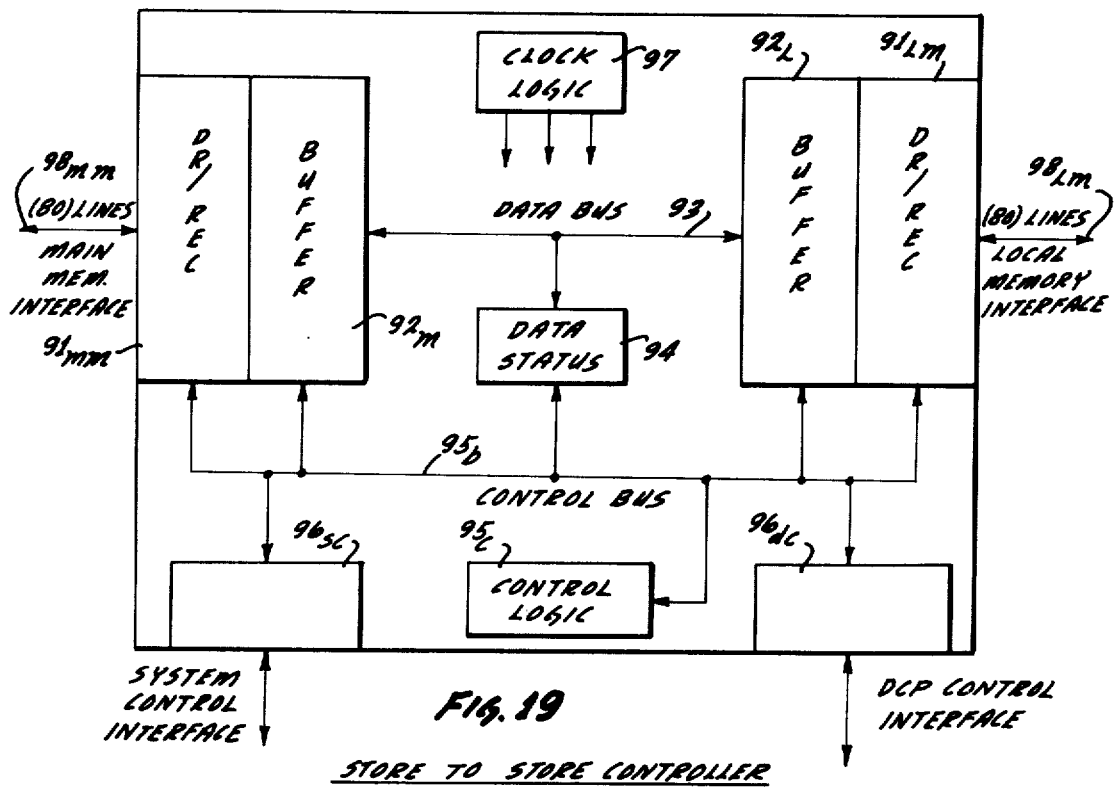
FIG. 19 is a block diagram of the front-end control known as the Store to Store Controller.

FIG. 19 indicates a block diagram of major elements of the Store to Store Controller 90. The communication between the Data Comm Processor 20 and the Store to Store Controller 90 is accomplished through the Control Interface 96$_{dc}$ of the Basic Control 60.

As seen in FIG. 19, the Store to Store Controller 90 has a main memory interface 98$_{mm}$ and a local memory interface 98$_{lm}$. Further, there is a system control interface 96$_{sc}$ and a Data Comm Processor control interface 96$_{dc}$. The main memory and the local memory interfaces connect to driver-receivers 91$_{mm}$ and 91$_{lm}$, these driver-receivers having buffers 92$_m$ and 92$_l$. A data bus 93 connects these buffers to a data status register 94. Likewise, a control bus 95$_b$ connects the system control interface 96$_{sc}$ and the Data Comm Processor control interfaces 96$_{dc}$ to the driver-receivers, the buffers and to a control logic section 95$_c$. A clock logic unit 97 provides clocking for the entire Store to Store Controller 90.

The control interface operates basically as follows:

(a) The Data Comm Processor 20 sends a 20-bit address (3-bytes) over to the Store to Store Controller 90. This address then points to a data comm control block (in data comm memory) which block contains the parameters to perform a data transfer operation.

(b) When the data transfer operation is completed, the Store to Store Controller 90 then notifies the Data Comm Processor 20 that the operation is complete. The Data Comm Processor then reads control information from the Store to Store Controller to determine the "result" of that operation.

Referring to FIG. 6 the memory interface 60$_{mi}$ (of the Basic Control unit) is used to establish data paths between the Store to Store Controller 90 and the data comm memory, which may include the Main Memory 100$_m$ and Local Memory 20$_l$.

As shown in FIG. 5 the data comm memory may consist of a memory 20$_i$ directly within the Data Comm Processor 20 and in addition may also be enhanced by a group of memories 20$_e$ which are external to but connected to the internal memory of the Data Comm Processor.

Once the Basic Control 60, FIG. 5, has resolved the "requestor" priority and then granted memory access to the Store to Store Controller 90, the memory cycle is then executed by the Store to Store Controller according to the timing and gating rules used on the Main Memory bus 20$_b$ of the host system.

The main memory interface 98$_{mm}$, shown in FIG. 19, provides a data path between the Store to Store Controller 90 and the host system's main memory. This main memory interface 98$_{mm}$ operates in conjunction with the host system's memory bus and a multiplexor word interface.

Upon command of the Data Comm Processor 20, the Store to Store Controller 90 initializes the operation by fetching a Data Comm Command Word (DCCW) and a Data Comm Address Word (DCAW). The contents of these words are distributed into hardware registers for execution. The Store to Store Controller then holds the address of the Data Comm Result Word (DCRW) to store "Result" information at the end of the operation.

The Data Comm Processor 20 starts initialization by sending, via the cluster interface, a 20-bit address (3 bytes). Table XIX hereinbelow shows the format for the 3 bytes and also shows a 20-bit pointer (P) which is the data comm memory address of the data comm control block.

TABLE XIX

|  | AC<br>4 3 2 1 0 | AI<br>8 7 6 5 4 3 2 1 0 |  |
|---|---|---|---|
| (1st CWR) | 1 0 0 1 1 | 0 0 0 0 0 [19:4] | ⎫ |
| (2nd CWR) | 1 0 0 1 0 | 0 - [15:8] ——— | ⎬ Address bits |
| (3rd CWR) | 1 0 0 0 1 | 0 - [ 7:8] ——— | ⎭ |
|  | (P)<br>Pointer |  |  |

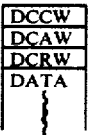

Tables XXA, XXB and XXC respectively show the formats for the Data Comm Control Word, the Data Comm Address Word and the Data Comm Result Word used by the Store to Store Controller.

TABLE XXA

DCCW

| 50 | 48 | 47 | 40 | 39 | 32 | 31 | 20 | 19 | 0 |
|---|---|---|---|---|---|---|---|---|---|
| TAG | | OP | | VB | | R | | MMA | |

TAG must = 011
OP must = 001000xx (xx = 1,2,3)
VB = Variant Bits

TABLE XXA-continued

R = Reserved
MMA = Main Memory Address

TABLE XXB

DCAW

| 50 | 48 | 47 | 44 | 43 | 24 | 23 | 20 | 19 | 0 |
|---|---|---|---|---|---|---|---|---|---|
| TAG | | R | | L | | R | | DCMA | |

TAG = not used
R = Reserved
L = Length of op in words
DCMA = Data Comm Memory Address
(if V33 = 1 of DCCW)

TABLE XXC

DCRW

| 50 | 48 | 47 | 24 | 23 | 20 | 19 | 0 |
|---|---|---|---|---|---|---|---|
| TAG | | Results | | R | | LDCMA | |

TAG = not used
R = Reserved
LDCMA = Last DC Memory Address
Results = 24-DC Memory Parity Error
25-DC Memory Transmission Error
26-DC Memory Uncorrectable Read Error
27-DC Memory Not Ready
28-DC Memory Corrected Read Error
29-DC Memory Protected Write Error
30-31-Reserved
32-MM Parity Error
33-MM Transmission Error
34-MM Uncorrectable Read Error
35-MM Not Ready
36-MM Corrected Read Error
37-MM Protected Write Error The Store to Store Controller contains logic to execute the following operators:
RDMM—Read from main memory
WRMM—Write to main memory
WRDM—Write data comm memory When the Store to Store Controller 90 has completed an operation or decides to terminate the cause of an error, a CAN signal (cluster attention needed) is sent to the Data Comm Processor 20. This CAN signal instructs the Data Comm Processor to read status information from the Store to Store Controller. At the completion of the cluster read, the Store to Store Controller returns to its idle state. The format and bit assignment for this particular status information is shown below in Table XXI.

TABLE XXI

| AC | | | | | AI | | | | | | | |
|---|---|---|---|---|---|---|---|---|---|---|---|---|
| 4 | 3 | 2 | 1 | 0 | 8 | 7 | 6 | 5 | 4 | 3 | 2 | 1 | 0 |
| 0 | 0 | 0 | 1 | 0 | 0 | 0 | 0 | 0 | 1 | 0 | 0 | 0 | 0 | Invalid DCCW |
| 0 | 0 | 0 | 1 | 0 | 0 | 0 | 0 | 0 | 1 | 0 | 0 | 0 | 1 | DC Memory Parity Error on CW |
| 0 | 0 | 0 | 1 | 0 | 0 | 0 | 0 | 0 | 1 | 0 | 0 | 1 | 0 | DC Memory Transmission Error on CW |
| 0 | 0 | 0 | 1 | 0 | 0 | 0 | 0 | 0 | 1 | 0 | 1 | 0 | 0 | DC Memory Read Error on CW-uncorrect |
| 0 | 0 | 0 | 1 | 0 | 0 | 0 | 0 | 0 | 1 | 1 | 0 | 0 | 0 | DC Memory Not Ready on CW |
| 0 | 0 | 0 | 1 | 0 | 0 | 0 | 0 | 1 | 0 | 0 | 0 | 0 | 0 | Exception in DCRW |
| 0 | 0 | 0 | 1 | 0 | 0 | 0 | 0 | 0 | 0 | 0 | 0 | 0 | 0 | No Exception in DCRW |

In summary, the Store to Store Controller provides the data comm subsystem with a direct memory transfer capability between the data comm memory, the host system and the main memory. Operating asynchronously from the system, the Store to Store Controller 90 is used in autonomous data comm subsystems to augment data block transfers to the host systems. Since data integrity has been established in the data comm processor memory, the initiation of subsequent block transfers to main memory allows the Data Comm Processor 20 to perform other operations without continual interruption.

Adapter Cluster Module

The Adapter Cluster Module 51 (FIG. 1B) is one vehicle (Front-End Controller) which the Data Comm Processor interfaces with data communication lines to remote terminals. Each Adapter Cluster services a maximum of 16 data lines operating simultaneously in the speed ranges of 45.5 to 9,600 bits per second.

The basic functions of the Adapter Cluster are:

(a) Line termination which includes scanning, clocking and temporary storage.

(b) Character assembly and disassembly.

(c) Synchronization, that is to provide attainment of synchronization and maintenance of synchronization between the adapter cluster module and the peripheral.

(d) Time operation to maintain line discipline.

(e) Sync character recognition logic.

(f) Provide ability to exchange information with one of more DCP's.

A block diagram of the Adapter Cluster 51 is shown in FIG. 20A. The Adapter Cluster functions in a manner that makes itself transparent to most character codes and all message formats. As an example, of the 10 USASI-Basic Mode-Data Communications control characters, the Adapter Cluster 51 recognizes only the SYN character in order to obtain and retain synchronization when operating in the synchronous mode.

The Adapter Cluster 51 is dependent upon the Data Comm Processor 20 to provide control signals for each and every adapter operating within a cluster. Once an adapter operation is initiated by a Data Comm Processor program, the adapter will begin and continue to operate under the control of the Adapter Cluster 51 until additional control is required from the Data Comm Processor 20, in which case an "interrupt" is sent to the Data Comm Processor 20.

Each adapter or data line serviced by the Adapter Cluster will have a minimum of two characters of temporary data storage. The Adapter Cluster 51 also contains temporary storage of control status information for each adapter. Total data and control status temporary storage provided in the Adapter Cluster is 16 words of 56 bits each, or one word per adapter.

The Adapter Cluster is broken down into control sections. These sections can either be associated with individual data lines (adapters) or all data lines (adapters). The sections which are associated with "individual" data lines, that is to say, unique to one line are:

1. Integrated circuit memory words (Buffer Memory $52_m$ of FIG. 20A).
2. Adapters (0-15 of FIG. 20A).

The control sections of Adapter Cluster 51 associated with all data lines, that is, they are time-shared by all the lines, are:

1. Cluster interface exchange 54 (FIG. 20B).
2. Registers AD, CC, DC, AC, CS (FIG. 20B).
3. Clock and adapter designate control 58 (FIG. 20A).
4. BAR $53_b$-Field sensing and control logic (FIG. 20A).
5. Read/Write control 55 (FIG. 20A).
6. Adapter switching matrix $51_{mx}$ (FIG. 20A).

As was previously described in the aforementioned U.S. Pat. No. 3,618,037, the acronym BAR represents a "Buffers Associative Register" while CIR represents a "Cluster Interface Register".

Figure 20B:
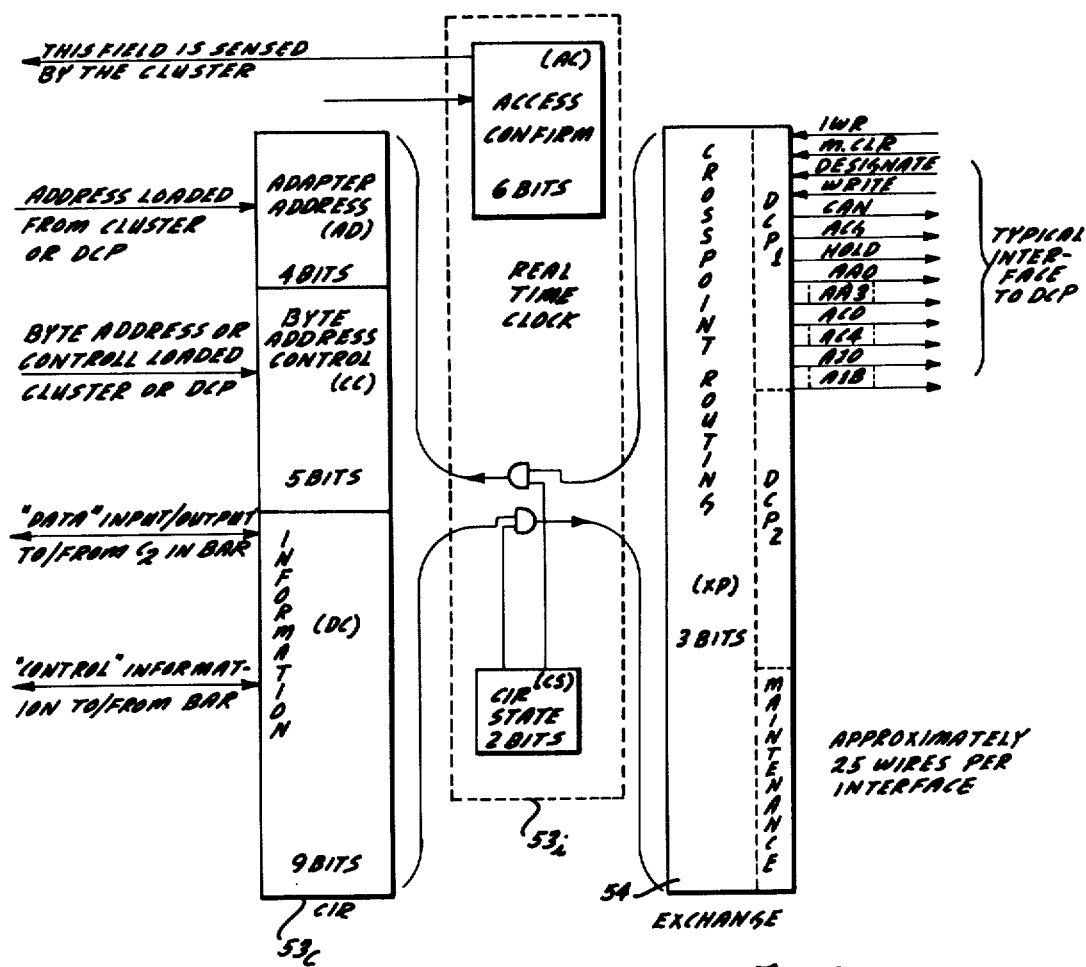
FIG. 20B shows the Cluster interface for the Adapter Cluster.

In FIG. 20B, the cluster interface between the Data Comm Processors and the Cluster Interface Register $53_c$ is shown. This cluster interface is time-shared by all adapters of the Adapter Cluster. Control or data information can be sent or received on this interface. This interface is serviced at the Data Comm Processor and the combination of its AA, AC, and AI registers, previously described. At the cluster end, the Cluster Interface Register $53_c$ services the interface via an exchange 54. Maintenance of the cluster can be performed through this interface by means of the Cluster Display Unit $23_d$ shown in FIG. 21B. as part of the Data Comm Processor.

The cluster interface of FIG. 20B can be separated into two sections, one section being the Cluster Interface Register $53_c$ and the other being the Cluster Interface Control $53_i$. The size of the Cluster Interface Register is 18 bits and it is the vehicle by which information (control or data) is transferred between the Cluster Buffer IC memory $52_m$ of FIG. 20A and the Data Comm Process or 20 or its Display Unit $23_d$ of FIG. 21B.

In FIG. 20B, the register AD is the Adapter Address of 4 bits wherein the Data Comm Processor, by way of the Exchange 54, can shift paths into this field. In FIG. 20B, the block designated CC is the byte address and control register which holds 5 bits. The Data Comm Processor, via the Exchange 54, can shift paths into this field. This field is primarily used for byte field addressing and control information. A shift path into this field may also be accomplished by the "Interrupt" part of Control Section 55 (FIG. 20A) of the Adapter Cluster 51.

The register DC is the cluster "data" unit which holds 9 bits (FIG.20B). The Data Comm Processor 20, via the Exchange 54, can shift paths into this field. The Cluster Buffer IC Memory $52_m$ of the cluster can also shift paths into this field. Both data and control information are transferred through this field.

The Cluster Interface Control $53_i$ is a section holding 11 bits and having the following fields:

CS: holds 2 bits; this field is controlled and sensed by the cluster or the Data Comm Processor. Control states of the Cluster Interface are derived from this field.

AC (Access Confirm): This field of 6 bits is controlled and sensed by the Cluster. When a cluster access to the Data Comm Processor is completed, this register is set equal to AD and marked occupied. The sixth bit is used to differentiate a program time-out interrupt from others.

XP (Cross Point): This field of 3 bits is controlled and sensed by the Cluster. When a cluster is designated and conditions are right to transfer information to or from the cluster, one of the flip-flops will be set thereby allowing information to pass between the Cluster and in one of the Data Comm Processors or the Cluster Display Unit $23_d$, FIG. 21B.

In FIG. 20A in the schematic drawing of the Adapter Cluster Module, a cross point exchange 54 connects a plurality of Data Comm Processors to the Cluster Interface Register $53_c$. An integrated circuit memory $52_m$ operates with a control function unit 55 which receives input from a Buffers Associative Register, BAR $53_b$, and from an Input Register, IR 56. The Output Register 57 transmits to an Adapter Switching Matrix $51_{mx}$ while the Input Register 56 receives from switching Matrix $51_{mx}$. A real-time clock 58 is used to coordinate the various cyclic activities.

FIG. 20B is a schematic of the Cluster Interface Register, CIR $53_c$, showing the cross point exchange 54 providing an interface to two Data Comm Processors. As previously discussed, the Cluster Interface Register $53_c$ has a size of 18 bits and is the vehicle by which control or data information is transferred between the buffer (IC Memory $52_m$) and the Data Comm Processor. The CIR $53_c$ is made up of three fields: AD-adapter address field, CC-byte address and control field, and DC-cluster data field. The cluster interface control, CIC $53_i$, carries eleven bits and has a CS field of two bits (for CIR state) and AC (access confirm) field of six bits.

Figure 20C:
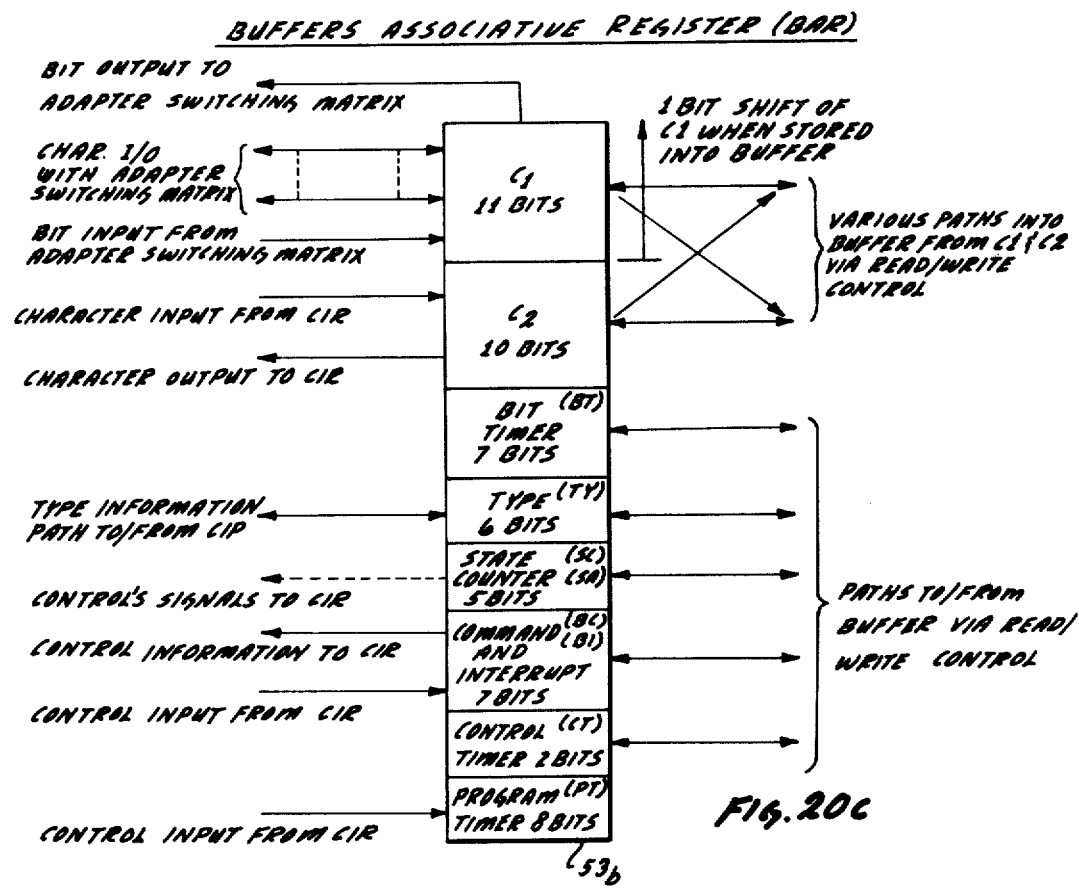
FIG. 20C shows the specific registers and connections for the Buffers Associative Register of the Adapter Cluster of FIG. 20A.

The schematic FIG. 20C shows the Buffers Associative Register BAR $53_b$. The Buffers Associative Register (BAR $53_b$) is the heart of the Adapter Cluster since all transfer of control information and data between the adapters and the cluster buffer memory $52_m$ is through the BAR $53_b$. The Register $53_b$ is time shared by all the adapters continuously. The contents register is changing with every clock time as a result of sensing changes on paths to the Cluster Interface Register $53_c$, Adapter Switching Matrix $51_{mx}$ and the Read/Write Control. All fields of the Buffers Associative Register $53_b$ can be written in from the CIR $53_c$ (FIG. 20A) and most can be interrogated or read (indirectly from the Cluster Buffer Memory $52_m$) into the CIR $53_c$. The Buffers Associative Register has a size of 56 bits and is made up of eight fields (FIG. 20C) as follows:

1. C-1 field (Character one)—11 bits: This field can accept or send a bit or character from or to the Adapter Switch Matrix $51_{mx}$. Various paths into the Cluster Buffer Memory $52_m$ are necessary to implement the basic control of this field. There is a path that shifts the entire field one bit position. There are paths which shift C-1 field content to or from the charater two field positions within the buffer.

2. C-2 (Character two)—10 bits: This field provides a normal path for a data character to be sent to or received from the Data Comm Processor. This field has room for an eight bit character plus parity. The additional bit position is to mark this field when occupied. Various paths into the cluster buffer memory $52_m$ are necessary to implement the basic control of this field. There are paths which shaft the C-2 field content to or from the Character One field position within the buffer.

3. BT field (Bit Timer)—7 bits: This field is used for information strobing purposes within the cluster; it is used for both synchronous and asynchronous adapter operation. During asynchronous operation, this field is basically an extension of the clock counter of the clock generation section of the cluster. During synchronous adapter operation, this field senses the clock lines of the data sets through the adapter and the Adapter Switching Matrix $51_{mx}$ of the cluster. In either case, this BT field provides control signals for the adapter and the C-1 field.

4. TY field (Type)—6 bits: This field is used for basic control purposes within the Adapter Cluster 51. This field accepts or provides "Type Information" either from or to the Data Comm Processor. The information within this field defines a type of adapter being serviced with each buffer memory access. This field has room to define a maximum of 31 adapter types or line disciplines. The zero state of this field is reserved for control purposes. The TY field also contains a control bit that can be used for maintenance purposes.

5. SC and SA field (State Counter and State Counter Auxiliary)—5 bits: This field is used for sequence control purposes within the Adapter Cluster 51. The SC field (2 bits) along with the command field of the Buffers Associative Register $53_b$ is used to define the existing state of an adapter as it is serviced with each buffer memory access. The SA field (3 bits) is used to buffer interrupt conditions before they are encoded into the interrupt field of the Buffers Associative Register $53_b$.

6. BC (Command) and BI(Interrupt) fields—7 bits: This field contains commands sent by the Data Comm Processor which instructs the Adapter Cluster 51 as to what type of operation is to be done. It also contains the interrupt field which will indicate to the Data Comm Processor what type of adapter cluster attention is needed.

7. The CT (Control Timer) field—2 bits: This field is used internally within the Adapter Cluster 51 and provides either 3 second or 30 second timer control. This field is disabled whenever the program timer field is not idle.

8. PT (Program Timer) field—8 bits; This field provides an area for timing functions for programs in the Data Comm Processor. The Data Comm Processor can enter data into this field (by way of the Exchange 54) and allow timing functions to occur. At the completion of timing in this field, an interrupt is sent to the Data Comm Processor. This field is one that cannot be interrogated.

There are five registers in the Adapter Cluster 51. The register just described was the Buffers Associative Register $53_b$. There are also a Scan Counter Register and a Real Time Counter Register (which are not shown) in addition to an Input Register 56, Output Register 57 and a Buffer Memory (cluster buffer) Register $52_m$.

The Scan Counter Register is one which is constantly counting at a typically 5 megahertz clock rate. This register acts as source for designate control to the Adapter Switching Matrix $51_{mx}$ and the Read/Write control 55 of the Adapter Cluster 51. The content of this SCR register is shifted to the CIR register AD field (FIG. 20B) when control of data information is passed to the Data Comm Processor from the Adapter Cluster 51. The AD field of the CIR $53_c$ is compared with the scan counter when information (data or control) is passed to the Adapter Cluster's BAR $53_b$ from the Data Comm Processor. The Read Time Counter Register is one which is constantly counting in synchronization with a 5 megahertz clock train. The Real Time Counter Register is an extension of the scan counter and is used to generate timing signals for the asynchronous (start/stop) transmission and reception of data bits. This register is also used as a source of timing for the control timers and the program timer.

The Input Register 56 of FIG. 20A is a 10 bit register which reflects the state of a line adapter whose buffer contents are in the Buffers Associative Register $53_b$. The output of this register goes to the Control Logic 55 (FIG. 20A). The Output Register 57 is a 6 bit register which sends output data and control to the line adapters. The input to this register is from the Control Logic 55. The memory register (cluster buffer) $52_m$ is an integrated circuit memory which consists of 16 words of 56 bits each. One word is assigned to each of the 16 adapters. The configuration of the bits within each word is identical to that which is specified for the Buffers Associative Register $53_b$. The BAR register is the source of information stored in the cluster buffer memory $52_m$ and is the destination of information read out of the cluster buffer memory $52_m$. The Buffer Memory $52_m$ has a reading cycle which is non-destructive. Simultaneous Read/Write cycles may be performed in the memory but the read and write cycles must not occur on the same memory word location.

In FIG. 20A the Clock and Designate Control 58 is the source of clocking control signals used throughout the Adapter Cluster 51. The basic or fundamental clock train input to this section can be provided by the host computer. Designate control signals are made available to the Read/Write Control 55, the Buffers Associative Register $53_b$, the Adapter Switching Matrix $51_{mx}$ and the cluster interface sections of the Adapter Cluster 51.

The Read/Write Control 55 of FIG. 20A is a section that contains control logic for simultaneous Read and Write cycles of cluster memory words. The operation provided for allows an adapter word to be written into Cluster Memory $52_m$ as another adapter word is read from the Cluster Memory $52_m$. The BAR $53_b$ services the Cluster Memory $52_m$ during the Read and Write cycles. The Read path to the Buffers Associative Register $53_b$ always reflects the image of what is in a cluster memory word position and it is referred to as the "image" path. The Write paths from BAR $53_b$ into the Cluster Memory $52_m$ includes an "image" path along with other paths which provide for data manipulation.

The Adapter Switching Matrix $51_{mx}$ contains designate control logic for the individual adapters. The designate gating generated within this section allows the adapters to time-share common input and output buses that attach to the BAR register $53_b$.

The Adapter 51 provides for both asynchronous and synchronous transmission of characters over the communication lines. Asynchronous transmission makes use of start-stop synchronization to identify the bits on the line. Synchronous transmission makes use of a bit or character patterns to attain or retain synchronization on the line. The specified pattern (sync pattern) is dependent upon the line discipline being used on a line. A sync pattern proceeds the transmission of a message and may be interspersed with the transmission of a message.

The Adapter Cluster 51 provides for sending and receiving characters over communication lines serial-by-bit or parallel-by-bit. Within the Adapter Cluster 51, the characters are transferred parallel by bit adding or deleting bits as required for the various line disciplines.

Figure 18:
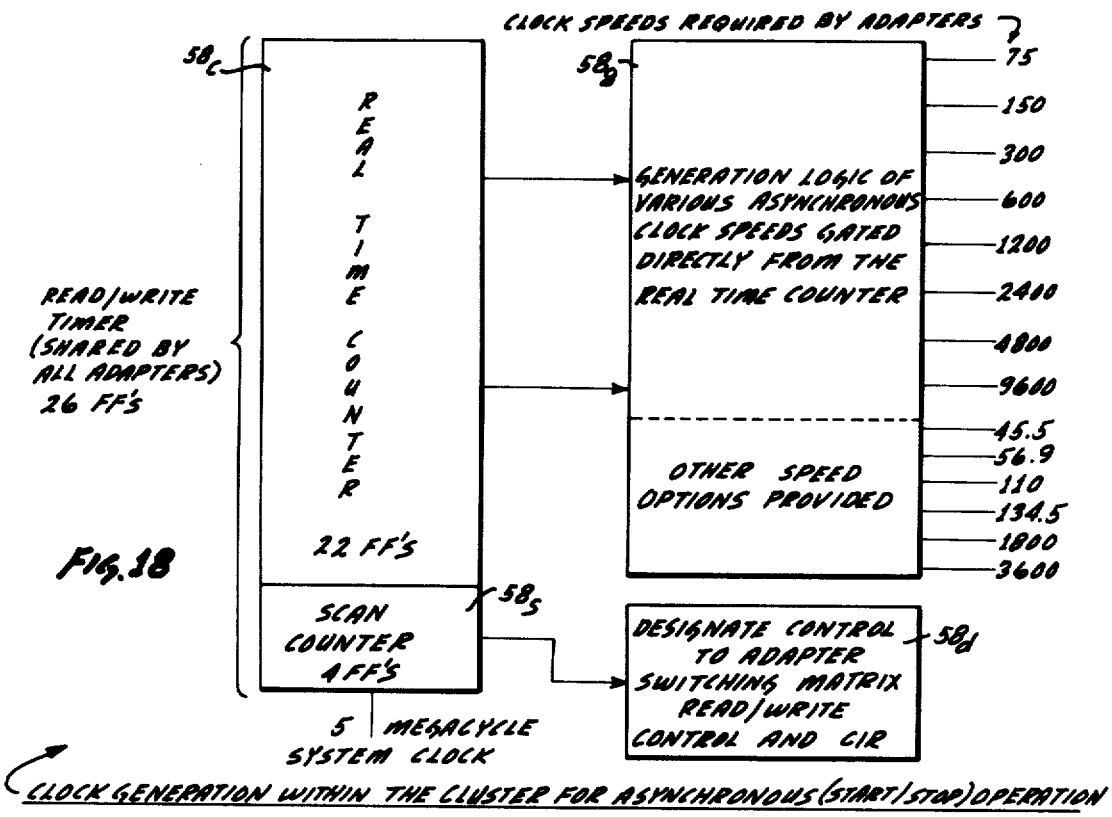
FIG. 18 is a block diagram of clock and designate control for the Adapter Cluster of FIG. 20A.

In FIG. 20A there is seen a real time clock and designate control 58 used in the Adapter Cluster 51. FIG. 18 shows a block diagram of the real time clock and designate control 58 for asynchronous operation.

A real time counter $58_c$ provides signals to a generation logic unit $58_g$ to provide the necessary clock speeds required by the adapters of the Adapter Cluster module. A scan counter $58_s$ provides signals to the designate control $58_d$ in order to provide clocking signals to the Adapter Switching Matrix $51_{mx}$, the Read/Write control 55, and the Cluster Interface register $53_c$ of FIG. 20A.

```
24047000              SAVECHA        = SM(0,8)#,
24048000        %
24049000              LINE           = SM(1,L)#,
24049000              LINENR         = SM(1,5)#,
24050000              SYSTEMRESTARTINGR
24050060                             = BIT(50)#,
24050080              SYSTEMRESTARTING
24050100                             = SM(1,W),SYSTEMRESTARTINGB#,
24050120              ONETIMEOUTR    = BIT(49)#,
24050200              ONETIMEOUT     = SM(1,W),ONETIMEOUTB#,
24050500              INVALIDCONTROLBLOCKR
24050540                             = BIT(48)#,
24050560              INVALIDCONTROLBLOCK
24050600                             = SM(1,W),INVALIDCONTROL_BLOCK#,
24050800              CONTROLBLOCK   = SM(1,F)#,
24051000        %
24052000     %...........................................
30001000     %   CONTINUITY LOOP
30002000     %
30003000     %   CENTRAL DCP PROGRAM CONTROL, OR
30004000     %   PROCESSOR ALLOCATION LOGIC
30005000     %   CONSISTS OF FOUR PARTS:
30006000     %
30007000     %      1. THE PROGRAM INVOKED FOR SOME LINE
30008000     %         SLEEPS, OR YIELDS THE PROCESSOR FOR OTHER WORK,
30009000     %         STUFFING THE PROGRAM RETURN ADDRESS INTO A CONTROL WORD,
30010000     %         AND STORING THE UPDATED CONTROL WORDS FOR THE LINE
30011000     %         BACK INTO THE CONTROL BLOCK;
30012000     %
30013000     %      2. CONTROL OF THE PROCESSOR IS THEN GIVEN TO
30014000     %         THE PROGRAM LOGIC APPROPRIATE TO A
30015000     %
30016000     %      3. CLUSTER ATTENTION NEEDED,
30017000     %         LOADING THE PROPER CONTROL WORDS FOR THE LINE DESIGNATED,
30018000     %         EXITING TO THE PROGRAM SYLLABLE ADDRESSED THEREIN, OR
30019000     %
30020000     %      4. SYSTEM ATTENTION NEEDED,
30021000     %         FOR MAINTENANCE OF THE REQUEST QUEUE
30022000     %
30023000     % BEGINSEGMENT
30024000       PROCEDURE SYSTEMMEMDUMP;           % GENERATE THE CODE FOR
30025000       BEGIN      SEGMENT;                % IDLING THE DCP DURING A
30026000                                          % MAIN SYSTEM MEMORY DUMP.
30027000             RESET(AR(W),SYSTEMDUMPBIT));
30028000             MKWP(MA,NC);
30029000     %
30030000             IF LOCALTABLES THEN
30031000             BEGIN
30032000                RESET(SYSTEMSTATUS,SYSTEMNOTDUMPING);
30033000                GOTO(UNC,CONTROL);
30034000             END
30035000             ELSE
30036000             IF SECUREDLINES THEN
30037000             BEGIN
30038000     %
30039000             LABL(SYSTEMDUMPING);           HEAD("SYSTEMDUMPING");
30040000     %
30041000                ARWN(CONTROL);
30042000                LEOC(ND,AC,ACCTIMER);
30043000                GOTO(IFNEQ,RANDOMLINK(L));
30044000     %
30045000                LAND(SAME,AL,ARMER);
30046000                SYSTEM(ND,AL,ARMER);
30047000                GOTO(IFGTR,SYSTEMDUMPING);
30048000     %
30049000                AWI (S,ACCUMMAND,0);
30050000                AWI (S,ACTIMER,DELAY(100 MILLISEC));
30051000                GOTO(UNC,SYSTEMDUMPING);
30052000     %
30053000             ENTERLINK(LL);
30054000                LEOC(ND,AC,ACTIMER);
30055000                GOTO(IFNEQ,SYSTEMDUMPING);
30056000     %
30057000                AWI (S,ACTIMER,DELAY(100 MILLISEC));
30058000                GOTO(UNC,SYSTEMDUMPING);
30059000             END SECUREDLINES
30060000             ELSE
30061000             BEGIN
30062000                MSKR;
30063000                MOVE(AA,S,ND);
30064000                LSR(ND,0,AA,3);
30065000                MSKR;
30066000     %
30067000                ARWN(SELF+2);
30068000                GOTO(UNC,SELF-1);
30069000     %
30070000                MOVE(ND,AA,1);
30071000                MSKN;
30072000                GOTO(UNC,CONTROL);
30073000             END NON SECURED LINES;
30074000     %
30075000             END SYSTEMMEMDUMP;
30076050     %
30076100     %..........................................
30076150     %
30076200       PROCEDURE SYSTEMRESTART LOGIC(WAITFORSAN);
30076210             REAL WAITFORSAN;
```

```
0076250              BEGIN                                                                30076250   30.141.013
0076300        %                                                                          30076300   30.141.013
0076350                    SET (SYSTEMSTATUS.IBANCTRESET);                                 30076350   30.141.013
0076400                    RESET(SYSTEMSTATUS.SYSTEMALIVE);                                30076400   30.141.013
0076450        %                                                                          30076450   30.141.013
0076500                    MOVE(IBA.NO);                                                   30076500   30.141.013
0076550                    SHFT(0.CONCATENATE.MA);                                         30076550   30.141.013
0076600                    MMR (MA.NC);                                                    30076600   30.141.013
0076650                    LOR (NO.WR(7).NO);                                              30076650   30.141.013
0076700                    GOTO(NONZERO.BRANCHLINK(L1));   % SYSTEMRESTARTED               30076700   30.141.013
0076750        %                                                                          30076750   30.141.013
0076760                    SET (SYSTEMRESTARTING);                                         30076760   30.141.013
0076780                    SET (INVALIDCONTROLBLOCK);                                      30076780   30.141.013
0076800                    LOADICWORD(SAVEMA);                                             30076800   30.141.013
0076850                    MMWR(SAVEMA.NO);                                                30076850   30.141.013
0076900                    GOTO(UNC.WAITFORSAN);                                           30076900   30.141.013
0076950        %                                                                          30076950   30.141.013
0077000              ENTERLINK(L1);                                                        30077000   30.141.013
0077050                    HSB3(DIRTEMPSTARTINX.MA);                                       30077050   30.141.013
0077100                    MMR (MA.NC);                                                    30077100   30.141.013
0077150                    MOVE(WR(7).NO);                  % PERMANENT(.]                 30077150   30.141.013
0077200        %                                                                          30077200   30.141.013
0077250              END SYSTEMRESTARTLOGIC;                                               30077250   30.141.013
0077900        %                                                                          30077900   30.141.013
0078000        % . . . . . . . . . . . . . . . . . . . . . . . . . . . .                  30078000
0079000        %                                                                          30079000
0080000              PROCEDURE CONTINUITY;                                                 30080000   27.030.020
0081000              BEGIN                                                                 30081000   27.030.020
0082000                    REAL    I;                                                      30082000   30.141.013
0083000        %                                                                          30083000   27.011.007
0084000                    WRITESTARS;                                                     30084000   27.011.007
0085000        %                                                                          30085000   27.011.007
0086000              LABL(YIELD);                         HEAD("YIELD");                   30086000   30.141.013
0087000        %                                                                          30087000
0088000                    STOREDCONTROLWORDS;                                             30088000   24.050.007
0089000        %                                                                          30089000
0090000              LABL(CONTROL);                       HEAD("CONTROL");                 30090000   30.141.013
0091000        %                                                                          30091000
0091100              IF DEBUG THEN                                                         30091100   30.141.013
0091200              BEGIN                                                                 30091200   30.141.013
0091300                    LURB(NO.4"EE".MA2+3);                                           30091300   30.141.013
0091400                    MOVE(MA.D+3);                                                   30091400   30.141.013
0091500                    MOVE(MA.SAVEDMA);                                               30091500   30.141.013
0091600                    MOVE(MA.SAVEMA);                                                30091600   30.141.013
0091700              END;                                                                  30091700   30.141.013
0091800        %                                                                          30091800   30.141.013
0092000                    BRAN(TRYCLUSTER);                                               30092000   27.011.007
0092200        %                                                                          30092200   30.141.013
0092300              IF LOCALCB THEN                                                       30092300   30.141.013
0092400              BEGIN                                                                 30092400   30.141.013
0092500                    LEUC(X.SM(0.7).TWO(ACTIVEREQUESTQUEUE));                        30092500   30.141.013
0092600                    LANC(NO.X.TWO(SYSTEMALIVE)+TWO(ACTIVEREQUESTQUEUE));            30092600   30.141.013
0092700                    GOTO(ZERO.FETCHREQUEST);                                        30092700   30.141.013
0092800              END;                                                                  30092800   30.141.013
0093000        %                                                                          30093000
0094000                    ARIN(CLUSTER);                                                  30094000
0095000        %                                                                          30095000
0096000                    TEST(SYSTEMSTATUS.ACTIVEREQUESTQUEUE);                          30096000   27.030.021
0097000                    GOTO(NONZERO.FETCHREQUEST);                                     30097000   27.011.007
0098000        %                                                                          30098000
0099000                    ARWN(SYSTEM);                                                   30099000
0100000        %                                                                          30100000
0101000              LABL(CLUSTER);                       HEAD("CLUSTER");                 30101000   30.141.013
0102000        %                                                                          30102000   13.000.009
0103000              IF LINEMIN GTR 0 THEN                                                 30103000   13.000.009
0104000              BEGIN                                                                 30104000   13.000.009
0105000                    SUBB(AA.LINEMIN.NO);                                            30105000   13.000.009
0106000                    GOTO(IFLSS.CONTROL);                                            30106000   13.000.009
0107000              END;                                                                  30107000   13.000.009
0108000        %                                                                          30108000   13.000.009
0109000              IF LINEMAX LSS 255 THEN                                               30109000   13.000.009
0110000              BEGIN                                                                 30110000   13.000.009
0111000                    SUBB(AA.LINEMAX.NO);                                            30111000   13.000.009
0112000                    GOTO(IFGTR.CONTROL);                                            30112000   13.000.009
0113000              END;                                                                  30113000   13.000.009
0114000        %                                                                          30114000
0115000              IF CANMONITOR THEN                   % ENABLED AT SEQUENCE 25176000   30115000   31.197.011
0116000              BEGIN                                                                 30116000   27.040.024
0117000                                                   HEAD("MONITORCAN");              30117000   30.141.013
0118000        %                                                                          30118000   30.141.013
0119000                    LEUC(NO.AA.MONITORLINE);       % TEST IF LINE TO BE MONITORED   30119000   31.197.011
0120000                    GOTO(7"MONITORCHECK.RESTORELINE);                               30120000   30.141.013
0121000        %                                                                          30121000   27.040.024
0122000              IF LOCALMEMORY THEN                  % RETRIEVE MONITOR CONTROL WORD  30122000   31.197.011
0123000                    LWRD(MONITORWORDCONTROL)                                        30123000   30.141.013
0124000              ELSE                                                                  30124000   30.141.013
0125000              BEGIN                                                                 30125000   30.141.013
0126000                    I := MONITORWORDCONTROL.MEMADDR + LINEMIN + CONTROLBLOCKSIZE;   30126000   30.141.013
0127000                    MOVE(CONTROLBLOCK.NO);                                          30127000   30.141.013
0128000                    ADDR(MA0.I.(07:8).MA0);                                         30128000   30.141.013
0129000                    ADDB(MA1.I.(15:8).MA1);                                         30129000   30.141.013
0130000                    ADDB(MA2.I.(19:4).MA2);                                         30130000   30.141.013
0131000                    MMR (MA.SM(6.L));                                               30131000   30.141.013
0132000              END;                                                                  30132000   30.141.013
0133000                    TEST(WR(W).NULLBIT);           % DO WE HAVE A MONITOR MSG AREA ? 30133000  31.197.011
0134000                    GOTO(NONZERO.BRANCHLINK(L1));  % NO - GO CALL GETSPACE FOR ONE  30134000   31.197.011
0135000        %                                                                          30135000   27.040.024
0136000                    LOR (NO.WR(2).Y);              % LOAD COUNT OF UNUSED MSG WORDS 30136000   31.197.011
0137000                    ORYZ(BRANCHLINK(L2));          % IF NONE. FULL MSG -- RETURN IT 30137000   31.197.011
0138000        %                                                                          30138000   30.141.013
0139000                    LOR (NO.Y.WR(2));              % RESTORE DECREMENTED COUNT R    30139000   31.197.011
0140000                    ADDC(SAME.WR(3).1);            %   INCREMENTED MSG WORD INDEX N 30140000   31.197.011
```

```
30141000      L3 := SELF;
30142000      IF LOCALMEMORY THEN                  % REWRITE MONITOR CONTROL WORD
30143000          LMWD(MONITORWORDCONTROL)
30144000      ELSE MMWP(SM(6,L),NO);
30145000  %
30146000          MOVE(WRL(1),NO);                 % WRITE CAN INFORMATION INTO MSG
30147000          HAD (WRR(7),SAVEMA);             %    WORD POINTED AT BY INDEX N
30148000          MOVE(NO,NC);
30149000          MOVE(AA+3,WRL(7));               % WRITE AA/AC/AI IN RIGHT HALF,
30150000          MMWP(SAVEMA,WRR(7));             %    ZERO IN LEFT HALF OF MSG(N)
30151000          GOTO(UNC,RESTORELINE);
30152000  %
30153000      ENTERLINK(L2);                       HEAD("MONITORRESULT");
30154000          SMWD(WRR(7),LOCMESSAGE);         % RETURN FULL MONITOR MSG
30155000          HADB(1,MA);
30156000          LORB(NO,MONITORED,WR(1));        % MSG(CLASS) = ENABLEDINPUT
30157000          LORB(NO,MONITORQLS,WR(5));       % Q AS INPUT FROM "MONITOR" LINE
30158000          LORB(NO,0,WR(6));
30159000          MMWP(MA,NO);                     % MSG(CLASS)
30160000          CALL(QUEUERESULT);               % RETURN MSG TO SYSTEM
30160200  %
30160300          SMRD(NO,NO);                     % IN CASE GETSPACE FAILS ...
30160400          SET (WR(N),NULLBIT);             % CAUSES RETRY ON NEXT CAN
30160500      IF LOCALMEMORY THEN
30160600          LMWD(MONITORWORDCONTROL)
30160700      ELSE
30160800          MMWP(SM(6,L),NO);
30161000  %
30162000      ENTERLINK(L1);
30163000          LORB(NO,MONITORSPACEINDEX,X);    % ASK FOR INPUT MSG OF THIS SIZE
30164000          CALL(GETSPACE);
30165000          GOTO(UNC,RESTORELINE);           % IF NOSPACE, TRY AGAIN NEXT CAN
30166000  %
30167000          SMRD(SPACEHEAD,NO);              % SETUP NEW MONITORWORDCONTROL
30168000          LORB(NO,MONITORCOUNT,WR(2));     % INITIAL COUNT OF UNUSED WORDS &
30169000          LORB(NO,MESSAGETEXT.INDEX+1,WR(3)); % FIRST WORD INDEX N
30170000          LORB(NO,0,WR(7));
30171000          GOTO(UNC,L3);                    % NOW GO STORE CAN INFORMATION
30172000      END;
30173000  %
30174000      LABL(RESTORELINE);                   HEAD("RESTORELINE");
30175000  %
30176000          LDR (NO,AA,LINENR);
30177000          LOADCONTROLWORDS;
30178000          MOVE(MA,IA);
30179000  %
30180000      LABL(TRYCLUSTER);                    HEAD("TRYCLUSTER");
30181000  %
30181100      IF LOCALCB THEN
30181200      BEGIN
30181250  $SET OMIT=IGNORETIMEOUT
30181300          LAND(NO,CF,TWO(22));
30181400          GOTO(NONZERO,RESETSYSTEMALIVE);
30181450  $POP OMIT
30181500  %
30181600          TEST(SYSTEMSTATUS,IRANOTRESET);
30181700          GOTO(ZERO,SYSTEMRESTARTCYCLE);
30181800      END;
30181900  %
30182000          SET (SYSTEMSTATUS,ACTIVEREQUESTQUEUE);
30183000          ARIN(CLUSTER);
30183100  %
30183200      IF LOCALCB THEN
30183300          GOTO(UNC,NORMALSYSTEMSTATUS);
30184000  %
30185000      LABL(SYSTEM);                        HEAD("SYSTEM");
30186000  %
30187000      IF LOCALCB THEN
30188000      BEGIN
30188500  $SET OMIT=IGNORETIMEOUT
30189000          LAND(NO,CF,TWO(22));
30190000          GOTO(NONZERO,RESETSYSTEMALIVE);
30190500  $POP OMIT
30191000  %
30192000          TEST(SYSTEMSTATUS,IRANOTRESET);
30193000          GOTO(ZERO,SYSTEMRESTARTCYCLE);
30194000      END;
30195000  %
30195100      LABL(NORMALSYSTEMSTATUS);            HEAD("NORMALSYSTEMSTATUS");
30195200  %
30196000          LORC(SAME,SM(0,7),TWO(ACTIVEREQUESTQUEUE)+
30197000                          TWO(SYSTEMNOTDUMPING));
30199000  %
30200000      LABL(FETCHREQUEST);                  HEAD("FETCHREQUEST");
30201000
30201100      IF LOCALCB THEN
30201120      BEGIN
30201140          TEST(INVALIDCONTROLBLOCK);
30201160          GOTO(NONZERO,RESETREQUESTQUEUE);
30201180          TEST(SYSTEMRESTARTING);
30201200          GOTO(NONZERO,BRANCHLINK(L1));    %NULL REQUEST RESETS
30201220      END;
30201300  %
30201350          RESET(ONETIMEOUT);
30201400          SET (SYSTEMSTATUS,SYSTEMALIVE);
```

```
30201500                IF LOCALCB THEN                                                        30201500    30.141.013
30201600                 ENTERLINK(L);                                                         30201600    30.141.013
30201700        %                                                                              30201700    30.141.013
30201800                    LOADADDRESS(DESCREQUESTQUEUE,NO);                                  30201800    30.141.013
30202000                    SET (MP(W),LOCKBIT);                                               30202000
30203000        %                                                                              30203000
30204000                    MMRP(MPR(7),NO);                                                   30204000    27.030.020
30205000                    TEST(MP(W),LOCKBIT);                                               30205000    27.030.020
30206000                    GOTO(NONZERO,CONTROL);                                             30206000
30207000        %                                                                              30207000    21.000.004
30208000                    TEST(MP(W),SYSTEMDUMPBIT);                                         30208000    27.011.007
30209000                    GOTO(NONZERO,SYSTEMDUMP);                                          30209000    27.011.007
30210000        %                                                                              30210000
30211000                    TEST(MP(W),NULLBIT);                                               30211000
30212000                    GOTO(ZERO,INITIATESYSTEMREQUEST);                                  30212000    27.011.007
30213000        %                                                                              30213000
30214000                    MMRP(MA,NO);                                                       30214000    27.011.007
30214100        %                                                                              30214100    30.141.013
30214200                 LABL(RESETREQUESTQUEUE);        HEAD("RESETREQUESTQUEUE");            30214200    30.141.013
30214300        %                                                                              30214300    30.141.013
30215000                    RESET(SYSTEMSTATUS,ACTIVEREQUESTQUEUE);                            30215000    27.030.021
30216000                    GOTO(UNC,CONTROL);                                                 30216000
30217000        %                                                                              30217000
30218000                 LABL(INITIATESYSTEMREQUEST);    HEAD("INITIATESYSTEMREQUEST");        30218000    30.141.013
30219000        %                                                                              30219000    27.011.007
30220000                    MMR (MP(7),SAVEMA);                                                30220000
30221000                    SET (MP(W),NULLBIT);                                               30221000
30222000                    MMWR(MA,LOCMESSAGE);                                               30222000
30223000        %                                                                              30223000
30224000                    LORB(NO,0,MP(7));                                                  30224000
30225000                    LORB(NO,0,MPL(7));                                                 30225000    21.000.004
30226000                    MMWP(SAVEMA,NO);                                                   30226000    21.000.004
30227000        %                                                                              30227000
30228000                    GOTO(UNC,INITIATEREQUEST);                                         30228000
30229000        %                                                                              30229000    21.000.004
30230000                 LABL(SYSTEMDUMP);               HEAD("SYSTEMDUMP");                   30230000    30.141.013
30231000        %                                                                              30231000    27.011.007
30232000                    SYSTEMMEMDUMP;                                                     30232000    27.030.020
30233000                    LANC(SAME,CF,ALLBITS-TWO(22));                                     30233000    30.141.013
30234000        %                                                                              30234000    27.030.020
30235000                IF LOCALCB THEN                                                        30235000    30.141.013
30236000                BEGIN                                                                  30236000    27.030.020
30237000        %                                                                              30237000    30.141.013
30238000                 LABL(RESETSYSTEMALIVE);         HEAD("RESETSYSTEMALIVE");             30238000    27.030.020
30239000        %                                                                              30239000    30.141.013
30240000                    LANC(SAME,CF,ALLBITS-TWO(22));                                     30240000    27.030.020
30240400                    TEST(ONETIMEOUT);                                                  30240400    30.141.013
30240600                    GOTO(ZERO,SELF+2);                                                 30240600    30.141.013
30241000                    RESET(SYSTEMSTATUS,SYSTEMALIVE);                                   30241000    27.030.020
30241500                    SET (ONETIMEOUT);                                                  30241500    30.141.013
30242000        %                                                                              30242000    30.141.013
30243000                    TEST(SYSTEMSTATUS,IBANOTRESET);                                    30243000    30.141.013
30244000                    GOTO(NONZERO,CONTROL);       % ATTENTION NEEDED                    30244000    30.141.013
30245000        %                                                                              30245000    30.141.013
30246000                 LABL(SYSTEMRESTARTCYCLE);       HEAD("SYSTEMRESTARTCYCLE");           30246000    30.141.013
30247000        %                                                                              30247000    30.141.013
30247100                    SYSTEMRESTARTLOGIC(CONTROL);                                       30247100    30.141.013
30247200        %                                                                              30247200    30.141.013
30266000                    HADB(DIM ADDRESSBLOCKINX,MA); % RELOAD ADDRESS BLOCK               30266000    30.141.013
30267000        %                                                                              30267000    30.141.013
30268000                    FOR I := 0 STEP 1 UNTIL ADDRESSBLOCK(SIZE-1 DO                     30268000    30.141.013
30269000                    BEGIN                                                              30269000    30.141.013
30270000                       IF DEBUG AND I=LINEVECTOR THEN                                  30270000    30.141.013
30270200                       BEGIN                                                           30270200    30.141.013
30270300                          SMRB(N),NO);                                                 30270300    30.141.013
30270400                          LORB(NO,LINEVECTORADDR.[07:8],MR(6));                        30270400    30.141.013
30270500                          LORB(NO,LINEVECTORADDR.[15:8],MR(7));                        30270500    30.141.013
30270600                       END ELSE                                                        30270600    30.141.013
30270700                          MMR (MA,NO);                                                 30270700    30.141.013
30271000                          LMWJ(LM(ADDRESSBLOCKADDR+I,0));                              30271000    30.141.013
30272000                          HADB(1,MA);                                                  30272000    30.141.013
30273000                    END;                                                               30273000    30.141.013
30274000        %                                                                              30274000    30.141.013
30275000                    MOVE(MA,CONTROLBLOCK);                                             30275000    30.141.013
30276000                    HAD (MA,IRA);                                                      30276000    30.141.013
30277000        %                                                                              30277000    30.141.013
30279000                    SET (SYSTEMSTATUS,IBANOTRESET);                                    30279000    30.141.013
30279100                    RESET(INVALIDCONTROLBLOCK);                                        30279100    30.141.013
30280000        %                                                                              30280000    30.141.013
30281000                    GOTO(UNC,FETCHREQUEST);                                            30281000    30.141.013
30282000        %                                                                              30282000    30.141.013
30283000                END;                                                                   30283000    30.141.013
30284000        %                                                                              30284000    30.141.013
30285000                END C O N T I N U I T Y;                                               30285000    30.141.013
30286000                                                                                       30286000
30287000        $ ENDSEGMENT                                                                   30287000
30288000                DEFINE   SLEEP    =            % YIELD PROCESSOR TO ANOTHER LINE       30288000
30289000                   CALL(YIELD);                                                        30289000

33625000        %                                                                              33625000
33626000                 LABL(TERMINATEINPUT);          HEAD("TERMINATEINPUT");                33626000    30.141.013
33627000        %                                                                              33627000    30.141.013
33628000                IF LOCALCB THEN                                                        33628000    30.141.013
33629000                BEGIN                                                                  33629000    30.141.013
33629050                    LORB(NO,SELF-RETRYGETSPACERETURN+3,0);                             33629050    30.141.013
33629100                    TEST(LOCKERO,LOCMESSAGEWITHOUT);                                   33629100    30.141.013
33629200                    GOTO(NONZERO,RETRYGETSPACE);                                       33629200    30.141.013
33629300        %                                                                              33629300    30.141.013
33631300                    TEST(SYSTEMRUNNING);                                               33631300    30.141.013
33631400                    GOTO(ZERO,EXIT);                                                   33631400    30.141.013
33632000        %                                                                              33632000    30.141.013
33633000                    HADB(1,MA);                                                        33633000    30.141.013
33634000                END;                                                                   33634000    30.141.013
```

```
33635000    X
33636000            TEST(LOCWCRD,NULLBIT);
33637000            GOTO(ZERO,TERMINATEINPUTWITH);
33638000    X
33639000        IF OPTION(TERMINATELOGICALACKRETURN) THEN
33640000        BEGIN
33641000            LOADLINETABLE(LINESTATUS,INDEX,SAVEMA);
33642000            TESTSTATUS(WR(W),ACKNOWLEDGEREADY);
33643000            GOTO(ZERO,BRANCHLINK(L1));
33644000            RESETSTATUS(WR(W),ACKNOWLEDGEREADY);
33645000            TJLW(MA,NO);
33646000            MOVE(SAVEMA,NO);
33647000            EXIT(0);
33648000    X
33649000            ENTERLINK(L1);
33650000            MOVE(SAVEMA,NO);
33651000        END;
33652000            CALL(GETS*ALLENABLESPACE);
33653000            GOTO(UNC,ABORTNOSPACE);
33654000    X
33655000        LABL(TERMINATEINPUTWITH);         HEAD("TERMINATEINPUTWITH");
33656000    X
33657000            CALL(STOPECLOSEWITH);
33657100    X
33657150        IF TIMESTAMPMSG THEN
33657200        BEGIN
33657250            LOADNOLMESSAGE(MESSAGETIMESTAMP,INDEX,SAVEDMA);
33657300            LOR (NO,WR7(MESSAGETIMESTAMP),NO);
33657350            GOTO(NONZERO,BRANCHLINK(L1));
33657400    X
33657450            MOVE(AA+3,SAVEMA);
33657480            LORB(NO,4"FF",AA+3);        X SET TO ALL ONES IN CASE NO TOD CLOCK
33657500            TODR;
33657550            MOVE(AA+3,AA+3);
33657600            MOMP(SAVEMA,WR7(MESSAGETIMESTAMP));
33657650    X
33657700            ENTERLINK(L1);
33657750    X
33657800            MOVE(SAVEDMA,NO);
33657850        END;
33658000    X
33659000        IF LOCALC9 THEN
33660000            CALL(TRANSFERRESULTFROMDCP);
33661000    X
33662000        IF ANYCRLINES THEN
33663000            GOTO(UNC,TERMINATESTATION);
33664000    X
33665000        LABL(TERMINATEOUTPUT);           HEAD("TERMINATEOUTPUT");
33666000    X
33667000        IF LOCALCR THEN
33668000        BEGIN
33668400            TEST(LOCWCRD,LOCMESSAGEFILEMODE);
33668600            GOTO(NONZERO,SELF+3);
33669000            TEST(SYSTEMRUNNING);
33670000            GOTO(ZERO,EXIT0);
33671000            HADR(1,MA);
33672000        END;
33673000    X
33674000        IF ANYCRLINES THEN
33675000        BEGIN
33676000            TEST(CRPRESENT);
33677000    X
33678000        IF LOCALCR THEN
33679000            GOTO(ZERO,SELF+2)
33680000        ELSE GOTO(ZERO,TERMINATESTATION);
33681000    X
33682000            CALL(CBCLOSE);
33683000    X
33683250        IF LOCALC9 THEN
33683300        BEGIN
33683350            TEST(LOCWCRD,LOCMESSAGEFILEMODE);
33683400            GOTO(ZERO,BRANCHLINK(L1));
33683450    X
33683455            CRR (LOCMESSAGE,SAVEMA);
33683460            MOVE(WRL(7),NO);
33683465            CRP (WRR(7),O+3);
33683470            MOVE(O+3,O+3);
33683475            HAD (WR7(NEXTBUFFERWCRD),MA);
33683480            HADB(2,WR7(NEXTBUFFERWCRD));
33683485            CRWPCO+3,NO);
33683488            MOVE(SAVEMA,NO);
33683490    X
33683500            RESET(LOCWCRD,LOCMESSAGEFILEMODE);
33683550            LORB(NO,TAG(NULLBIT),LOCMESSAGE);
33683600            EXIT(0);
33683650            ENTERLINK(L1);
33683700    X
33683750        END;
33684000            TBLR(LOCTABLE,SAVEMA);
33685000            TEST(WR(W),STATIONQUEUED);
33686000            GOTO(ZERO,CREFPROPS(CRNCOUTPUTMSG));
33687000    X
33688000            MOVE(WRR(7),NO);
```

```
33689000            HADB(STATIONQUEUE,INDEX,MA);
33690000            TBLR(MA,NO);
33691000            MOVE(WRR(7),NO);
33692000            HADR(1,WRR(7));
33693000            MWR (WRR(7),LOCMESSAGE);        X MSG(CLASS)
33694000            LEQC(NO,WR(1),OUTPUT);
33695000            MOVE(SAVEMA,NO);
33696000            GOTO(NONZERO,CRERRORS(C3,NOOUTPUTMSG));
33697000    X
33698000        IF LOCALCB THEN
33699000            CALL(TRANSFERRESULTHEADERFROMOCP)
33699500        ELSE
33700000            CALL(DELINKTEXTAREA);
33701000    X
33702000        END;
33703000    X

73518000    X
73519000    X . . . . . . . . . . . . . . . . . . . . . . . . . . .
73520000    X
73521000            20:                             X TERMINATE
73522000            BEGIN
73523000    X
73524000                PROCEDURE SUSPEND(TERMINATE);
73525000                REAL TERMINATE;
73526000                BEGIN
73527000                    CONTINUMAX:=CONTINUMAX+1;
73528000                    LOFB(NO,CONTINUMAX,Y);
73529000                    CALL(TERMINATE);
73530000    X
73531000                    LABL(INDEXEDFUNCTION(CONTINU,CONTINUMAX));
73532000    X
73533000                END;
73534000    X
73535000                CLEARWR;
73536000    X
73537000                IF LOGIC=LINECONTROL THEN
73537500                BEGIN
73538000                    INVALIDUSE;
73538200                    DISCARD(NDL(1));
73538400                    DISCARD(NDLLABEL);
73538600                END
73539000                ELSE
73540000    X
73541000                CASE NDL(1) OF
73542000                BEGIN
73543000    X
73544000                00:                         X TERMINATE LOGICALACK(RETURN)
73545000                    IF LOGIC = INPUT AND NOT FORFULLDUPLEX THEN
73546000                        SUSPEND(TERMINATELOGICALACKRETURN)
73547000                    ELSE INVALIDUSE;
73548000                    DISCARD(NDLLABEL);
73549000    X
73550000                01:                         X TERMINATE NORMAL
73551000                    IF FOREIHANCED THEN
73551500                        INVALIDUSE
73552000                    IF LOGIC=INPUT THEN
73553000                        CALL(TERMINATEINPUTMESSAGE)
73554000                    ELSE CALL(TERMINATEOUTPUTMESSAGE)
73555000                    ELSE
73556000                    IF MAYBEFORAUXILIARY THEN
73557000                        IF LOGIC=INPUT THEN
73558000                            CALL(TERMINATEINPUTDUPLEX)
73559000                        ELSE CALL(TERMINATEOUTPUTDUPLEX)
73560000                    ELSE
73561000                        IF LOGIC=INPUT THEN
73562000                            CALL(TERMINATEINPUT)
73563000                        ELSE CALL(TERMINATEOUTPUT);
73564000                    IF LOCALCB THEN
73565000                        BRANCH(UNC,NDLLABEL)
73566000                    ELSE DISCARD(NDLLABEL);
73567000                    GOTO(UNC,INITIATELINE);
73568000                    ENDOFREQUESTCK:=SELF;
73569000    X
73570000                02:                         X TERMINATE ERROR
73571000                    IF FORFULLDUPLEX THEN
73572000                        CALL(TERMINATEERRORDUPLEX)
73573000                    ELSE CALL(TERMINATEERROR);
73574000                    DISCARD(NDLLABEL);
73575000                    ENDOFREQUESTCK:=SELF;
73576000    X
73577000                03:                         X TERMINATE BLOCK
73578000                    IF FORFULLDUPLEX THEN
73579000                        NOTIMPLEMENTED
73580000                    ELSE
73581000                    IF LOGIC=INPUT THEN
73582000                        CALL(TERMINATEBLOCKEDINPUT)
73583000                    ELSE SUSPEND(TERMINATEBLOCKEDOUTPUT);
73584000                    IF LOCALCB THEN
73585000                        BRANCH(UNC,NDLLABEL)
73586000                    ELSE DISCARD(NDLLABEL);
73587000    X
73588000                04:                         X TERMINATE ENABLEINPUT
73589000                    IF LOGIC=OUTPUT THEN
73590000                        CALL(TERMINATEENABLEINPUT)
73591000                    ELSE INVALIDUSE;
73592000                    DISCARD(NDLLABEL);
73593000    X
73594000                05:                         X TERMINATE NOINPUT
73595000                    IF LOCALCB THEN
73596000                        BEGIN
```

```
                        IF MAYBEFORAUXILIARY THEN
                              CALL(TERMINATENOINPUTDUPLEX)
                        ELSE
                              CALL(TERMINATENOINPUT);
                        BRANCH(UNC,NOLLABEL);
                  END
                  ELSE
                  BEGIN
                        IF MAYBEFORAUXILIARY THEN
                              GOTO(UNC,TERMINATENOINPUTDUPLEX)
                        ELSE
                        IF LOGIC=INPUT THEN
                              GOTO(UNC,TERMINATENOINPUT)
                        ELSE GOTO(UNC,INITIATELINE);
                        DISCARD(NOLLABEL);
                  END;
                  ENDOFREQUESTOR:=SELF;

06:                   % TERMINATE LOGICALACK
                  IF LOGIC=INPUT AND NOT FOFFULLDUPLEX THEN
                        SUSPEND(TERMINATELOGICALACK)
                  ELSE NOTIMPLEMENTED;
                  IF LOCALCB THEN
                        BRANCH(UNC,NOLLABEL)
                  ELSE DISCARD(NOLLABEL);

07:                   % TERMINATE
                  IF MAYBEFORAUXILIARY THEN
                        GOTO(UNC,TERMINATEDUPLEX)
                  ELSE GOTO(UNC,INITIATELINE);
                  DISCARD(NOLLABEL);
                  ENDOFREQUESTOR:=SELF;

08:                   % TERMINATE DISCONNECT
                  IF LOGIC=INPUT THEN
                        LORB(NO,128+RECEIVEABORTED,0)
                  ELSE LORB(NO,128+TRANSMITABORTED,0);
                  LOADLINEVECTOR(NO);
                  TEST(WR(W),LINESWITCHED)
                  GOTO(NONZERO,LINEABORT));
                  IF LOCALCB THEN
                        BRANCH(UNC,NOLLABEL)
                  ELSE DISCARD(NOLLABEL);

09:                   % TERMINATE MESSAGE
                  INVALIDUSE;
                  IF LOGIC = INPUT THEN
                        CALL(TERMINATEINPUTMESSAGE)
                  ELSE CALL(TERMINATEOUTPUTMESSAGE);
                  GOTO(UNC,INITIATELINE);
                  DISCARD(NOLLABEL);
                  ENDOFREQUESTOR := SELF;

10:                   % TERMINATE MESSAGE(RETURN)
                  INVALIDUSE;
                  IF LOGIC = INPUT THEN
                        CALL(TERMINATEINPUTMESSAGE)
                  ELSE CALL(TERMINATEOUTPUTMESSAGE);
                  IF LOCALCB THEN
                        BRANCH(UNC,NOLLABEL)
                  ELSE DISCARD(NOLLABEL);

11:                   % TERMINATE OUTPUT
                  CALL(TERMINATEOUTPUT);
                  IF LOCALCB THEN
                        BRANCH(UNC,NOLLABEL)
                  ELSE DISCARD(NOLLABEL);
                  GOTO(UNC,INITIATELINE);
                  ENDOFREQUESTOR := SELF;

12:                   % TERMINATE OUTPUT(RETURN)
                  NOTIMPLEMENTED;
                  CALL(TERMINATEOUTPUT);
                  IF LOCALCB THEN
                        BRANCH(UNC,NOLLABEL)
                  ELSE DISCARD(NOLLABEL);

13:                   % TERMINATE OUTPUTREQUEST
                  CALL(TERMINATEOUTPUTREQUEST);
                  DISCARD(NOLLABEL);

14:                   % TERMINATE INPUT
                  CALL(TERMINATEINPUT);
                  IF LOCALCB THEN
                        BRANCH(UNC,NOLLABEL)
                  ELSE DISCARD(NOLLABEL);
                  GOTO(UNC,INITIATELINE);
                  ENDOFREQUESTOR := SELF;

15:                   % TERMINATE INPUT(RETURN)
                  CALL(TERMINATEINPUT);
                  IF LOCALCB THEN
                  BEGIN
                        IF THELABEL:=NOLLABEL IS NOLLABEL THEN
```

```
73687200                        IF(UNC+SELF+2)                              73687200    30.141.013
73687400                  ELSE BRANCH(UNC,THELABEL);                        73687400    30.141.013
73687600                       CALL(GETLOCALSPACE));                        73687600    30.141.013
73687800                  END                                               73687800    30.141.013
73688000                  ELSE DISCARD(NULLABEL);                           73688000    30.141.013
73689000        %                                                           73689000    30.141.013
73690000                  16:                    % TERMINATE INPUT(QUEUED)  73690000    30.141.013
73690500                  NOTIMPLEMENTED;                                   73690500    30.141.013
73691000                  CALL(TERMINATEQUEUEDINPUT);                       73691000    30.141.013
73692000                  IF LOCALCH THEN                                   73692000    30.141.013
73693000                       BRANCH(UNC,NULLABEL)                         73693000    30.141.013
73694000                  ELSE DISCARD(NULLABEL);                           73694000    30.141.013
73695000        %                                                           73695000    30.141.013
73696000                  END CASES OF TERMINATE;                           73696000    30.141.013
73697000        %                                                           73697000    30.141.013
73698000             END CASE 20;                                           73698000    30.141.013
73699000        %                                                           73699000
```

A Data Communications Subsystem has been described for operation within a Data Communication Network having a single or plurality of host computers and Main Memory. A plurality of Data Comm Processors relieve the loading on the main system by monitoring and controlling the operations of data transfers in the network. Any halts in the main host system permit the subsystem to go into autonomous operation and continuously handle data transfer operations. By enhancing the Data Comm Processor with a special group of front-end controllers, the overall system efficiency and rate of message transmission can be increased by a number of magnitudes. Thus, by the use of a Basic Control Interface between a Data Comm Processor and a series of front-end controllers, the capacity for handling data transmission lines and terminals can be greatly increased and great flexibility of configurations can be made possible while at the same time relieving the individual Data Comm Processors of being overloaded. Each Data Communication Processor has means to sense failure or halt of the main host processor and to shift the data communication subsystem into a self-operating autonomous mode to continuously operate independently of the main host system.

While the principles of the invention have been illustrated in a preferred embodiment, there will obviously be various modifications in structure, arrangement and components used in the practice of the invention which are particularly adapted for specific environments and operating requirements without departing from the principles of the invention. The appended claims are thus intended to define the scope of the invention and cover any equivalent embodiments.

The following claims are made:

What is claimed is:

1. In a data communications network having a plurality of terminals connected via transmission lines to a central station wherein said central station includes a main host system having a host processor and main memory which connects to a data communications subsystem, or to a plurality of data communications subsystems, an improved data communications subsystem comprising:

(a) a Data Communications Processor connected to said main host system for providing pointer addresses of instructions to be accessed by Front-End Controllers associated with the subsystem, said instructions being normally accessed from main memory when said main host system in on-line;

(b) a plurality of specialized Front-End Controllers for executing data-transfer operations for different speeds and line disciplines of transmission lines to peripheral terminals, each of said Front-End Controllers capable of accessing instructions from addresses in main memory or local Data Communications Memory storage means, said addresses provided by said Data Communications Processor;

(c) a Basic Control Interface providing control and communication exchange between said Data Communications Processor, a local Data Communications Memory storage means, and said Front-End Controllers;

(d) local Data Communications Memory storage means directly accessible to said Data Communications Processor and each of said Front-End Controllers, said Data Communications Memory storage means providing instructions to be accessed by said Front-End Controllers during such periods when said main host system is off-line;

(e) A Command Block located in main memory and in local Data Communications Memory for providing instructions, control, and information data for each individual Front-End Controller;

(f) and wherein said Data Communications Processor includes;

(f1) means to sense a halt or failure in said main host system and;

(f2) means to initiate continuous autonomous operation of said data communications subsystem independently of said main host system during any period when said main host system is inoperative.

2. The data communications subsystem of claim 1,, wherein said Command Block includes a discrete Command Word, Address Word, Result Word space and a data storage block for each Front-End Controller associated in the subsystem;

said Command Word providing the operations code for execution by the particular Front-End Controller involved;

said Address Word providing information to a particular Front-End Controller as to memory location of a block of data and length of the data block;

said Result Word space providing space for information from a particular Front-End Controller as to the completion status of the operation specified in the said Command Word.

3. The data communications subsystem of claim 2 including a disk file resource, wherein said Data Communications Processor provides a data-pointer address for each Front-End Controller in the subsystem to initiate data-transfer operations by a particular Front-End Controller which receives said data-pointer address;

and wherein, during halt periods of said main system, said Data Communications Processor starts tanking operations by initiating a specialized Front-End Controller to store message data and control data on disk files.

4. The data communications subsystem of claim 1, wherein said plurality of Front-End Controllers includes:

(a) a Broadband Controller for data transmission on wide-band high-speed lines to and from remote terminals;

(b) an Adapter Cluster Module Controller for transmission on low/medium speed lines to and from remote terminals;

(c) a Data Communications to Disk Controller to provide temporary memory space for data storage on disk files;

(d) a Store-to-Store Controller to transfer data from/to local Data Communications Memory, to/from main memory, or to re-allocate locations of data within main memory or within said Data Communications Memory storage means.

5. The data communications subsystem of claim 4, wherein said Data Communications Processor and said Basic Control Interface include means for sharing main memory via separate memory busses.

6. The data communications subsystem of claim 4, wherein said Basic Control Interface provides direct memory access to local Data Communications Memory storage means for said Front-End Controllers and for said Data Communications Processor.

7. In a data communications network having a plurality of terminals connected via transmission lines to a central station wherein said central station includes a main host system having a main processor, main memory and a data communications subsystem, an improved data communications subsystem comprising:

(a) a Data Communications Processor connected to said main host system, said Data Communications Processor including means for sensing inoperativeness of said main host system and means for operating said data communications subsystem in an autonomous mode independent of said main host system during such time period as said main host system is inoperative;

(b) a plurality of Front-End Controllers providing:

(b1) means for controlling and operating data transmissions to and from remote terminals on high-speed wide-band transmission lines;

(b2) means for controlling and operating data transmissions to and from remote terminals on low/medium speed transmission lines;

(b3) means for controlling and operating a disk file for storage and retrieval of message data;

(b4) storage control means for controlling and executing data relocation between said storage control means and local Data Communications Memory;

(c) a Basic Control Interface for providing control and communication exchange between: said Data Communications Processor, said Data Communications Memory and said Front-End Controllers;

(d) local Data Communications Memory storage means directly accessible to said Basic Control Interface;

(e) a Command Block in local Data Communications Memory or main memory having momentarily dedicated space for each Front-End Controller, and wherein said Data Communications Processor includes means to initialize operation of any Front-End Controller by directing said Front-End Controller to access instructions in said Command Block; said Command Block providing linking means to start a second set of operations in a Front-End Controller while result signals of completed operations are transmitted to said Data Communications Processor.

8. The subsystem of claim 7, wherein said Data Communications Processor includes a plurality of interface hub means and wherein each of said interface hub means connects to a Basic Control Interface unit which interfaces a plurality of Front-End Controllers.

9. In a digital data processing network having a main host system, including a main host processor and main memory, connected to a data communications subsystem which receives periodic activity signals from said main host processor, the improved data communications system comprising:

(a) a plurality of Front-End Controllers each including processing means to execute data transfer operations between a plurality of sending/receiving peripheral terminals connected thereto;

(b) a local Data Communications memory providing direct memory access to each of said Front-End Controllers and a Data Communications Processor, said local Data Communications Memory replacing said main memory during periods when said main system is off-line;

(c) a Basic Control Interface connecting said Front-End Controllers and Data Communications Processor to said local Data Communications Memory;

(d) a Data Communications Processor for initializing and controlling said Front-End Controllers and including:

(d1) means to sense a halt or failure in said main host system;

(d2) means to initiate autonomous operation of said data communications subsystem whereby said subsystem operates independently of said main host system;

(e) a plurality of peripheral terminals connected to said Front-End Controllers.

10. The data communications subsystem of claim 9, wherein said Data Communications Processor includes:

(d3) means to sense normal operation of said main host system and to re-initiate normal communications with said main host system and main memory.

11. The data communications subsystem of claim 9, including:

(e) a disk file Front-End Controller;

(f) a disk file;

wherein said Data Communications Processor initiates tanking of data in a disk file during halt of said main host system for temporary storage of data from peripheral terminals.

12. The data communications subsystem of claim 9, wherein said means to sense a halt or failure includes:

(d1a) timing circuitry for sensing, during predetermined intervals, the absence of activity signals from said main host system, and thereupon generating a timeout signal;

(d1b) settable flip-flops, responsive to said timeout signal, for developing a condition signal to cause said data communication system to branch into an autonomous operating mode independent of said main host system.

13. The data communications system of claim 9 including a settable hold register in said Data Communications Processor for switchably setting the Data Communications Processor into normal operating mode or stop mode and wherein said means to initiate autonomous operation includes:

(i) a first AND gate for receiving activity signals from said main host system and for receiving on-line signals representing normal operation of said Data Communications Processor with said main host system;

(ii) a second AND gate having one input indicating the on-line signal of said Data Communications Processor with said main host system, and having a second input representing a timeout signal from an interval timer;

(iii) a J-K flip-flop having one input to receive signals from said first and second AND gates and having a second input to receive a timeout signal from said interval timer;

(iv) an interval timer including a multivibrator to provide a timeout signal when no signal activity from said main host system is forthcoming during a predetermined period;

(v) a third AND gate having a first input from said on-line signal, a second input from said timeout signal of said interval timer, a third input to signal the operativeness of the Data Communications Processor, and a fourth input to signal that the hold register of said Data Communications Processor is not set and thus that said Data Communications Processor is placed in normal operating mode;

(vi) a first and second flip-flop, each of which receives an input from said third AND gate, said first and second flip-flops, when set, providing a flag which is sensed by the operating program in the Data Communications Processor to operate the data communications subsystem in an autonomous mode independently of said main host processor.

14. In a data processing system having a main computer including a main host processor and main host memory and working in conjunction with a data communications subsystem having its own power source and including a plurality of Data Communications Processors, each of which may control one or more Front-End Controllers which control the data transfer operations to and from remote peripheral terminal units, the data communications subsystem comprising:

(a) local autonomous memory for storage of instructions; control data and information data dedicated for independent operation of said data communications subsystem, said local autonomous memory being directly accessible by an associated Data Communications Processor and an associated plurality of Front-End Controllers;

(b) a Basic Control Interface for connecting a plurality of Front-End Controllers to said local autonomous memory and to said Data Communications Processor, said Basic Control Interface including:

(b1) means to allocate, among competing Front-End Controllers, priority of access to said main memory or to said autonomous memory;

(c) a plurality of Front-End Controllers, each dedicated to a particular type of data communication and data transfer operation for specific types of peripheral terminals, and having processing means for controlling data transfer operations between connected peripheral terminals, autonomous memory and main host memory;

(d) a Data Communications Processor for initializing, starting and stopping said plurality of Front-End Controllers, said Data Communications Processor including:

(d1) means for providing an address pointer to each Front-End Controller to permit each Front-End Controller to access data transfer commands from autonomous or main memory;

(d2) means to sense a halt of the main host system and to place the data communications subsystem on an autonomous operating basis independent of the halt in the main host system;

(d3) means to sense the normal operation of the main host system and to resume normal intercommunicating relationships between the main host system and the data communications subsystem.

15. In a system for the intercooperation of a main host computer, having a main processor and a main memory, and a data communications subsystem which includes a data communications processor having a local autonomous data communications memory, said data communications processor operating a plurality of Front-End Controllers at least one of which controls a disk file, each of said Front-End Controllers supervising a particular type of terminal unit for data transfer operations between said terminal unit and said main memory, the improved subsystem comprising:

(a) means in said data communications processor for sensing operational failure in said main host system and to initiate independent operation of said subsystem;

(b) means in said data communications processor for using operating routines from said local autonomous data communications memory in order to continue data transfer operations between terminal units and the data communications subsystem whereby a disk file controller and disk file are used to temporarily store information eventually destined to go to the main memory and to store information from the main memory which is destined for addressed terminal units;

(c) means in said data communications processor to sense the operativeness of the main host system as on-line and to re-establish the normal operating relationship whereby data may be directly transferred to/from the main memory and any connected terminal unit.

* * * * *

UNITED STATES PATENT AND TRADEMARK OFFICE
CERTIFICATE OF CORRECTION

PATENT NO. : 4,292,669

DATED : September 29, 1981

INVENTOR(S) : James E. Wollum and Robert L. Rawlings

It is certified that error appears in the above—identified patent and that said Letters Patent is hereby corrected as shown below:

```
Col.  2, line 18, change "permissable," to --permissible,--.
Col.  4, line 40, change "enchanced" to --enhanced--.
Col.  7, line 16, change "Control" to --Controller--;
         line 17, change "Control" to --Controller--.
Col.  9, line 44, change "through" to --though--;
         line 60, change "20_d," to --20_i,--.
Col. 13, line  8, change "control" to --Controller--.
Col. 14, line 21, change "(20_i, 20_3)" to --(20_i, 20_e)--.
Col. 18, line 58, change "and" to --an--.
Col. 19, line 12, change "completion" to --competition--.
Col. 20, line  3, change "Q" to --$\overline{Q}$--.
Col. 21, line 45, change "and" to --or--.
Col. 23, line 35, change "inerval" to --interval--.
Col. 26, line 26, change "ranch" to --branch--;
         line 65, change "ot" to --not--.
Col. 27, line 45, change "CR." to --OR.--.
Col. 28, line 23, change "cnditions" to --conditions--;
         line 42, change "This," to --Thus,--.
Col. 30, line 50, change "exchange." to --exchange 1.--.
Col. 31, line 68, change "DCp" to --DCP--.
Col. 34, line 23, change "aproximately" to --approximately--.
Col. 35, line 14, change "Control", first occurrence, to
                  --Controller--;
         line 33, change "undi-" to --unidi---.
Col. 37, line 16, change "Braod" to --Broad--.
Col. 43, line 49, change "Modern/Line" to --Modem/Line--.
Col. 44, line 22, change "Control" to --Controller--.
Col. 45, line 32, change "Control" to --Controller--.
```

UNITED STATES PATENT AND TRADEMARK OFFICE
CERTIFICATE OF CORRECTION

PATENT NO. : 4,292,669

DATED : September 29, 1981

INVENTOR(S) : James E. Wollum and Robert L. Rawlings

It is certified that error appears in the above-identified patent and that said Letters Patent are hereby corrected as shown below:

Col. 51, line 25, change "of" to --or--.
Col. 52, line 14, change "$23_d$" to --$23_c$--.
Col. 53, line 33, change "Switch" to --Switching--;
line 37, change "charater" to --character--.
line 46, change "shaft" to --shift--.
Col. 54, line 43, change "of" to --or--;
line 48, change "Read" to --Real--.

Signed and Sealed this

Twenty-ninth Day of December 1981

[SEAL]

Attest:

GERALD J. MOSSINGHOFF

Attesting Officer

Commissioner of Patents and Trademarks